United States Patent [19]
Murakami et al.

[11] Patent Number: 5,523,178
[45] Date of Patent: Jun. 4, 1996

[54] CHEMICAL CELL

[75] Inventors: Fumiaki Murakami, Okazaki; Tetsuya Nagata, Konan; Hiroshi Tamura, Kariya; Masanori Tabayashi, Kariya; Tomoyasu Takeuchi, Kariya, all of Japan

[73] Assignee: Nippondenso Co., Ltd., Kariya, Japan

[21] Appl. No.: 465,618

[22] Filed: Jun. 5, 1995

Related U.S. Application Data

[63] Continuation of Ser. No. 254,586, Jun. 6, 1994, abandoned, which is a continuation of Ser. No. 165,878, Dec. 14, 1993, abandoned.

[30] Foreign Application Priority Data

| Dec. 14, 1992 | [JP] | Japan | 4-353674 |
| Dec. 16, 1992 | [JP] | Japan | 4-336275 |
| Mar. 30, 1993 | [JP] | Japan | 5-96801 |
| Mar. 30, 1993 | [JP] | Japan | 5-96802 |
| Mar. 31, 1993 | [JP] | Japan | 5-98974 |

[51] Int. Cl.⁶ .................................................. H07M 2/12
[52] U.S. Cl. ............................. 429/53; 429/61; 429/62
[58] Field of Search ............................... 429/48, 49, 53, 429/61, 62, 54

[56] References Cited

U.S. PATENT DOCUMENTS

| 4,209,571 | 6/1980 | Bessett et al. | 429/62 X |
| 4,252,869 | 2/1981 | Heitz et al. | 429/49 |
| 4,788,112 | 11/1988 | Kung | 429/61 |
| 4,855,195 | 8/1989 | Georgopoulos et al. | 429/62 X |
| 4,943,497 | 7/1990 | Oishi et al. | 429/54 X |
| 4,992,339 | 2/1991 | Georgopoulos | 429/62 X |
| 4,992,344 | 2/1991 | Coppers | 429/61 |
| 5,362,576 | 11/1994 | Clark et al. | 429/62 X |
| 5,407,760 | 4/1995 | Kasner et al. | 429/54 |

FOREIGN PATENT DOCUMENTS

| 57-67289 | 4/1982 | Japan . |
| 60-258870 | 12/1985 | Japan . |
| 2-112151 | 4/1990 | Japan . |
| 2-288063 | 11/1990 | Japan . |
| 3-25865 | 2/1991 | Japan . |
| 4-329259 | 11/1992 | Japan . |
| 5-62664 | 3/1993 | Japan . |

*Primary Examiner*—Stephen Kalafut
*Attorney, Agent, or Firm*—Cushman, Darby & Cushman

[57] ABSTRACT

This invention provides a chemical cell equipped with a safety mechanism which can restrict an abnormal reaction of a cell and can prevent in advance gas explosion, etc., of the cell. The chemical cell 4010 comprises a cell reaction portion 4015, a positive pole terminal 4016 and a cell case 4041 functioning also as a negative pole terminal. A driving member 4021 responsive to a gas pressure or reaction heat at the time of the abnormal reaction includes a retention mechanism 4025 having a flexible member 4251 which cuts off a current and maintains this state. It also includes a gas discharge member. The driving member 4021 preferably short-circuits the positive pole terminal 4016 and the cell case 41 after the current is cut off, and preferably includes a valve member 4301 for closing a gas passage 4047 again after the gas is discharged (see FIG. 40).

17 Claims, 33 Drawing Sheets

Fig. 16
Fig. 17
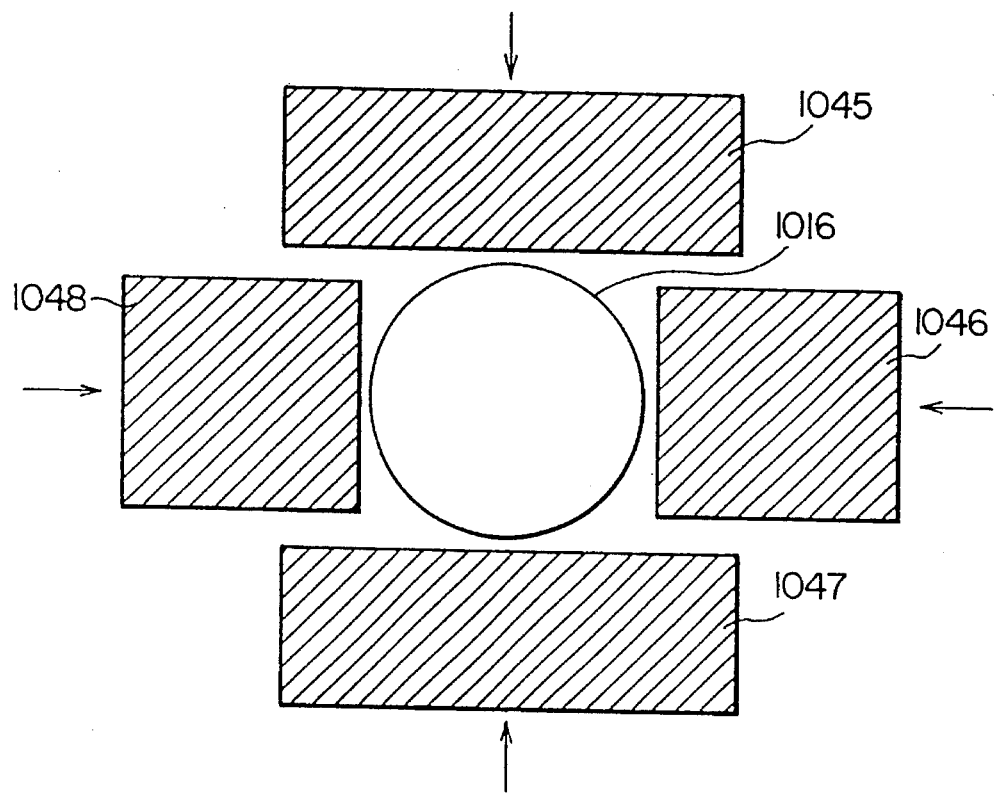
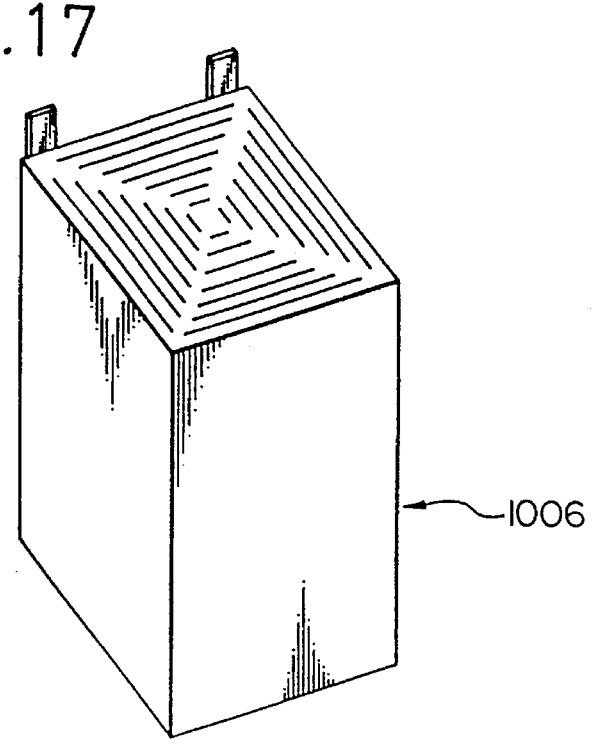

CHEMICAL CELL

This is a continuation of application No. 08/254,586, filed on Jun. 6, 1994, which was abandoned upon the filing hereof which is a continuation of Appln. No. 08/165,878, filed Dec. 14, 1993 which was expressly abandoned on Jun. 5, 1995.

BACKGROUND OF THE INVENTION

1. Field of the Invention

This invention relates to an integrated cell having excellent portability and maintenance property which uses integrated lithium secondary cells to obtain a desired voltage and a desired current capacity, and to a wound type cell produced by winding thin sheet-like electrode plates in a spiral form onto a square cell having a high energy density such as a lithium secondary cell, a nickel hydrogen cell, etc., through separators. More particularly, the present invention relates to a chemical cell having a safety mechanism for restricting an abnormal reaction at leads extended from the electrode plates.

2. Description of the Related Art

An output voltage of a single cell is primarily determined by materials constituting the cell. To obtain a desired voltage value, therefore, a series circuit must be formed using a plurality of such cells. To increase a current capacity (Ah), on the other hand, a parallel circuit must be formed. A desired voltage value and a desired capacity can be obtained by integrating a plurality of unit cells into a so-called "integrated cell" in this way.

A mean output voltage of a single cell is about 3 V in the case of a lithium cell. To obtain a cell having a voltage of 240 V and a current capacity of 100 Ah, for example, eighty unit cells of 3 V and 100 Ah are connected in serries, or two serries circuits each comprising eighty unit cells of 3 V and 50 Ah are connected in parallel. Therefore, a large number of unit cells are arranged inside a case using a metal structural material having high strength, and the terminals of each unit cell are connected by bolts, nuts, leads, etc., so as to form a series-parallel circuit of the unit cells.

However, the integrated cell according to the prior art involves the following problems.

In the prior art cell devices accommodating all the unit cells in the single case, the weight and the capacity of the integrated cell increase when the voltage and the current capacity increase, so that transportation and movement becomes difficult. On the other hand, the secondary cell must be regularly charged, and portability of the cell is desired so that the operation can replace the cells during a charging operation.

When a large number of cells are collectively wired, the wiring becomes complicated and the assembly work, as well as maintenance work, becomes more difficult.

In the integrated secondary cell, inspection and maintenance is necessary so as to check and exchange defective cells and used cells. Therefore, this inspection and maintenance must be facilitated.

In view of the problems with the prior art cells describe above, the present invention aims at providing a lithium secondary integrated cell which is portable and easy to maintain.

One of the known cells having a high energy density is a cylindrical cell which is produced by winding four kinds of belt-like unit laminate sheets, that is, a positive electrode material sheet containing an electrolyte, a separator sheet, a negative electrode material sheet and a separator sheet, into a cylindrical shape, and storing and holding the resulting cylindrical cell elements in a cylindrical cell case.

Lithium metal, which has the basest potential and the greatest energy density per unit weight and unit volume has drawn attention as a negative electrode material for a secondary cell system directed to accomplish a higher energy density. A lithium-containing metal oxide such as $LiMn_2O_4$, etc., providing a high energy density, particularly a spinel type compound, has drawn attention as the positive electrode material for the negative pole described above. Such a lithium secondary cell is reported in Japanese Unexamined Patent publication (Kokai) No. 2-139860, for example.

The cylindrical cell as a single cell has a high energy density. However, when a plurality of these cylindrical cells are arranged in a cell case, unnecessary spaces are defined between the cells, and a space occupying ratio cannot be improved. Rectangular square secondary cells are more advantageous to improve the space occupying ratio when a plurality of cell are arranged. However, the square secondary cells, particularly the square secondary cells having a large current capacity, are not free from the following problems. For, since a rectangular unit cell element is formed by laminating a rectangular positive pole active material sheet containing an electrolyte, a separator sheet, a negative pole active material sheet and a separator sheet, adhesion between these sheet is not high, and as the number of times of lamination increases, the number of unnecessary spaces between the sheets increase, so that the volume of the unit cell element increases. Accordingly, the unit cell elements must be accommodated in a larger cell case, packing efficiency thus drops and a cell having a high volume energy density cannot be obtained.

The present invention is directed to solve these problems, and to provide a square secondary cell having less unnecessary space between the sheets of the positive pole active material sheet, the separator sheet, the negative pole active material sheet and the separator sheet, that constitute the unit cell element.

As portable electronic devices and appliances have become wide spread in recent years, demands for a greater capacity and a higher energy density of batteries have been increasing. The key point for accomplishing high energy density in the cells of batteries resides in a structure and a shape capable of securing a large electrode plate area in a limited volume, and a wound cell has gained a wide application as an example of such cells.

In the ordinary wound cell, an electrode roll formed by winding positive and negative electrode plates is fitted into a can formed by contraction molding and serving as the negative pole, and the positive and negative leads from the electrode roll are connected to the upper cover as the positive pole terminal and the can as the negative pole terminal, respectively.

The positive and negative leads of the electrode roll are formed by coupling lead plates 2092 to the end portion 2091 of the electrode plates 2090 as shown in FIG. 29.

A method of bonding an insulating tape to both surfaces of the lead plate 2092 lest the lead plate 2092 electrically short-circuits to unnecessary portions inside the cell when the lead plate 2092 is connected has been proposed in the past (Japanese Unexamined Patent Publication (Kokai) No. 4-329259).

The separator for insulation is sandwiched between the positive and negative plates of the electrode roll, but in order to make the insulation between the electrode plates more reliable, a method which expands the width of the separator to be sandwiched between both electrode plates in the vertical direction has been proposed (Japanese Unexamined Patent Publication (Kokai) No. 3-25865).

Another method has been proposed which inserts a hollow cylindrical pin into the center gap portion of the electrode roll so as to reinforce the electrode roll stored in the cell can, and to improve the working factor in the assembly of the electrode roll to the cell can (Japanese Unexamined Patent Publication (Kokai) No. 4-332481).

However, the wind-up type cell according to the prior art involves the following problems.

The first problems resides in that the working factor for connecting the lead of the electrode plate to the bottom of the cell can is low, the number of man-hour is great, and defects in quality such as a short-circuit are likely to occur.

In other words, if the lead (which is generally the negative pole) to be connected to the can bottom is short, the connection and fixing work of the lead to the can bottom is extremely difficult because there is not a sufficient space margin. On the other hand, when the lead is made longer, deflection of the lead occurs after the electrode roll is fitted, comes into contact with portions other than the can bottom portion, and is likely to cause a short-circuit.

The second problems lies in that the structure in which the lead plate is connected to the end portion 2091 of the electrode plate 2090 generates a voltage drop and exothermicity when the electrode plate is elongated, as shown in FIG. 29. In other words, according to the method which disposes the lead plate at only one of the ends, the distance becomes great between the other end portion 2093 and the lead plate 2092, so that the internal resistance value of the electrode plate inclusive of the lead plate becomes great as a whole, and exothermicity (Joule heat) and a drop in voltage take place.

On the other hand, when a method which disposes a large number of lead plates 2092 and bundles them into one lead as shown in FIG. 30 is employed to lower the resistance value of the electrode plate, the internal resistance value of the electrode plate can be lowered as a whole and exothermicity and voltage drop can be suppressed.

According to this method, however, the number of lead plates increases and hence, the number of components increases. Further, the number of man-hours for fitting the lead plates to the electrode plate, and the number of man-hours for bundling the lead plates increase. As a result, this method results in an increase in the production cost.

In view of the problems with the prior art as described above, the present invention provides a wound type cell which has a low internal electrode resistance, and has lead extension portions which can be assembled easily.

If foreign matter enters a chemical cell from outside or if trouble such as short-circuit occurs, there occurs the case where the chemical reaction abnormally proceeds and invites a remarkable temperature rise or the generation of enormous quantities of a gas. Therefore, how to secure the safety of the cell is of utmost importance.

In the case of a lithium metal cell which is highly regarded as a cell having a high energy density, for example, large quantities of gas and a temperature rise are generated by the abnormal reaction resulting from the mixture of the moisture and precipitation of dendrite, and how to secure safety of the cell is a critical problem in order to put the lithium metal cell into practical application.

Therefore, an ordinary enclosed type cell is equipped with a gas emission mechanism to prevent sudden jetting of the gas or explosion. Various proposals have also been made as to how to suppress the progress of the abnormal reaction.

To prevent the progress of an abnormal reaction in the cell, a method has been proposed, for example, which separates a current collector rod inside a cell from a seal port cover which is a positive pole terminal when the internal temperature abnormally rises, and thus cuts off the current path inside the cell (Japanese Unexamined Patent Publication (Kokai) No. 57-67289).

In the lithium metal cell, a method which absorbs the hydrogen gas generated by the mixture of moisture with a hydrogen-absorbing alloy and prevents jetting of the gas has been proposed (Japanese Unexamined Patent Publication (Kokai) No. 60-258870).

However, the safety mechanisms of the cell according to the prior art described still involve the following problems.

First of all, the method which merely discharges the gas provides the effect of preventing the danger such as explosion, but it does not suppress the cell reaction. Accordingly, the generation of the gas itself does not stop, and this method does not provide a fundamental safety measure.

Similarly, the method which disposes hydrogen-absorbing alloy inside the lithium metal cell provides the effect of preventing jetting of the hydrogen gas, but the cell reaction does not stop. Since gases other than the hydrogen gas such as carbon dioxide cannot be absorbed, this method is not sufficient as a safety measure.

The method which pulls off the current collector rod from the seal port cover at the time of the abnormal rise of the temperature can suppress the reaction by cutting off the current against the temperature rise due to the external short-circuit, etc., but does not provide any effect for the internal short-circuit of the cell. In other word, in the case of the internal short-circuit such as the short-circuit between the electrode plates, a different current path from the current path between the current collector rod and the seal port cover is formed. Accordingly, the current is not cut off even when the current collector rod is pulled off from the seal port cover.

In view of the problems with the prior art described above, the present invention is directed to provide a chemical cell equipped with a safety mechanism which can reliably suppress the abnormal reaction of the cell inclusive of factors such as an internal short-circuit.

To cope with these problems, the ordinary enclosed type cell is equipped with the internal gas emission mechanism, and prevents drastic jetting of the gas and explosion. Various proposals have been made to suppress the progress of the abnormal reaction.

On the other hand, the method which separates the current collector rod from the seal port cover in response to the abnormal rise of the temperature (Japanese Unexamined Patent Publication (Kokai) No. 57-67289) provides the effect of suppressing the reaction by cutting off the current, but is not yet free from the problem how to reliably keep the cut-off state of the current.

In other words, this is the method which causes the current collector rod to fall into a recess by its own weight and to be pulled off from the seal port cover, thereby cutting off the current. Accordingly, when the cell is turned upside-down, that is, when the seal port cover exists on the down side, the current cannot be cut off.

Even if the seal port cover exists on the up side and the current is once cut off, the current collector rod comes again into contact with the seal port cover and becomes conductive when the cell is turned over.

Furthermore, since this method does not provide a mechanism for emitting the internal gas, there remains the danger of gas jetting or explosion before the cell reaction completely stops.

A method which causes the separator used for the cell reaction portion to be clogged at the time of the temperature rise and thus suppresses the cell reaction at the time of abnormality has been employed generally (Japanese Unexamined Patent Publication (Kokai) No. 3-25865). However, when the separator gets clogged, the internal resistance of the cell becomes extremely great. Accordingly, in the case of an aggregate (integrated) cell formed by connecting in series a plurality of cells, there occurs the problem that the aggregate cell does not function as a whole due to abnormality of the cell described above.

In view of these problems with the prior art described above, the present invention is directed to provide a chemical cell equipped with a safety mechanism which can suppress the abnormal reaction of the cell and can prevent, in advance, an explosion of the cell, and so forth.

SUMMARY OF THE INVENTION

The present invention provides an integrated lithium secondary cell wherein a plurality of lithium secondary unit cells are connected into a predetermined circuit and are integrated in such a manner as to form a cell unit equipped with positive and negative output terminals, and a plurality of such unit cells of a single kind or a plurality of kinds are connected and are integrated so as to obtain a desired voltage and a desired current capacity.

It is most noteworthy in the present invention that the integrated cell is formed by integrating a plurality of unit cells to form a cell unit, and then integrating a plurality of such cell units.

In other words, a plurality of unit cells are connected to form a cell unit having a predetermined output voltage and a predetermined current capacity. These cell units are connected in series so as to increase the voltage, or are connected in parallel so as to increase the current capacity.

In this way, an integrated cell having a predetermined voltage and a predetermined current capacity is constituted.

When a plurality of kinds of cell units having mutually different output voltage values or current capacity value are prepared, integrated cells having various total output voltages or total capacitance values can be accomplished more easily.

By the way, the output terminals off the cell unit are composed of male and female plug-in type terminals capable of being fitted and removed to and from each other, and these male and female plug-in type terminals are preferably disposed at predetermined positions of each cell unit so that when a plurality of cell units are juxtaposed or are put one upon another, they can be coupled to one another. According to this arrangement, the plug-in type terminals can be connected to one another by juxtaposing the cell units and pushing them tightly to one another, or by placing the cell units one upon another.

The integrated cell according to the present invention is dividedly constituted by the cell units, and these cell units are integrated with one another.

Accordingly, the integrated cell can be divided into the cell units having a smaller weight and capacity, and each cell unit can be transported and moved. Accordingly, transportability of the integrated cell can be improved.

Since the cell unit is relatively light in weight, an economical resin material having a high insulating property can be used as the case of the cell unit.

Even when the voltage and the capacity of the integrated cell become greater and the number of the unit cells becomes greater, the problems of assembly, maintenance and inspection of the integrated cell does not increase much because the integrated cell is divided into the cell units and because the number of unit cells of each cell unit can be made substantially constant.

In other words, when the integrated cell is divided into the cell units, the operation can be made in parallel for these cell units. Further, the number of the unit cells of each cell unit can be limited to a suitable range. For these reasons, each work can be made easy, and the number of mistakes can be reduced, too.

The maintenance and inspection work such as checking and exchanging unit cells can be made for each cell unit. Accordingly, when inspection and maintenance is made for the integrated cell as a whole, the work becomes easier and the number of mistakes can be reduced.

If a safety device and a protection device are provided to each cell unit, any trouble does not spread to the integrated cell as a whole, and an accident can thus be localized.

Furthermore, the cell unit can be handled as if it were a single cell. Therefore, the voltage and the capacity can be changed greatly by changing the connection of a relatively small number of cell units. These changes can be easily automated by disposing a sequence of a switching circuit.

As described above, the present invention can provide a lithium secondary integrated cell which has excellent portability as well as excellent maintainability.

A square secondary cell according to the present invention comprises a cell case having a rectangular space, and a rectangular unit cell element, accommodated and held in the cell case, formed by compressing a unit laminate sheet comprising four kinds of sheets, that is, a positive pole active material sheet containing an electrolyte, a separator sheet, a negative pole active material sheet and a separator sheet, or a plurality of the unit laminate sheets, in the direction of lamination.

The unnecessary spaces which are otherwise likely to remain between the laminate sheets can be eliminated by compressing the laminate sheets in the direction of lamination. The rectangular shape of the unit cell element compressed and compacted can be maintained because this unit cell element is accommodated in the rectangular cell case. The compacted rectangular shape can be obtained by utilizing the tensile resistance of the separators, etc, constituting the unit cell element, or by using fixing members.

As the square secondary cell, the present invention can be applied to a lithium secondary cell and a nickel hydrogen cell.

In a wound cell produced by winding thin sheet-like positive and negative electrode plates while interposing a separator between them to form an electrode roll and connecting the electrode plates of the electrode roll to pole terminals formed on the upper and lower surfaces of a case, the present invention provides a wind-up type cell wherein each of the electrode plates of the electrode roll forms an expanded portion protruding upward at least a part of the electrode plate of one of the polarities in such a manner as to protrude above the electrode of the other polarity, the electrode of the other polarity has an expanded portion protruding below the electrode of one polarity at at least a part thereof, and the upper expanded portion is electrically connected to the pole terminal of the upper surface while the lower expanded portion is electrically connected to the pole terminal of the lower surface.

It is most noteworthy in the present invention that the electrode plates have the expanded portions protruding upward and downward, respectively. In other words, one of the electrode plates has the expanded portion protruding above or below the other electrode plate at at least a part thereof, while the other electrode plate has the expanded portion protruding in the opposite direction (that is, downward or upward). These expanded portions of the electrode plates are electrically connected to the pole terminals of the upper and lower surfaces of the cell, respectively.

Next, the function and effect of the present invention will be described.

The electrode plates of the electrode roll in the present invention have the expanded portions which protrude upward and downward or in the mutually opposite directions.

Accordingly, these expanded portions can be used as the leads, and the lead plates (reference numeral 2092 in FIG. 29) in the cells according to the prior art are not necessary.

In other words, the expanded portions are connected to the pole terminals in place of the lead plates, and the lead plates thus become unnecessary.

The expanded portions can be shaped simultaneously when the electrode plates are shaped by punching, or the like. Accordingly, they can be produced extremely easily (see FIGS. 23(*a*) and (*b*)).

It is possible to secure a large width W (FIGS. 23(*a*) and (*b*), 24) for the expanded portions. When a large width W is secured, the internal resistance of the electrode plate inclusive of the lead can be made extremely small. Accordingly, the drop of the output voltage and exothermy can be reduced.

Since the large width W can be freely secured for the expanded portion and at the same time, the position of the formation of the expanded portion can be selected freely, the connection work for the pole terminals of the upper and lower surface can be done easily.

Since the expanded portion does not have the shape of a thin line unlike the lead wire, it does not easily undergo deflection, and contact defect with portions other than the pole terminal does not occur easily.

On the other hand, in the wound cell produced by winding thin sheet-like positive and negative electrode plates while interposing a separator between them so as to form an electrode roll, and connecting the electrode plates of the resulting electrode roll to pole terminals formed on the upper and lower surfaces of a case, the present invention also provides a wound cell wherein the pole terminal formed on the lower surfaces has a concavo-convex portion for implanting a core rod, a conductive core rod is implanted to the concavo-convex portion, the electrode roll is wound round the core rod, and the winding start portion of one of the electrode plates is connected to the core rod.

It is most noteworthy in the present invention that the pole terminal on the lower surface has the concavo-convex portion for implanting a rod-like member, the core rod as the axial core portion of the electrode roll is implanted to the concavo-convex portion, and the winding start of one of the electrode plates of the electrode roll is connected to this core rod.

The core rod is an electrically conductive member, is fitted to the pole terminal of the lower surface and is connected to the latter.

The concavo-convex portion may be only a concave portion or a convex portion, and both concave portion and convex portion may also be formed.

Next, the function and effect of the invention described above will be described.

The start of one of the electrode plates of the electrode roll in the present invention is connected to the core rod, and the core rod is fitted to the concavo-convex portion of the pole terminal of the lower surface.

In other words, since the start of the electrode plate is connected to the core rod, it is electrically connected to the pole terminal of the lower surface, and the electrode plate does not require a lead plate.

The core rod exists at the axial portion of the electrode roll, and the start of the electrode plate needs only to be connected in advance to the core rod before winding of the electrode roll is started. Accordingly, the connection work of the electrode plates and the core rod is extremely easy. In addition, the core rod can be implanted extremely easily to the concavo-convex portion of the pole terminal. Accordingly, the connection work for the pole terminal of the lower surface and the electrode roll and the assembly of the electrode roll to the case can be easily done.

When the electrode plates are electrically connected to the core rod, the electrode plates can be connected, in a large planar shape, in the axial direction of the core rod. Therefore, the resistance of the electrode plates inclusive of the core rod can be an extremely low value.

The contact resistance can be made extremely small by increasing the contact area of the fitting portion when the core rod and the pole terminal are fitted to each other.

Accordingly, the internal resistance of the electrode plates inclusive of the contact resistance with the pole terminal can be a low value.

In consequence, exothermicity and the voltage drop due to the internal resistance resulting from the resistance of the electrode plates can be extremely low.

Further, the core rod is implanted at the center portion of the electrode roll, and has also the function of a reinforcing material.

As described above, the present invention can provide a wound type cell which has a low internal electrode resistance value and has lead extension portions which can be easily assembled.

Furthermore, the present invention provides a chemical cell which incorporates therein a neutralizer case storing a neutralizing agent for restricting a cell reaction, and wherein the neutralizer case has an opening means for emitting the neutralizing agent in response to the gas or reaction heat generated at the time of the abnormal cell reaction.

The neutralizing agent stored in the neutralizer case restricts the chemical reaction of the cell, and is a gas, a liquid, powder, a granule or their mixture.

The opening means operates in response to the gas and reaction heat generated at the time of the abnormal cell reaction. The opening means includes various means which physically respond to a gas pressure of the resulting gas, which operate while causing a chemical reaction with the resulting gas, which operate either physically or chemically by reaction heat, and so forth.

For example, the opening means includes a means that has a pressure-sensitive member which responds to the gas pressure of the reaction gas from the cell reaction.

Examples of the pressure-sensitive member include a piston, a diaphragm, bellows, and the like, that operate in response to the gas pressure. The neutralizing agent can be emitted from the neutralizer case by operating such pressure-sensitive members.

Some of the open means are made of a thermoplastic material.

In other words, at least a part of the neutralizer case is made of the thermoplastic material so that this thermoplastic material is softened or melted by the reaction heat resulting from the abnormal reaction of the cell, and the neutralizing agent can be emitted.

Some of the open means have a driving member made of a shape memory alloy.

The driving member made of the shape memory alloy undergoes contraction or deformation in response to the reaction heat generated by the abnormal reaction of the cell, and the neutralizer case is thereby opened.

When the cell generates the abnormal reaction in the chemical cell of the present invention, the open means is operated in response to the resulting gas or the reaction heat generated by the abnormal reaction, and the neutralizing agent can thus be emitted.

In this way, the active material of the cell can be made inactive and the abnormal reaction can be suppressed or stopped.

As a result, the generation of the gas or exothermy can be restricted, and the safety of the cell can be secured.

The restriction of the reaction by the neutralizing agent is effective both when the cause of the abnormal reaction exists outside and or inside the cell.

In other words, when the cause of abnormality is an external cause such as a short-circuit outside the cell or results from inside the cell such as an internal short-circuit, the cell reaction can be restricted effectively in both cases.

As described above, the present invention can provide a chemical cell equipped with a safety mechanism capable of reliably suppressing the abnormal reaction of the cell inclusive of the internal cause such as an internal short-circuit.

In a chemical cell including a cell reaction portion, a positive or negative pole terminal and a cell case playing also the role of the other pole terminal, the present invention provides a chemical cell including a driving member which is responsive to a gas pressure or reaction heat generated by the abnormal reaction of the cell, and has a retention mechanism having a flexible member for cutting off conduction between the cell reaction portion and the pole terminal and retaining the cut-off state, and a gas emission member for emitting an internal gas to the outside when the gas pressure inside the cell exceeds a predetermined value.

The driving member described above is a piston or diaphragm, for example, which is responsive to the gas pressure, and is made of a shape memory alloy or a bimetal, for example, which undergoes contraction and extension by the heat at the time of the abnormal reaction.

The retention mechanism includes various lock mechanisms for effecting a non-reversible operation by the use of a flexible member.

The cell of the present invention is equipped with the gas emission member for emitting the gas to the outside when the gas pressure inside the cell exceeds a predetermined value.

Examples of the gas emission member include sealing paper which is broken by the predetermined pressure, various thin sheet-like safety valves, means for securing a gas discharge flow path by the displacement of a piston or a diaphragm which is responsive to the gas pressure, and so forth.

Preferably, the driving member is constituted in such a manner as to cut off conduction between the cell reaction portion and the pole terminal, and then to short-circuit the pole terminal and the cell case.

According to this arrangement, when the cell described above is used as the unit cell to constitute an integrated cell using a plurality of such unit cells in series, the supply of power of the integrated cell can be maintained by bypassing the abnormal unit cell even when the unit cell at a portion becomes abnormal.

In other words, when the abnormal unit cell is left under the cut-off state, the series circuit of the integrated cell is under the cut-off state as a whole, and the current cannot be supplied. However, when the abnormal cell is short-circuited and bypassed, the current can be supplied from the integrated cell at an output voltage which is lower by the output voltage of the abnormal unit cell.

When the mechanism of the present invention is used in combination with the separator which is clogged at the time of the temperature rise, the mechanism of the present invention first operates to secure the power supply function as the set (integrated) cell. Then, when the temperature rise further occurs, the separator is caused to be clogged and exothermy of the cell reaction portion of this unit cell is suppressed. In other words, the operation pressure and temperature are of this mechanism are set to be lower than the clogging operation temperature of the separator and in this way, the two-stage operation described above can be accomplished.

The driving member preferably has a valve member which opens the gas passage when the internal gas pressure of the cell exceeds a predetermined value and again closes the gas passage when the gas pressure drops.

For, such a valve member can open the gas passage when the gas pressure exceeds a predetermined value to thereby discharge the gas to the outside and to secure safety, and again cuts off the gas passage when the gas pressure drops, and can thus prevent intrusion of external air into the cell.

As a result, problems can be prevented in advance in those cells in which such problems occur when external air and moisture enter the cell (such as those cell which have a lithium or sodium electrode).

In the chemical cell according to the present invention, the driving member operates at the time of the abnormal reaction of the cell and cuts off conduction between the cell reaction portion and the pole terminals. Accordingly, it can stop the temperature rise, the occurrence of the gas and the progress of the abnormal cell reaction resulting from the abnormal current.

Since the retention mechanism reliably retains the current cut-off state described above, the accidental restart and progress of the reaction due to the flow of current between the poles does not occur.

In other words, the cell of the present invention is free from the problem with the prior art cell (Japanese Unexamined Patent Publication (Kokai) No. 57-67289) of the type which cuts off the current by the fall of the current collector rod due to its own weight in that the current again flows when the cell is turned upside down.

When the gas pressure inside the cell rises above a predetermined value, the gas emission member operates and discharges the gas to the outside. Accordingly, the danger of an explosion can be prevented in advance.

As described above, the present invention can provide a chemical cell equipped with a safety mechanism which can restrict the abnormal reaction of the cell and can prevent in advance a gas explosion of the cell, and so forth.

BRIEF DESCRIPTION OF THE DRAWINGS

The above and other objects, novel features and advantages of the present invention will become more apparent from the following description when taken in conjunction with the accompanying drawings.

FIG. 16 is a schematic view showing the production state of a pyramidal unit cell constituent element;

FIG. 17 is a perspective view of a pyramidal unit cell constituent element;

DESCRIPTION OF THE PREFERRED EMBODIMENT

Embodiment 1

A lithium secondary integrated cell device according to the first embodiment of the present invention will be explained with reference to FIGS. 1 to 7.

Figure 1:
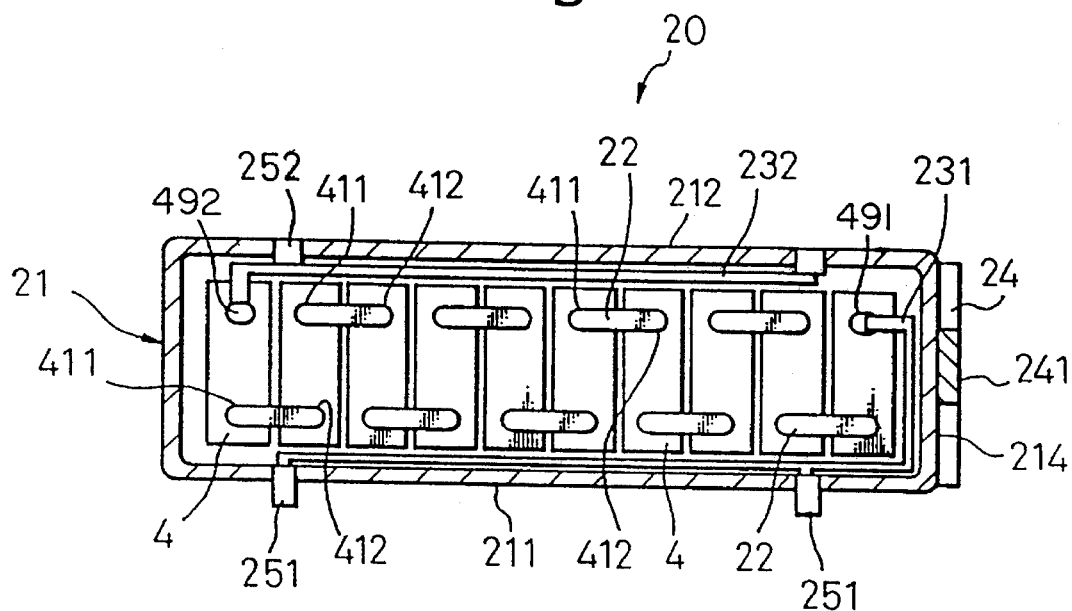
FIG. 1 is a plan view of a cell unit of an integrated cell according to embodiment 1.
Figure 2:
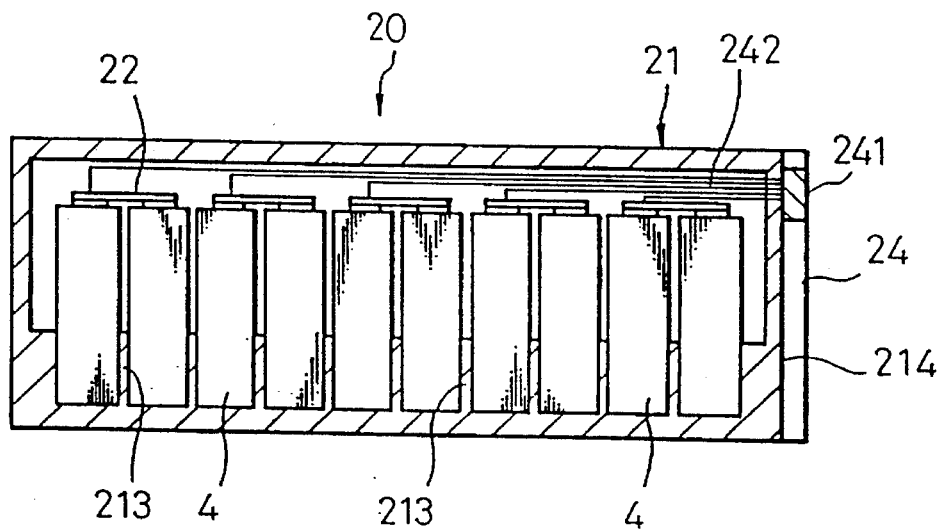
FIG. 2 is a front view of the cell unit of the integrated cell according to embodiment 1.

In this embodiment, a plurality of lithium secondary unit cells 4 are connected into a predetermined circuit and are integrated so as to form a cell unit 20 having positive and negative output terminals 251, 252 as shown in FIGS. 1 and 2.

Figure 3:
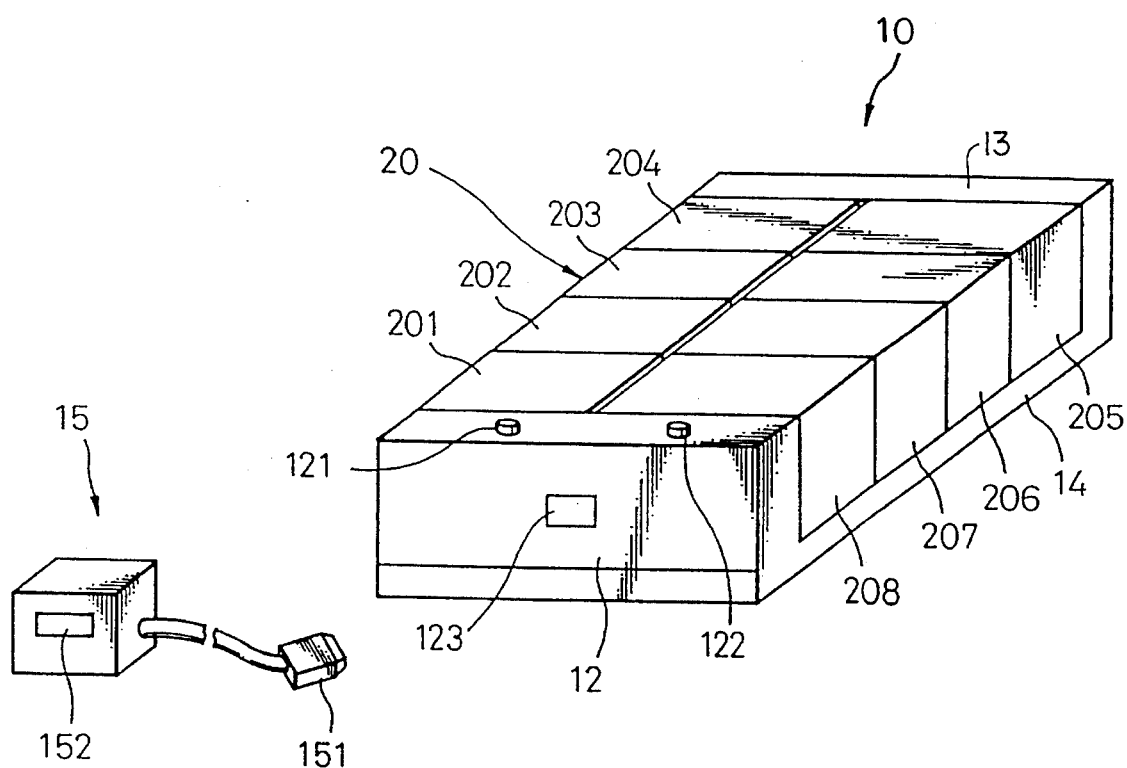
FIG. 3 is a perspective view of the integrated cell according to embodiment 1.

A plurality (201 to 208) of a single or a plurality of kinds of the cell units 20 described above are connected and are integrated as shown in FIG. 3 in order to obtain an integrated cell device 10 capable of providing a desired voltage and a desired current capacity.

In the cell unit 20, the positive output terminal 251 and the negative output terminal 252 are constituted by mutually detachable, male and female plug-in type terminals. The positive output terminal 251 and the negative output terminal 252 are dividedly fitted to the front surface 211 and the rear surface 212 as the opposed surfaces of the cell unit 20, respectively, as shown in FIG. 1. The male and female plug-in terminals are disposed at predetermined positions on the cell unit 20 so that when a plurality of cell units 20 are juxtaposed with one another, they can be connected to one another.

Hereinafter, the cell unit 20 will be explained in further detail.

The cell unit 20 in this embodiment is so arranged as to provide an output voltage of 30 V by connecting in series ten lithium secondary cells 4 each having an output voltage of 3 V, and the integrated cell device 10 is so arranged as to provide an output voltage of 240 V by connecting in series eight units of the cell units 20 described above.

As shown in FIGS. 1 and 2, ten unit cells 4 are accommodated in a unit case 21 made of a resin, of the cell unit 20, and each unit cell 4 is partitioned from others by a partition plate 213 (FIG. 2). These unit cells 4 are alternately arranged in such a manner that the positive terminals 411 and the negative terminals 412 of adjacent unit cells 4 are close to one another. The positive terminals 411 are electrically connected in series to the negative terminals 412 of the adjacent unit cells 4 by short-circuit plates 22 so as to constitute a series circuit.

Both terminal poles 491 and 492 of the series circuit of the unit cells 4 are connected to the positive output terminal 251 and the negative output terminal 252 of the cell unit 20 by output lines 231, 232, respectively.

Figure 5:
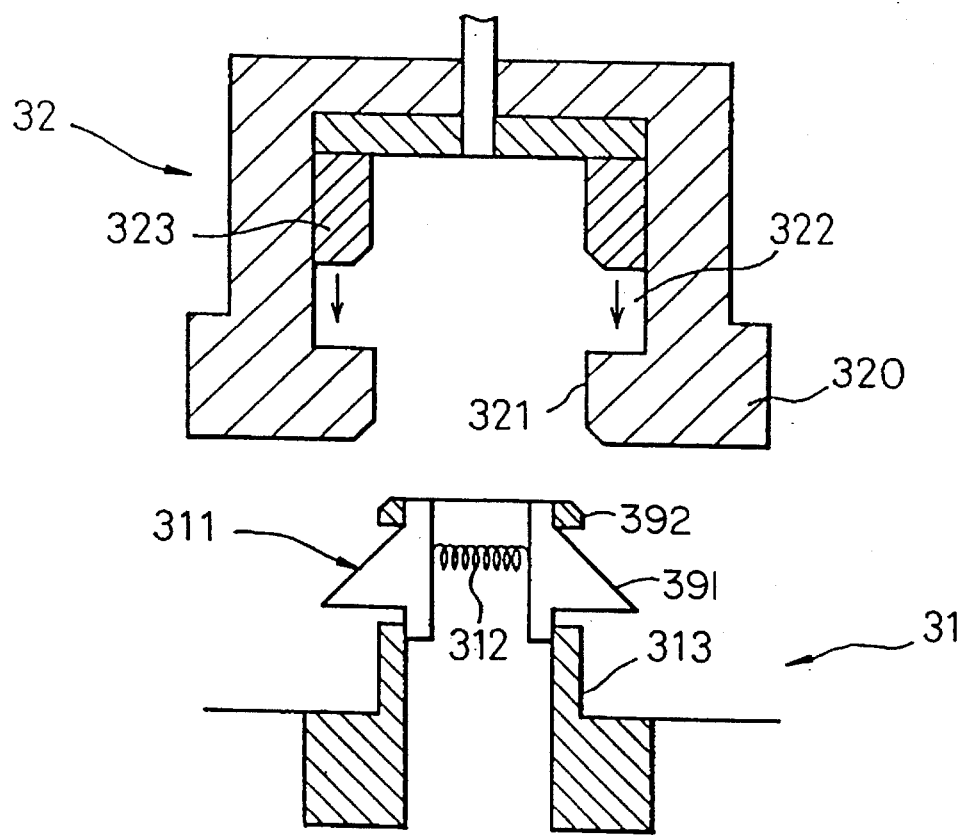
FIG. 5 is a plan view of a hook terminal of the integrated cell according to embodiment 1 before it is coupled.
Figure 6:
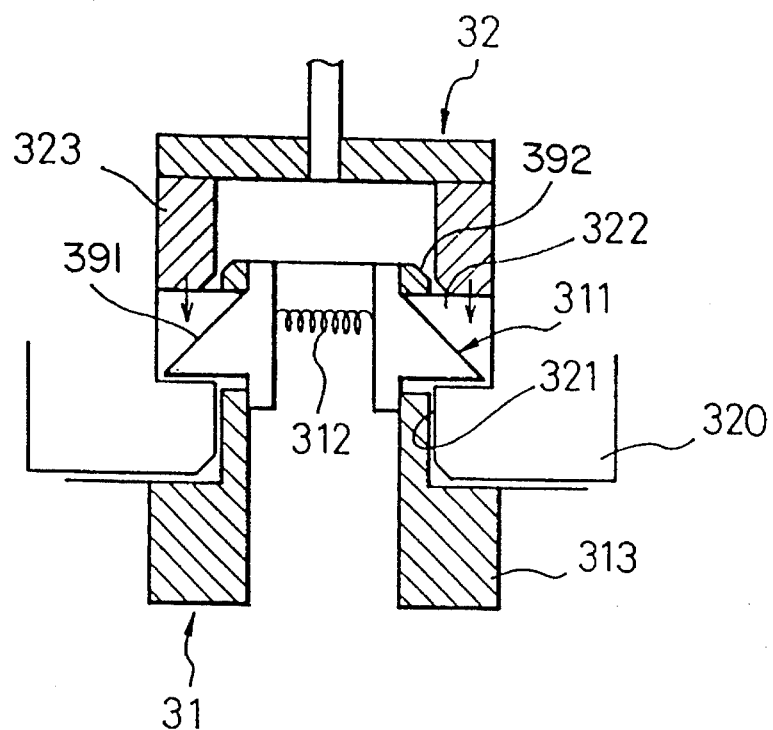
FIG. 6 is a plan view of the hook terminal of the integrated cell of embodiment 1 at the time of coupling.

The positive and negative output terminals 251, 252 of the cell units 20 are one-touch type hook terminals as shown in FIGS. 5 and 6.

The hook terminal comprises a male type plug terminal 31 and a female type jack terminal 32. The plug terminal 31 constitutes the positive output terminal 251, while the jack terminal 32 constitutes the negative output terminal 252.

As shown in FIG. 1, the plug terminal 31 is fitted to the front surface 211 of the cell unit 20 and the jack 10 terminal 32 is fitted to the corresponding position of the rear surface 212.

A hook 311 having a tapered face 391, which is tapered towards the distal end, is fitted to the distal end of the plug terminal 31 as shown in FIGS. 5 and 6, and is biased outward by a spring 312. When the plug terminal 31 is fitted into the jack terminal 32, the hook 311 of the plug terminal 31 contracts inward against the force of the spring 312 and penetrates into a narrow path 321 of the jack terminal 32.

When the hook 311 reaches a wide space 322 of the jack terminal 32, the hook 311 again expands outward and is engaged inside the wide space 322 of the jack terminal 32, as shown in FIG. 6.

The jack terminal 32 is provided with a restoring lever 323 which operates in the interlocking arrangement with a release button, not shown in the drawing. When the release button is operated, the restoring lever 323 moves towards the external side of the wide space 322 of the jack terminal 32 as indicated by arrows in FIGS. 5 and 6.

Then, action on the hook 311 of the plug terminal 31 causes the hook 311 to contract inward, so that the plug terminal 31 can be pulled out from the jack terminal 32.

By the way, the base 313 of the plug terminal 31 is connected to the positive output line of the cell unit 20, and an exterior decoration 320 of the jack terminal 32 is connected to the negative output line 232.

As shown in FIGS. 1 and 2, a check terminal board 24 is provided on the side surface 214 of the unit case 21 of the cell unit 20, and check terminals 241 are provided on this check terminal board 24. Check wires 242 connected to the positive and negative terminals 411, 412 of each unit cell 4 are connected to the check terminals 241, as shown in FIG. 2.

When a connector 151 of a later-appearing scan reader 15 is connected to the check terminal 241, the scan reader 15 can check each unit cell 4 while changing over its output voltage.

As shown in FIG. 3, the integrated cell device 10 is assembled by arranging eight cells 201 to 208 on a bottom plate 14 in two rows and four stages, and clamping them by the front panel 12 and the rear panel 13.

The cell units 201 to 204 of the lefthand row are arranged in such a manner that the negative output terminals 252 of the jack terminals 32 are positioned on the front panel 12 side and the positive output terminals 251 of the plug terminals 31 are positioned on the rear panel 13 side.

When the plug terminals 31 of the cell units 201 to 203 of the front cell units 201 to 203 are fitted into the jack terminals 32 of the rear cell units 202 to 204, the cell units 201 to 204 are connected in series.

On the other hand, the righthand cell units 205 to 208 have the plug terminals 31 as the positive output terminals 251 on the front panel 12 side and the jack terminals 32 as the negative output terminals on the rear panel 13 side, and they are connected in series.

Figure 4:
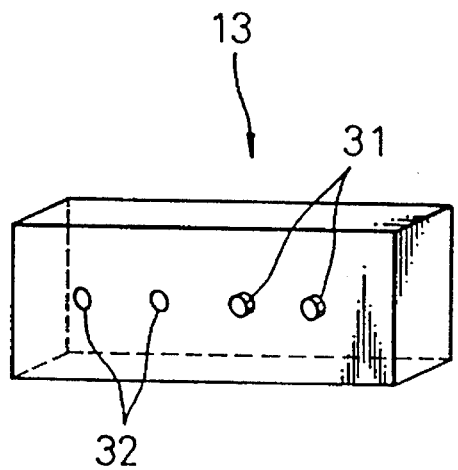
FIG. 4 is a perspective view of a rear panel of the integrated cell according to embodiment 1.

The rear panel 13 has the jack terminals 32 of the hook terminals on the left side and the plug terminals 31 on the right side, as shown in FIG. 4, and the jack terminals 32 and the plug terminals 31 are electrically connected with one another inside the panel.

On the other hand, the front panel 12 has the plug terminals 31 of the hook terminals on the left side and the jack terminals 32 on the right side (not shown), contrary to the arrangement of the rear panel 13.

When the front panel 12 and the rear panel 13 clamp the cell units 201 to 208 between them, the plug terminals 31 of both panels 12, 13 are connected to the jack terminals 32 of the cell units 201, 205, and the jack terminals 32 of both panels 12, 13 are connected to the plug terminals 31 of the cell units 204, 208.

As shown in FIG. 3, a negative (−) terminal 121 for output is disposed at the upper lefthand portion of the front panel 12 and is connected to the plug terminal 31 of the front panel 12 described above. A positive (+) terminal 122 for output is disposed on the upper righthand portion of the front panel 12 and is connected to the jack terminal 32 of the front panel 12.

A check terminal 123 is disposed on the front surface of the front panel 12 and is connected to each check terminal 241 of the cell units 201 to 208.

The check terminal 123 can be connected to the connector 151 of the scan reader 15, which will be described below.

The scan reader 15 reads and displays a voltage value of the unit cell 4, and checks the voltage of the unit cell 4 while sequentially scanning the address (eight channels) of the cell units 201 to 208 and the address (ten channels) of the unit cells 4 inside the cell unit. The scan reader 15 displays the address of the unit cell 4 exhibiting an abnormal voltage value and its voltage value on a display 152.

The cell case 42 (FIG. 7) as the exterior member of the unit cell 4 used in the integrated cell device 10 of this embodiment is in electrical conduction with the negative terminal 412 described above and at the same potential as the latter, and the following member as a safety device is interposed between this cell case 42 and the positive pole terminal 411.

Figure 7:
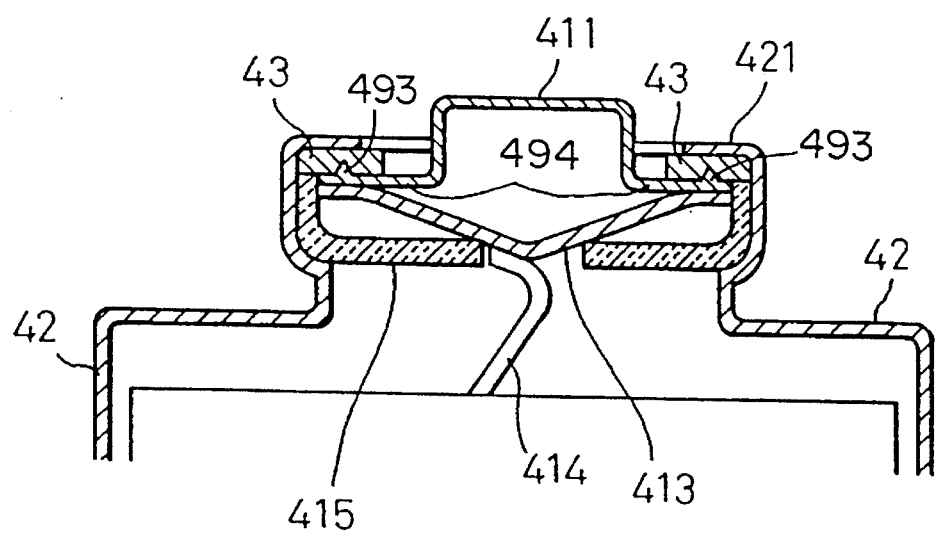
FIG. 7 is an explanatory view of a safety device of a unit cell of the integrated cell according to embodiment 1.

In other words, as shown in FIG. 7, a heat-softening or thermoplastic soluble insulating member 43 is interposed between the positive pole terminal 411 and the cell case 42, and a leaf spring 413 pushes the positive pole terminal 411 towards a convex edge portion 421 of the cell case 42 through the soluble insulating member 43.

The leaf spring 413 is connected to a lead wire 414, and the other end of this lead wire 414 is connected to the positive pole of the unit cell 4.

The soluble insulating member 43 is made of an insulating material which is softened and fused at a temperature of 120° to 150° C., and examples of such materials include a resin such as polypropylene, polyethylene, polycarbonate, urea, etc., or a composite material between a low temperature softening material such as nylon and an inorganic fiber such as a glass fiber.

When a material which is easily corroded by the electrolyte of the cell is used as the raw material of the soluble insulating material 43, contact with the electrolyte is cut off by the use of a safety valve, or the like, for example. By the way, reference numeral 415 in FIG. 7 denotes an ordinary insulating member which is highly resistant to heat, and reference numeral 493 denotes a contact protuberance disposed on the inner edge 494 of the positive pole terminal 411.

When the cell becomes abnormal and exothermy occurs, the non-return type safety valve, not shown, operates, allows the pressure to escape, and blocks conduction between the positive pole and the leaf spring 413. Then, the soluble insulating material 43 is fused, the protuberance 493 of the inner edge of the positive pole terminal 411 is pushed by the leaf spring 413 and comes into contact with the convex edge 494 portion 421 of the cell case 42, and a short circuit occurs between them. In other words, a series circuit for bypassing this abnormal unit cell 4 is formed inside the cell unit 20.

The overall voltage of the cell unit 20 drops by the voltage corresponding to the voltage (about 3 V) of this abnormal unit cell 4, but the cell unit 20 can as such continue its operation. Incidentally, in the case of the unit cell 4 equipped with the non-return type safety device according to the prior art, the positive and negative electrodes of the cell 4 are brought to the insulated state. Accordingly, the circuit of the cell unit 20 is in the cut-off state in this abnormal unit cell, and current does not flow through the series circuit to which this unit cell 4 is connected.

Next, the operation and effect of the integrated cell device 10 according to the present invention will be explained.

The integrated cell device 10 of this embodiment can be easily separated into the eight cell units 201 to 208 or can be easily assembled. For this reason, transportation and movement of the integrated cell device 10 as a whole can be carried out easily and manually by separating the cell units 201 to 208. (The weight of the cell is up to about 20 kg at most).

The assembly operation of the integrated cell device 10 comprising eighty unit cells 4 is divided into an operation for assembling the unit cells 4 into the cell unit 20 and an operation for assembling the cell units 20 into the integrated cell device 10, and each of these assembly operations can be easily carried out. Accordingly, assembly errors can be eliminated and division of labor can be realized. In other words, efficiency of the operation can be improved.

Since maintenance and inspection can be carried out for each cell unit 20, the operation can be simplified and facilitated, and errors can be reduced.

When a safety device and a protection device are provided for each cell unit 20, any trouble that may occur can be localized to an abnormal cell unit 20.

Further, the voltage and the capacity can be easily changed by changing the combination circuit of the cell units 20.

According to the embodiment described above, it is possible to obtain a lithium secondary integrated cell device having excellent portability and maintenance properties.

Embodiment 2

Figure 8:
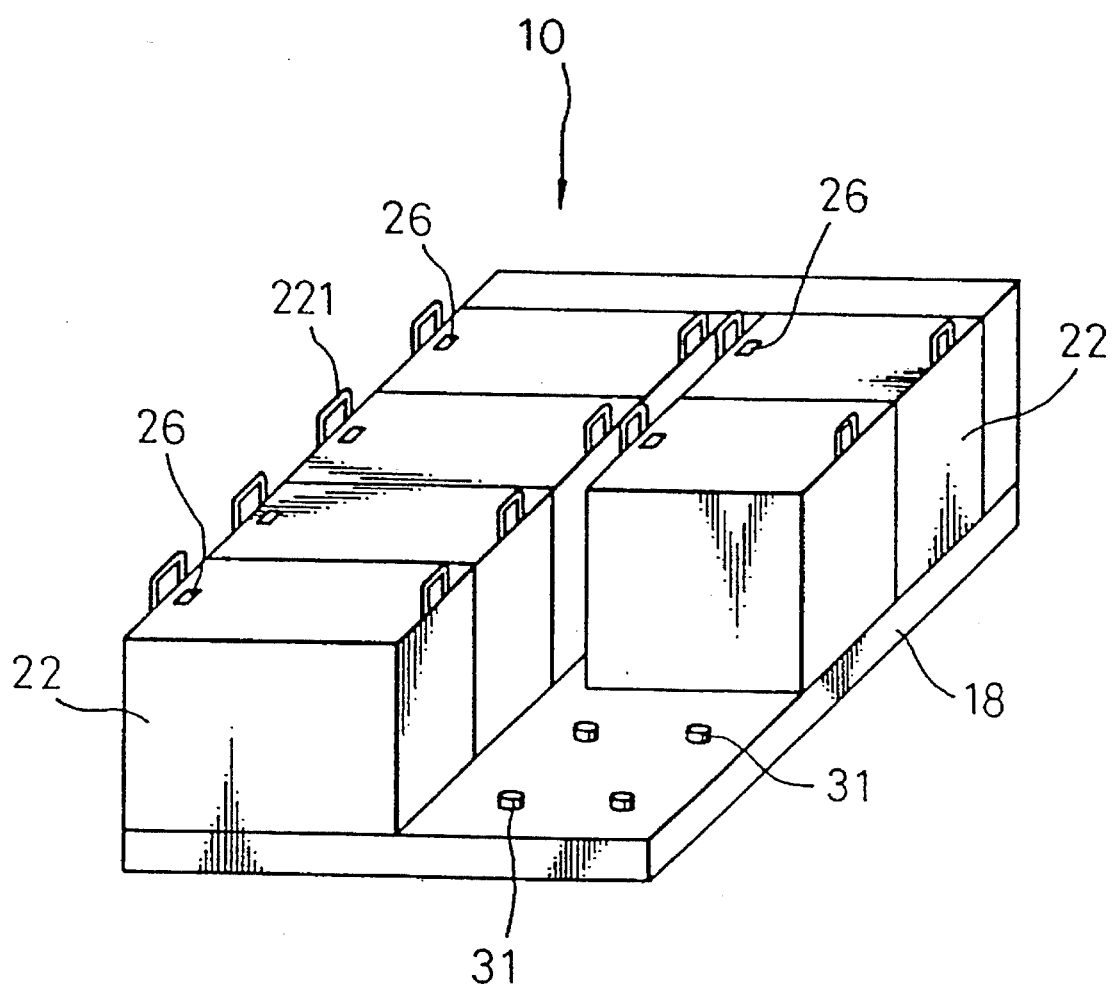
FIG. 8 is a perspective view of an integrated cell according to embodiment 2.

This embodiment represents the case where positive and negative output terminals (not shown in the drawing) consisting of hook terminals are provided on the bottom surface of the cell unit 22 of the first embodiment, and the cell unit 22 is positioned on the bottom panel 18 having the hook terminals, as shown in FIG. 8.

Jack terminals 32 (FIGS. 5 and 6) as the female type hook terminals to serve as the positive and negative output terminals are disposed on the bottom surface of the cell unit 22. Plug terminals 31 (FIGS. 5 and 6) as the male type hook terminals are disposed on the bottom panel 18.

When the cell unit 22 is placed on the bottom panel 13, the jack terminals 32 of the cell unit 22 are connected to the plug terminals 31 of the bottom panel 18. Connection bars (not shown) between the plug terminals 31, which connection bars are disposed inside the bottom panel 18, form the series circuit of the cell unit 22.

The release button 26 of the hook terminal is disposed on the upper surface of the cell unit 22. When this release button 26 is manipulated, the jack terminal 32 of the cell unit 22 can be released from the plug terminal 31 of the bottom panel 18 (see FIGS. 5 and 6). In FIG. 8, reference numeral 221 denotes a handle for transporting the cell unit 22.

The rest of the construction is the same as that of the first embodiment, and the same effect can be obtained.

Embodiment 3

This embodiment represents the case where a shape memory alloy is used as the safety device of the unit cell in Embodiments 1 and 2 in place of the fusible insulating material 43 described already.

Figure 9:
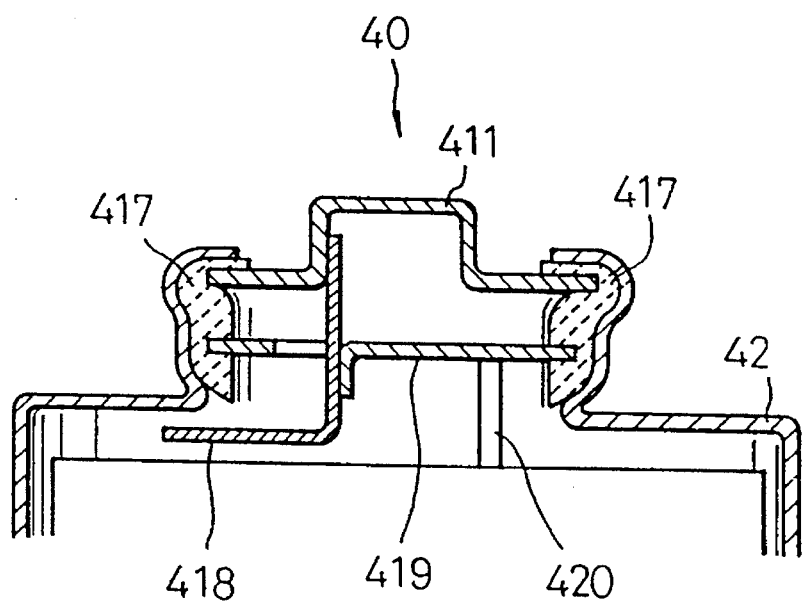
FIG. 9 is an explanatory view of a safety device (at a normal time) of a unit cell of an integrated cell according to embodiment 3.
Figure 10:
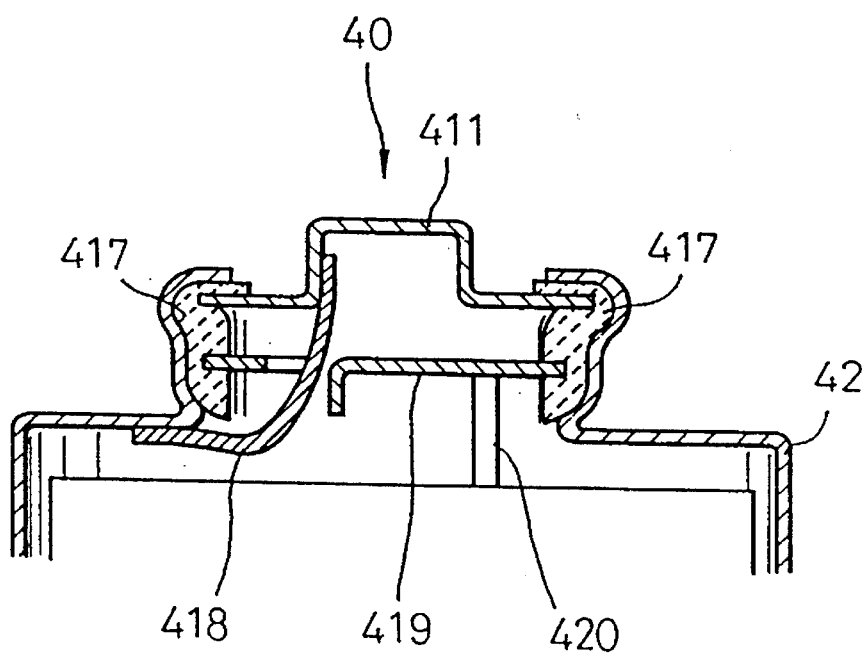
FIG. 10 is an explanatory view of the safety device (at the time of the operation) of the unit cell of the integrated cell according to the embodiment 3.

In the unit cell 40 of this embodiment, the cell case 42 and the positive pole terminal 411 are electrically insulated from each other by an ordinary insulating member 417 as shown in FIGS. 9 and 10. A first contact plate 418 made of a shape memory alloy is fitted to the positive pole terminal 411, and a lead 420 connected to the positive pole of the unit cell 40 is fitted to a second contact plate 419.

Under normal conditions below 150° C., the second contact plate 419 is in contact with the first contact plate 418 as shown in FIG. 9, and the first contact plate 418 is out of contact with the cell case 42. Accordingly, the lead 420 of the unit cell 40 is conductive with the positive pole terminal 411 but is insulated from the cell case 42.

On the other hand, when the internal temperature of the cell exceeds 150° C., the first contact plate 418 undergoes deformation as shown in FIG. 10 on the basis of the shape memory function.

Then, the second contact plate 419 is separated from the first contact plate 418 into the insulated state, while the first contact plate 418 comes into contact with the cell case 42.

Accordingly, the positive pole terminal 411 and the cell case 42 (positive pole) become conductive and are short-circuited with each other, and the unit cell 40 exhibiting exothermy and becoming abnormal is brought into the bypass state in the same way as in the first embodiment.

In this way, the safety device in this embodiment can obtain the same effect as that of the safety device of the first embodiment using the fusible insulating material 43.

The rest of the construction is the same as that of the first or second embodiment.

Although the integrated cell device is formed by disposing the cell units on the bottom plate 14, 18 as described above, the present invention is not particularly limited to this arrangement. For example, the cell units may be directly connected to one another by omitting the bottom plates 14, 18.

Embodiment 4

Figure 11:
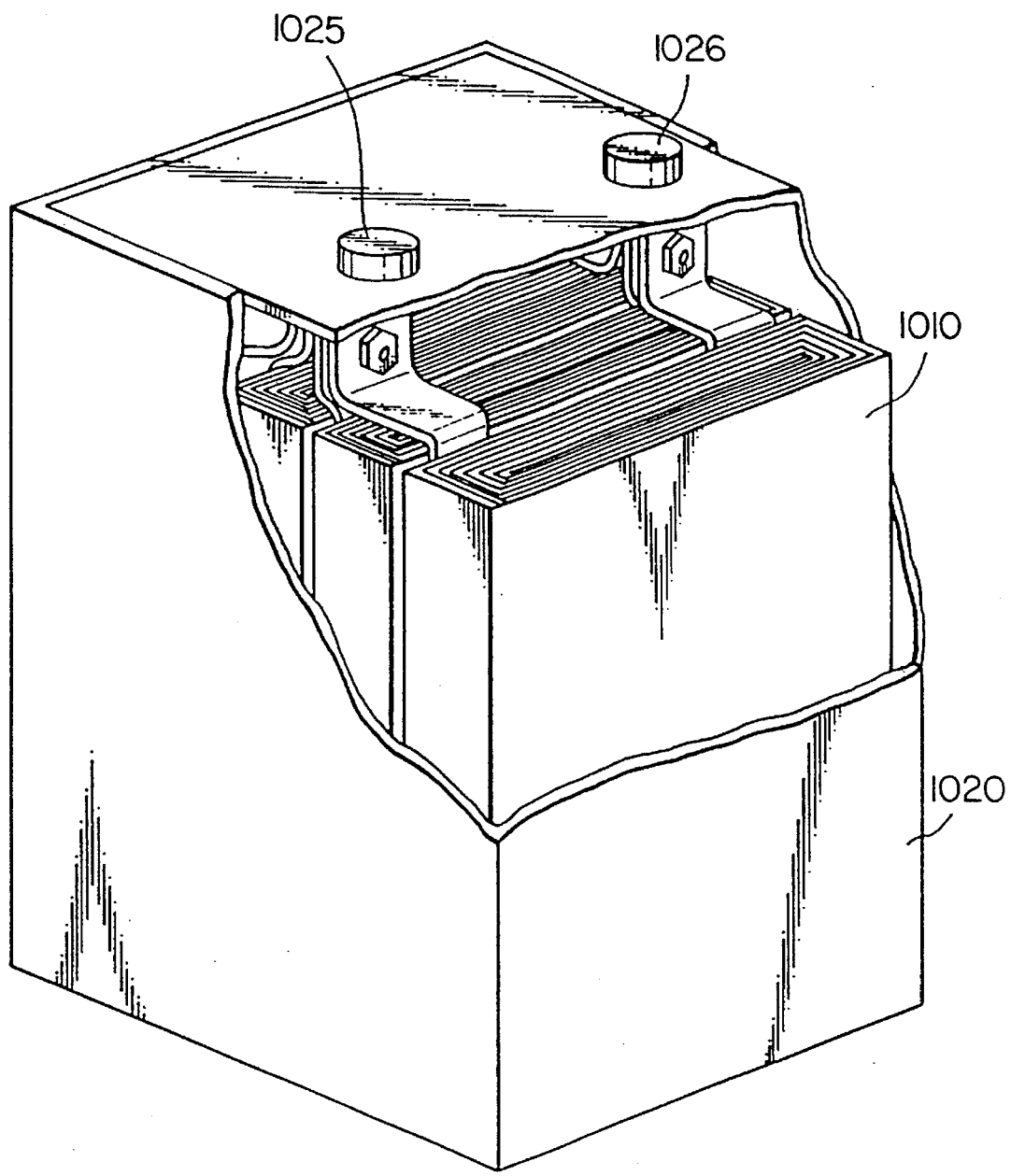
FIG. 11 is a partially cut-away perspective view of a square secondary cell according to embodiment 4.
Figure 12:
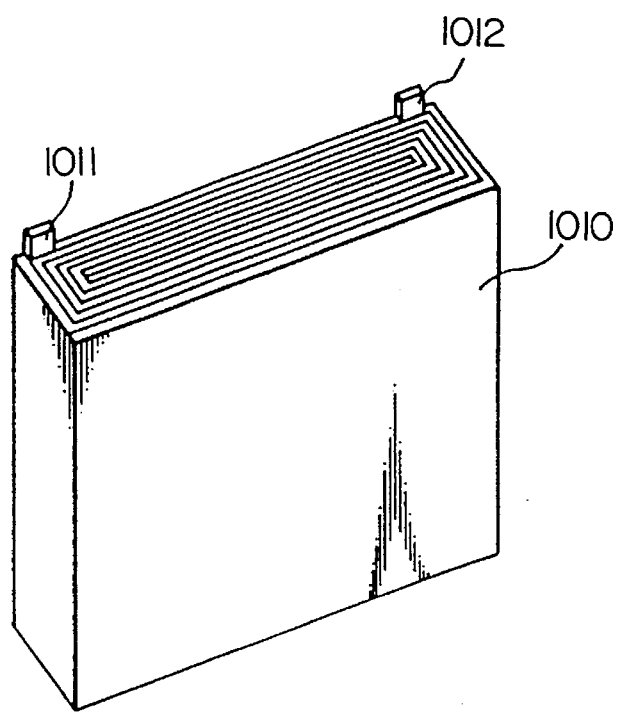
FIG. 12 is a perspective view showing a unit cell constituent element of the secondary cell according to embodiment 4.
Figure 13:
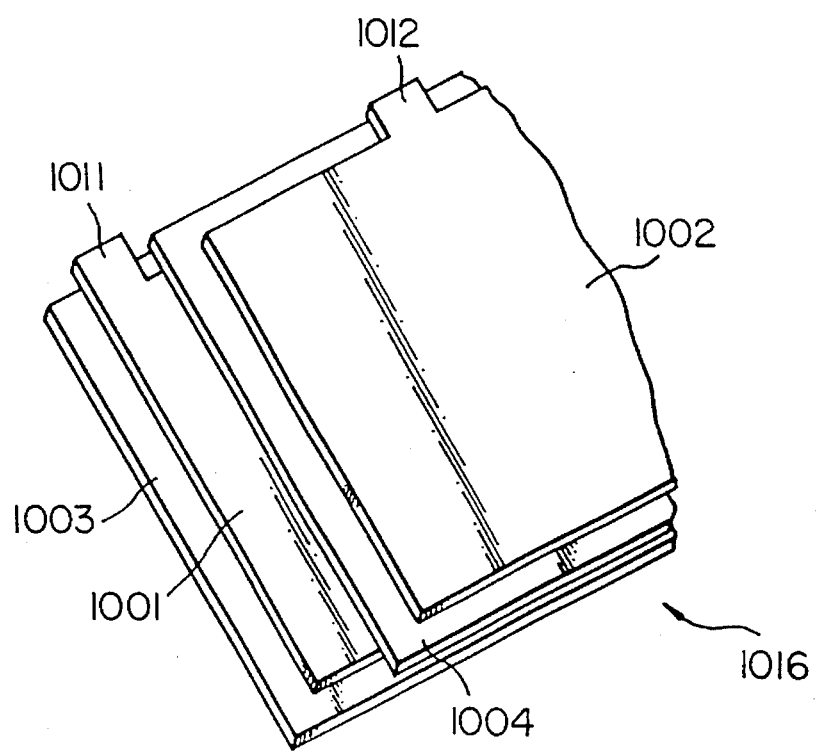
FIG. 13 is a partial perspective view showing a lamination state of a unit laminate sheet.

FIG. 11 is a partial cut-away perspective view of a square secondary cell according to this embodiment. This square secondary cell is a lithium secondary cell and is produced by storing five unit cell constituent elements 1010 in the cell case 1020. Each unit cell constituent element 1010 is connected in parallel and is connected to the positive pole 1025 and to the negative pole 1026. The unit cell constituent element 1010 is a thin rectangular member having a small width as shown in FIG. 12, and comprises a first separator sheet 1003, a positive pole active material sheet 1001 laminated on the first separator sheet 1003 in such a manner as to be somewhat deviated in a longitudinal direction, and a second separator sheet 1004 and a negative pole active material sheet 1002, that together constitute a unit laminate sheet 1016, as shown in FIG. 13. By the way, the first and second separator sheets 1003 and 1004 are impregnated with the electrolyte. This electrolyte is of a non-aqueous type which is prepared by dissolving $LiClO_4$ in propylene carbonate or diethyl carbonate.

The first separator sheet 1003 consists of a porous film made of polypropylene, and has an elongated belt shape. The positive pole active material 1001 uses a 20 to 15 μm-thick aluminum foil as a substrate having a positive pole agent consisting of $LiMn_2O_4$, a conductive agent and a binder deposited on both surfaces of the substrate to a thickness of about 100 μm. The terminal portion 1011 is formed at one of the end portions of this substrate. The second separator sheet 1004 is made of the same material and has the same shape as the first separator sheet 1003. As shown in FIG. 13, the second separator sheet 1004 is laminated on the positive pole active material sheet 1001 in such a manner as to be somewhat deviated in the longitudinal direction. The negative pole active material sheet 1002 consists of a 50 to 100 μm-thick metallic lithium foil and has an elongated belt shape having the same thickness as the positive pole active material sheet 1001. The material sheet is so disposed on the second separator sheet 1004 as to be somewhat deviated in the longitudinal direction.

Figure 14:
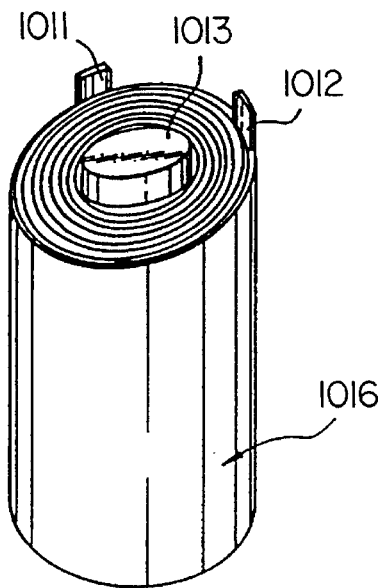
FIG. 14 is a perspective view showing the production state of a cylindrical unit laminate sheet.
Figure 15:
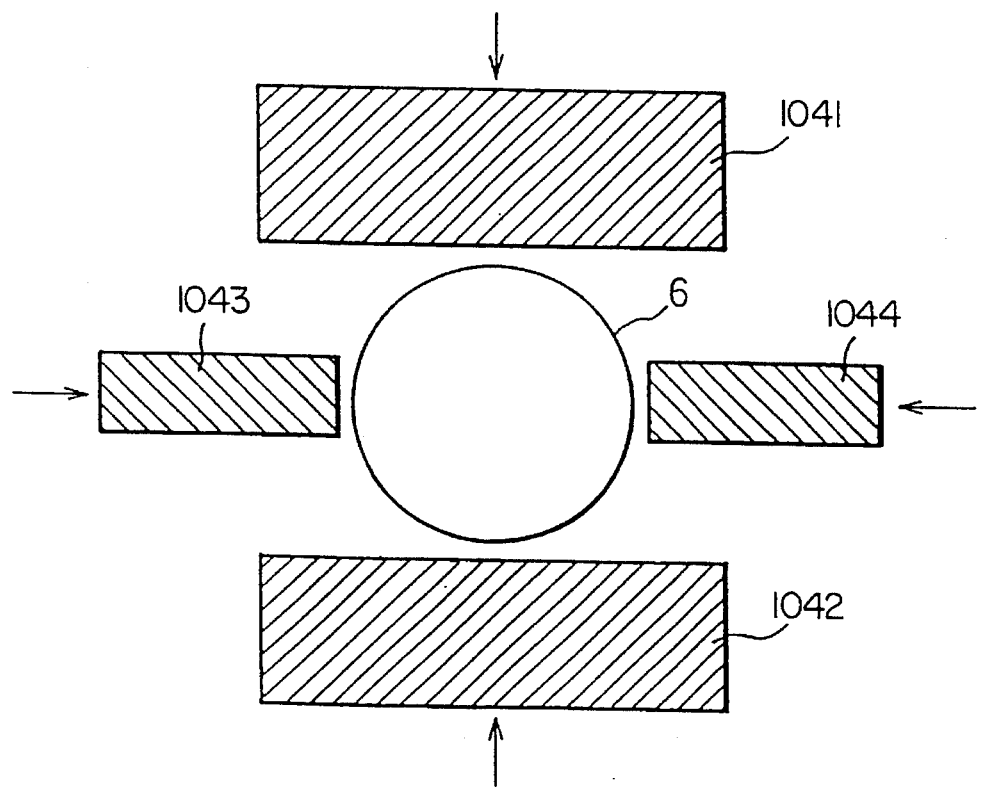
FIG. 15 is a schematic view showing the production state of a sheet-like unit cell constituent element.

As shown in FIG. 14, this unit laminate sheet 1016 is wound on the outer peripheral surface of a cylindrical core 1013, and after the core 13 is thereafter withdrawn, the sheet is shaped into a cylindrical shape. The unit laminate sheet 1016 wound into the cylindrical shape in this way is first greatly compressed by push plates 1041, 1042 from the transverse direction as shown in FIG. 15 and then from the orthogonal direction by push plates 1043, 1044, into a thick sheet-like rectangular member as the unit cell constituent element 1010. By the way, since the positive pole active material sheet 1001 and the negative pole active material sheet 1002 are smaller in height than the first and second separator sheets 1003, 1004, the upper and lower ends of these sheets 1001, 1002 after they are shaped into the unit cell constituent element 1010 are covered with the first and second separator sheets 1003, 1004 and do not protrude to the outer surface of the unit cell constituent element 1010 with the exception of their terminal portions 1011, 1012.

The lithium square secondary cell according to this embodiment is produced in the way described above.

Since the unit cell constituent element 1010 is rectangular as shown in FIG. 12, the lithium square secondary cell can be compactly accommodated in the cell case 1020 having the rectangular space without leaving any excessive space as shown in FIG. 11. Further, since the unit cell constituent element 1010 itself is compressed, no excessive space exists between the sheets, and they are compactly compressed. Accordingly, the lithium square secondary cell according to this embodiment has an extremely high volume energy density.

The unit cell constituent element 1010 used in this embodiment is formed by compressing the unit laminate sheet 1016 having the cylindrical shape. Accordingly, the shape retaining property for retaining the rectangular shape is excellent. To further improve this shape retaining property, however, it is also possbole to put a thermo-shrinkable plastic tube round the outer peripheral surface of the unit cell constituent element 1010 and then to cause thermal shrinkage so as to bring the plastic tube into tight contact with the outer peripheral surface of the unit constituent element 1010.

Figure 18:
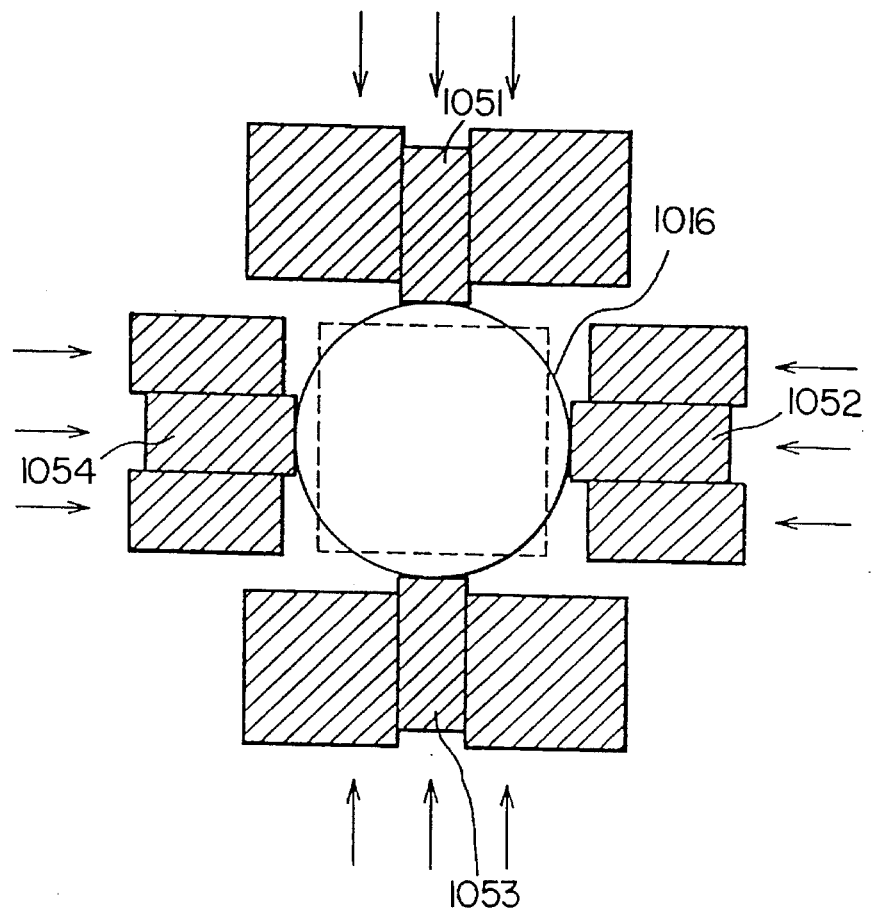
FIG. 18 is a schematic view showing another production state of the pyramidal unit cell constituent element.

The shape of the unit cell constituent element is not particularly limited to the thick sheet of this embodiment. It is possible, for example, to wind the unit laminate sheet 1016 into the cylindrical shape without using the core, then to compress it from four directions by the push plates 1045, 1046, 1047, 1048 as shown in FIG. 16, and to obtain the pyramidal unit cell constituent element 1006 shown in FIG. 17. As one of the compression methods, it is possible to first compress the center at four portions by the push plates 1051, 1052, 1053, 1054 and then to compress from all sides by the push plates with the remaining push plates in two stages, as shown in FIG. 18.

Figure 19:
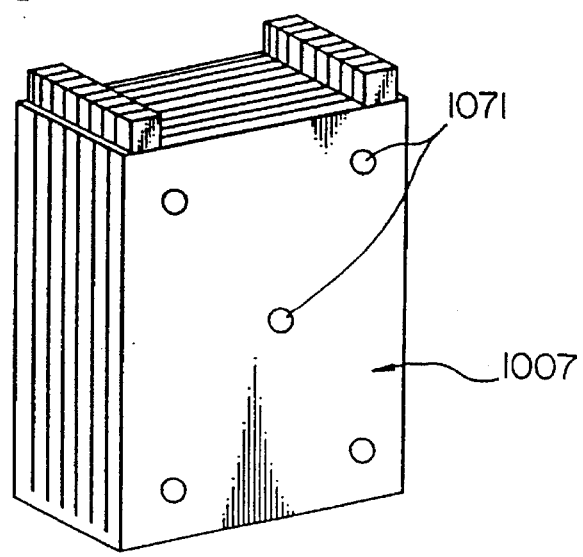
FIG. 19 is a perspective view showing another sheet-like unit cell constituent element.

A constituent element 1007 shown in FIG. 19 can also be employed as another unit cell constituent element 1007. In this unit cell constituent element 1007, a unit laminate sheet is formed by putting, one upon another, a substantially square separator sheet having five through-holes at the positions corresponding to fixing pins 1071 shown in FIG. 19, and positive and negative pole active material sheets which are substantially square, and have a size a little smaller than the separator sheet and five through-holes. After a plurality of such unit laminate sheets are laminated, separator sheets are finally laminated, and in this state, the resulting laminate is compressed in the direction of lamination. While the laminate is kept compressed, the pins 1071, which are plastic, are fitted into the through-holes and are then caulked so as to maintain the compressed state of the laminate sheet.

Figure 20:
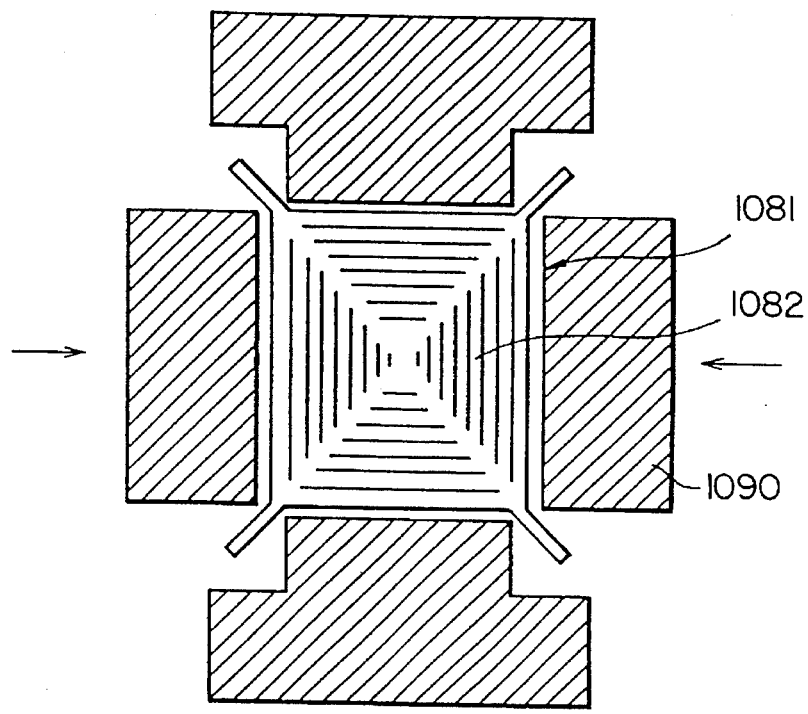
FIG. 20 is a schematic view showing a production state of a pyramidal unit cell constituent element and a cell case.
Figure 21:
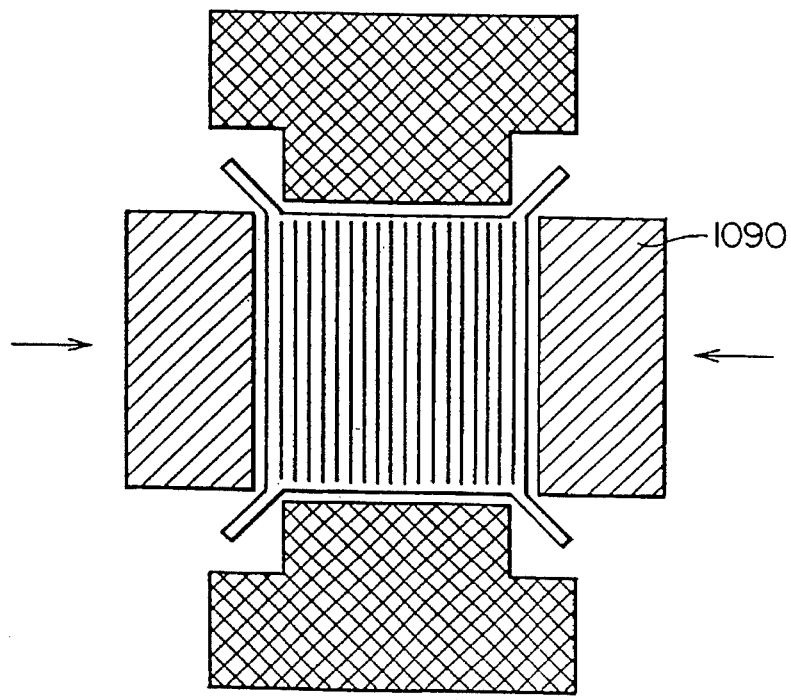
FIG. 21 is a schematic view showing another production state of the pyramidal unit cell constituent element and the cell case.

The square secondary cell produced by the method shown in FIG. 20 can be cited as the square secondary cell according to still another embodiment. This secondary cell is produced by a method which is similar to the method of producing the unit cell constituent element 1016 shown in FIG. 17. Namely, the unit laminate sheet wound into the cylindrical shape is stored in an angular tube 1081 made of a metal, and the cylindrical unit laminate sheet is then compressed with this metal an angular tube 1081 by push plates 1090 from four sides into the pyramidal shape. In this manner, the pyramidal shape having a smaller size can be obtained, and a cell case, not shown, can be formed by bending the portions protruding from the four corners along the walls of the angular tube and further welding the metallic cover and bottom to the upper and lower ends of the angular tube, respectively. The pyramidal unit cell constituent element 1082 is accommodated in this cell case.

In the embodiment described above, the cylindrical unit laminate sheet is compressed into the cylindrical shape by the push plates 1090, but it is also possible to laminate a plurality of unit laminate sheets and then to compress and mold them into the cylindrical shape by the push plates 1090. According to this production method, driving of the push plates needs to be done from only two directions.

In the square secondary cell of the present invention, the unnecessary space between the unit laminate sheets is eliminated. Accordingly, the unit cell constituent element is extremely compressed and compacted, and volume energy efficiency is high. Moreover, since the unit cell constituent element has a rectangular shape, the cell itself can be shaped into a square shape, and a plurality of cells can be compactly integrated without defining unnecessary spaces between them.

Embodiment 5

A wind-up type lithium cell according to this embodiment will be explained with reference to FIGS. 22 to 26.

Figure 22:
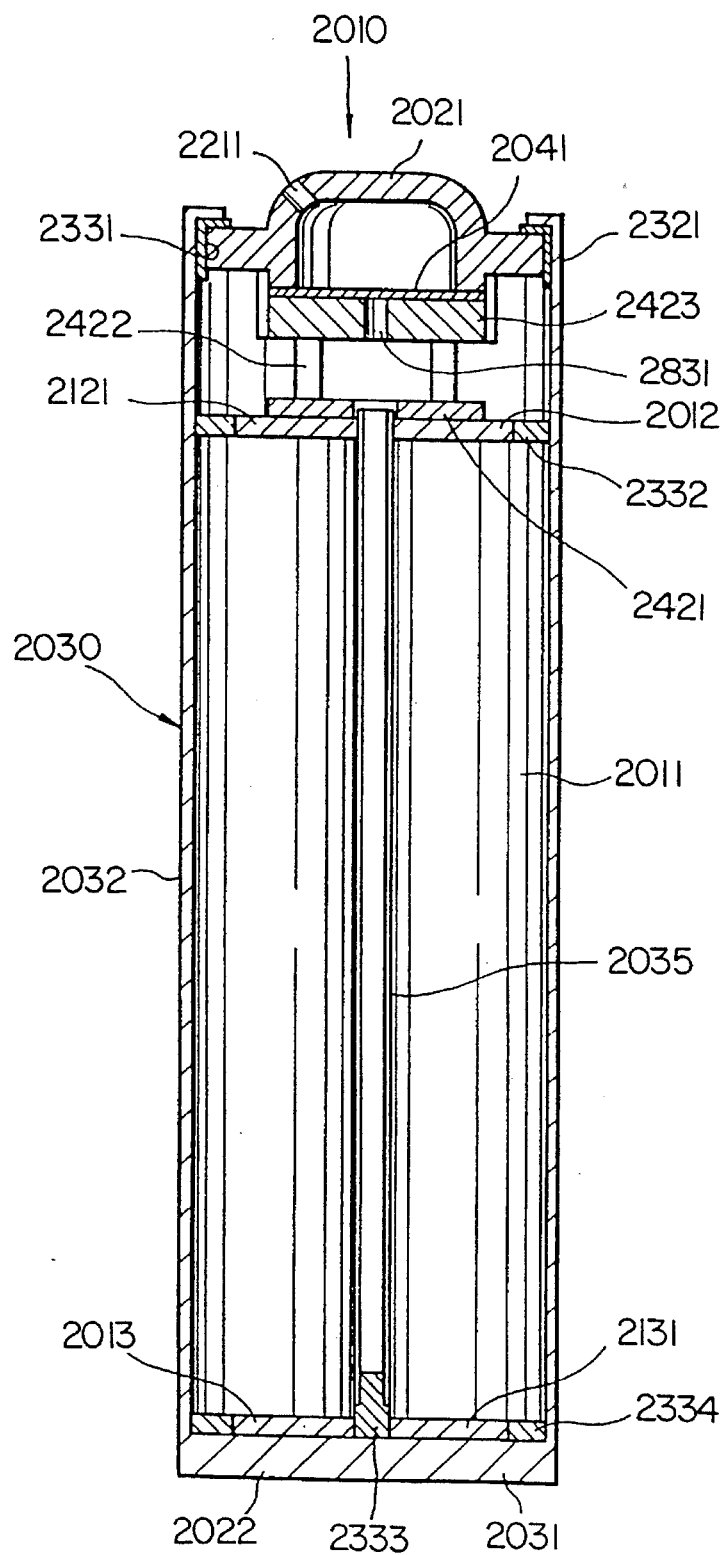
FIG. 22 is a sectional view of a wound cell according to embodiment 5.

In this embodiment, this sheet-like positive and negative electrode plates are wound while interposing a separator between them, in such a manner as to form an electrode roll, and electrodes 2012 and 2013 of this electrode roll 2011 are connected to terminals 2021, 2022 formed on the upper and lower surfaces of the case 2030 as shown in FIG. 22, respectively, so as to form a wind-up type cell 2010.

Figure 23A:
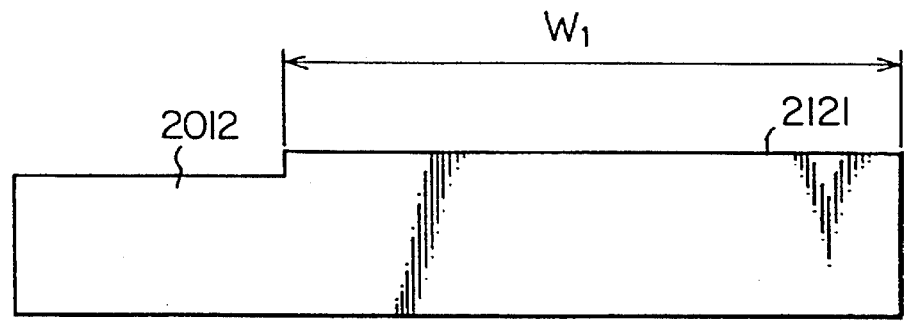
FIGS. 23(a) and (b) are expanded view of a positive electrode plate (a) and a negative electrode plate (b) according to embodiment 5.
Figure 23B:
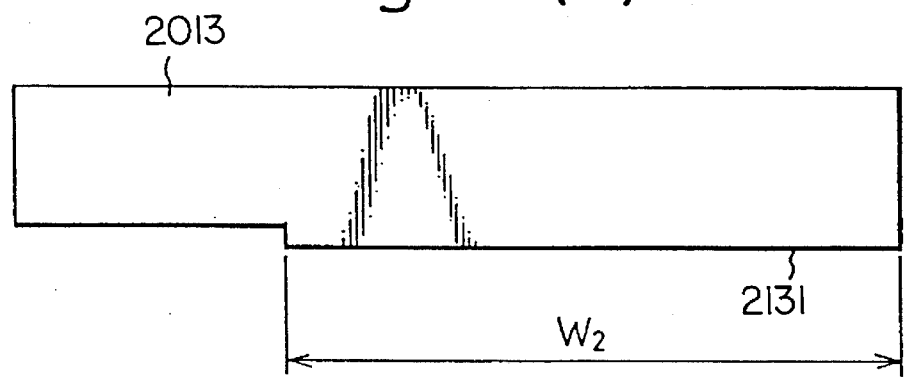

In both of the electrode plates 2012, 2013 of the electrode roll 11 described above, an expanded portion 2121 is formed at at least a part of the positive electrode plate 2012 in such a manner as to protrude above the negative electrode plate 2013 while an expanded portion 2131 is formed at at least a part of the negative electrode plate 2013 in such a manner as to protrude below the positive electrode plate 2012, as shown in FIGS. 23(*a*) and (*b*) and 24.

As shown in FIG. 22, the upper expanded portion 2121 is electrically connected to the positive pole terminal 2121 on the upper surface, while the lower expanded portion 2131 is electrically connected to the negative pole terminal 2022 of the lower surface.

Next, each of these members will be explained in further detail.

Figure 25:
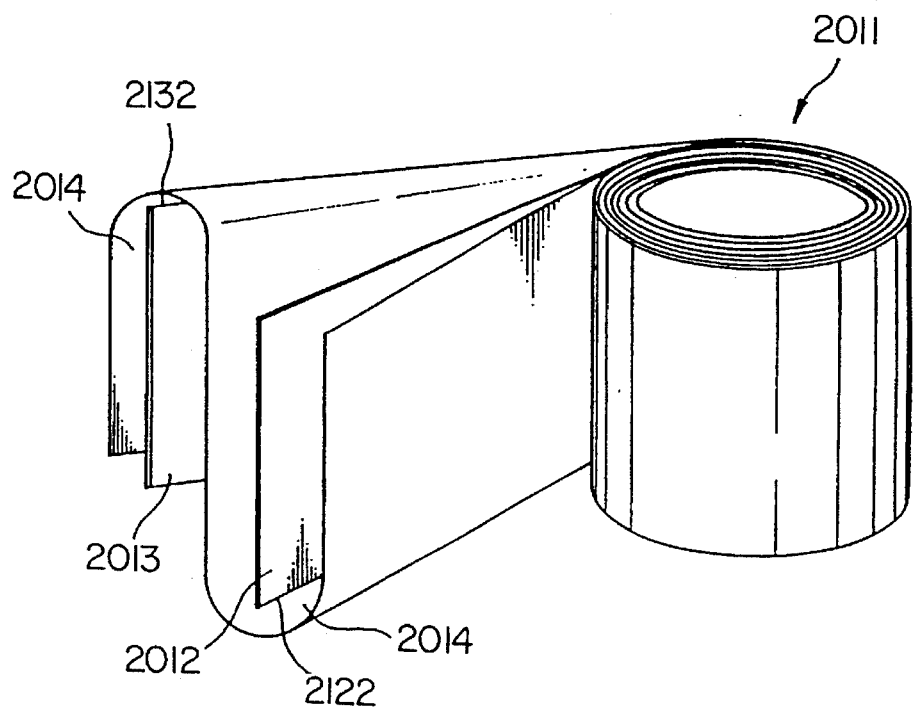
FIG. 25 is an explanatory view of winding of an electrode roll according to embodiment 5.

The electrode roll 2011 is formed by winding the thin sheet-like positive and negative electrode plates 2012, 2013 while interposing the separator 2014 between them as shown in FIG. 25.

The separator 2014 is a zigzag sheet formed by bending back one continuous sheet at the lower end 2122 of the positive electrode plate 2012 and at the upper end 2132 of the negative electrode plate 2013 in such a manner as to cover both surfaces of both electrode plates 2012, 2013.

Figure 26:
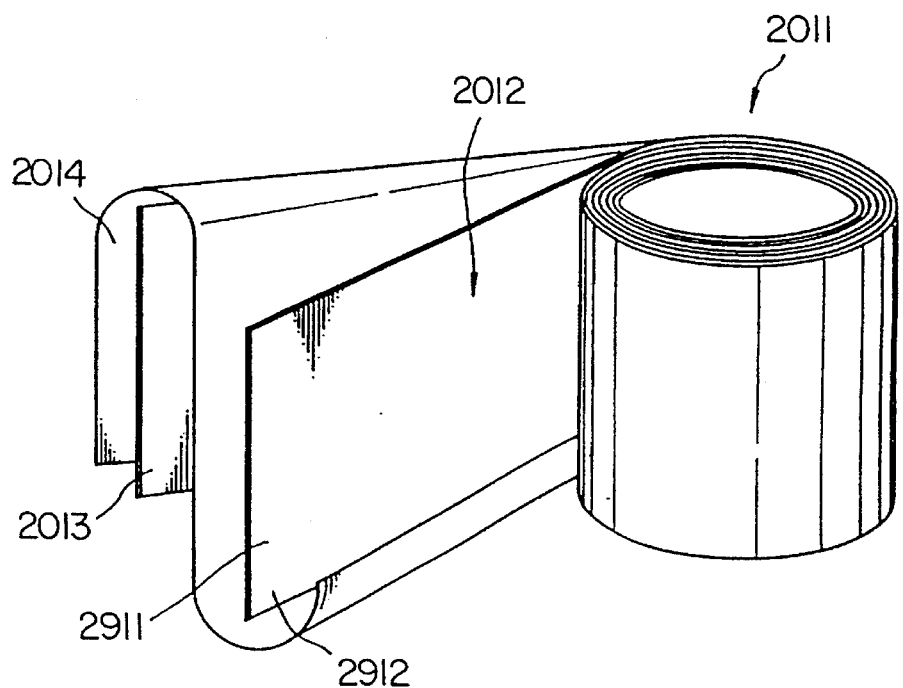
FIG. 26 is an explanatory view of winding of another electorate roll according to embodiment 5.

The separator 2014 may cover only the end face 2912 of the side surface 2911 on the outside of one electrode plate 2012 as shown in FIG. 26.

As shown in FIG. 23, the expanded portions 2121, 2131 are formed at the upper portion of the positive electrode plate 2012 and at the lower portion of the negative electrode plate 2013 at which the separator 2014 is not folded back (with the proviso that the expanded portions are not shown in FIGS. 25 and 26).

Figure 24:
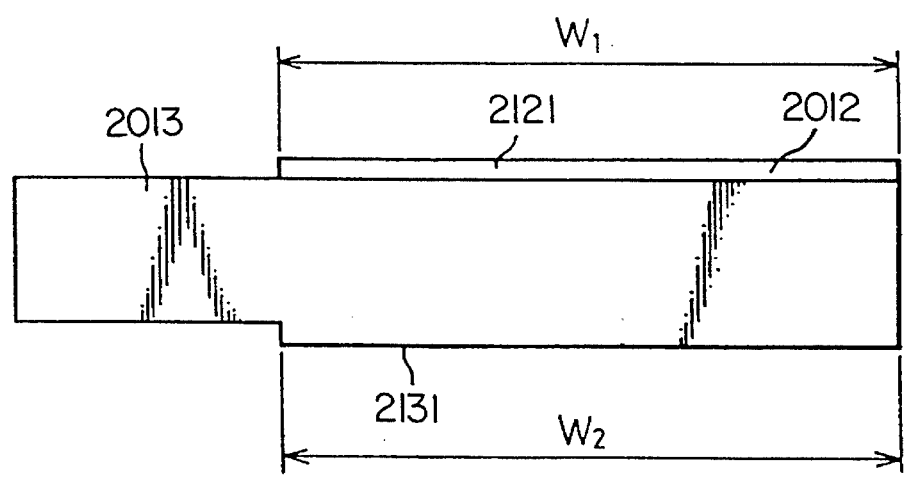
FIG. 24 is an expanded view wherein the positive and negative electrode plates according to embodiment 5 are laminated.

Accordingly, when both electrode plates 2012, 2013 are put one upon another, the expanded portions 2121, 2131 protrude from the upper and lower portions, as shown in FIG. 24.

As shown in FIG. 22, the expanded portions 2121, 2131 constituting a part of the electrode plates 2012, 2013 are exposed on the upper and lower surfaces of the electrode roll 2011 formed by winding both electrode plates 2012, 2013 while interposing the separator 2014 between them.

The electrode roll 2011 described above is accommodated in the cylindrical case 2030 and forms the wind-up type cell 2010 as shown in FIG. 22.

The wind-up type cell 2010 includes the cylindrical case 2010 functioning also as the negative pole terminal 2022, the electrode roll 2001, the positive pole terminal 2021 and a reinforcing core rod 2035 kept at the same potential as the positive electrode plate 2012.

The positive pole terminal 2021 forms the upper cover of the wind-up type cell 2010, and is fitted to the upper end 2321 of the drum portion 2032 of the case 2030 through an insulating ring 2331. The positive pole terminal 2021 is electrically connected to the expanded portion 2121 of the positive electrode plate 2012 through a conductor plate 2423, a connecting member 2422 and a current collector plate 2421.

The upper expanded portion 2121 and the current collector plate 2421 are connected to each other by welding or brazing.

The upper expanded portion 2121 need not be insulated from the core rod 2035, but is insulated from the drum portion 2321 of the case 2030 through an insulating plate 332.

Exhaust ports 2211, 2831 are bored at the side portion of the positive pole terminal 2021 and at the center of the conductor plate 2423 so as to exhaust a gas when any abnormality occurs in the cell, and a thin sheet-like safety valve 2041 for preventing intrusion of external air during the normal operation is provided at the upper surface of the conductor plate 2423.

The safety valve 2041 is broken when the pressure of the internal gas generated from the cell exceeds a predetermined value, and the lower exhaust port 2831 is opened, so that the resulting gas is exhausted from the upper exhaust port 2211.

On the other hand, the lower expanded portion 2131 of the electrode roll 2011 is bonded to the bottom 2031 of the case 2030 by welding or brazing. An insulating member 2333 is interposed between the bottom 2031 of the case 2030 and the core rod 2035.

An insulating sheet 2334 is sandwiched between the bottom 2031 and the lower portion of the electrode roll 2011 so as to insulate the positive electrode plate 2012 from the bottom 2031.

Next, the function and effect of this embodiment will be described.

In the wind-up type cell 2010 according to this embodiment, the electrode plates 2012, 2013 of the electrode roll 2011 have the expanded portions 2121, 2131, respectively, and these expanded portions are connected to the current collector plate 2421 or the bottom 2031 of the case 2030.

Accordingly, lead plates that have been necessary in the prior art cells need not be provided for the electrode plates 2012, 2013, and the number of necessary components is smaller.

Since the expanded portions 2121, 2131 can be produced simultaneously with molding of the electrode plates 2012, 2013, they can be produced at a low production cost.

The expanded portions 2121, 2131 can secure a sufficiently large width W as shown in FIGS. 23(a) and (b). Accordingly, the internal resistance of the electrode plates 2012, 2013 and the connection resistance between the electrode plates 2012, 2013 and the pole terminals 2021, 2022 becomes smaller, and the internal resistance of the cell can be reduced as a whole.

For these reasons, internal exothermicity (Joule heat) and the drop of the internal voltage can be restricted.

The expanded portions 2121, 2131 are not linear unlike the leads of the prior art cells but can be shaped into a large width as shown in FIG. 22. Accordingly, their bonding work can be carried out easily.

The zigzag separator 2014 of the electrode roll 2011 covers the electrode plates 2012, 2013 in such a manner as to wrap one of the ends of each electrode plate 2012, 2013 as shown in FIGS. 25 and 26. Accordingly, the positive and negative electrode plates 2012, 2013 do not come into mutual contact, and insulation between them is not reduced, either.

In other words, according to the method of the prior art which interposes a belt-like separator between the electrode plates 2012 and 2013 without folding back the separator, the separator is likely to deviate up and down or the electrodes 2012, 2013 are likely to come into mutual contact and reduce the insulation property, but this embodiment is free from such problems.

As described above, this embodiment can provide the wind-up cell 2010 which has a low internal electrode resistance and has lead extension portions which can be assembled easily.

Embodiment 6

The wind-up type lithium cell according to this embodiment will be explained next with reference to FIGS. 27 and 28.

Figure 27:
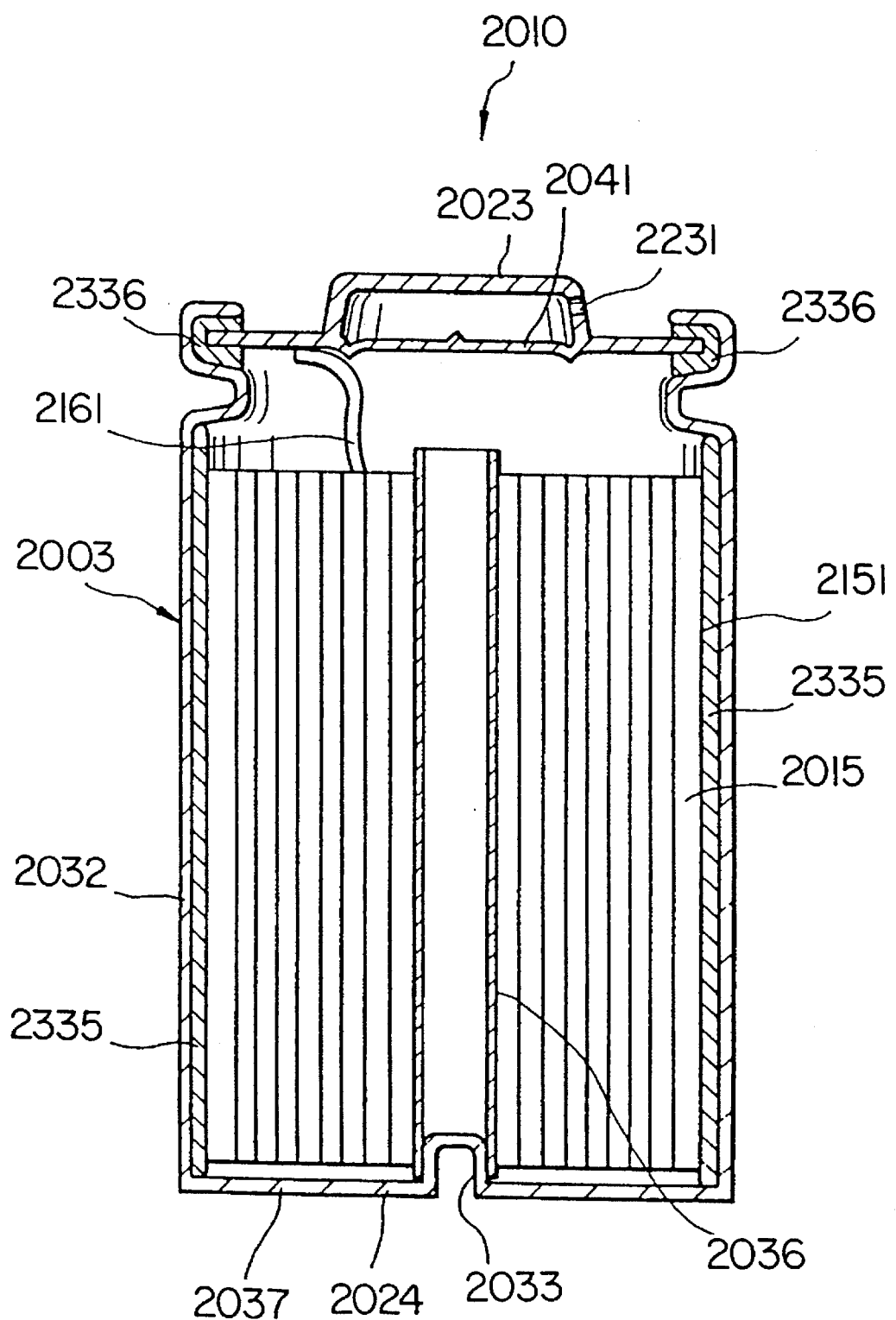
FIG. 27 is a sectional view of a wound cell according to embodiment 6.

This embodiment provides the wind-up type cell 2010 produced by winding thin sheet-like positive and negative electrode plates while interposing separators between them so as to form an electrode roll, and connecting the electrode plates of the electrode roll 2015 to pole terminals 2023, 2024 formed on the upper and lower surfaces of the case 2003 as shown in FIG. 27.

The negative pole terminal 2024 formed on the lower surface has a protuberance 2033 for fitting and implanting a core rod 2036, the conductive core rod 2036 is implanted into this protuberance 2033, while the electrode roll 2015 is wound around the core rod 2036. The winding start portion of one of the electrode plates is connected to the core rod 2036.

Next, each of the constituent members will be described in further detail.

Figure 28:
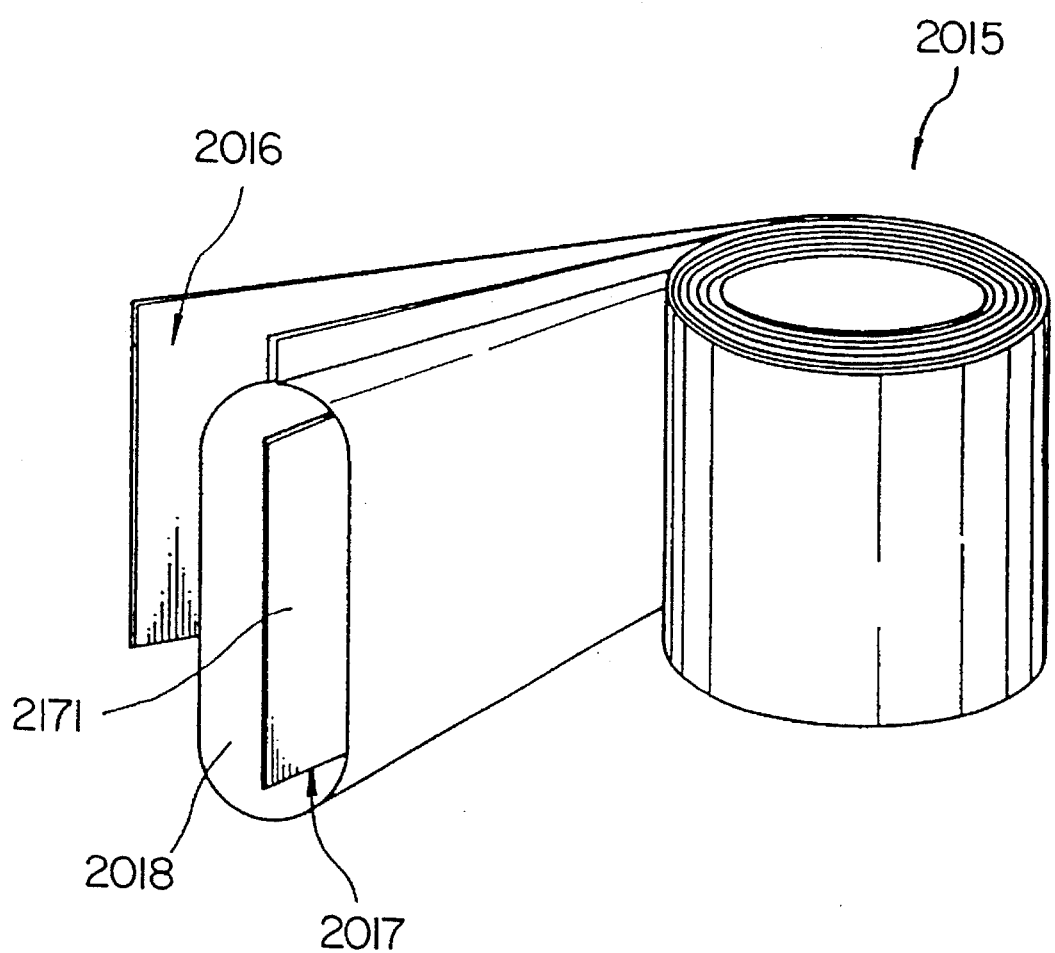
FIG. 28 is an explanatory view of winding of an electrode roll according to embodiment 6.

The electrode roll 2015 is formed by winding the positive and negative electrode plates 2016, 2017 while interposing the separator 2018 between them, as shown in FIG. 28. The separator 2018 covers and wraps the negative electrode plate 2017 as shown in the same drawing.

The cylindrical core rod 2036 is provided at the axis of the electrode roll 2015 as shown in FIG. 27, and the core rod 2036 is implanted into the protuberance 2033 of the bottom 2037 of the case 2003 as the negative pole terminal 2024.

An insulating member 2335 is sandwiched between the outer peripheral surface 2151 of the electrode roll 2015 and the drum portion 2032 of the case 2003.

The winding start portion 2171 (FIG. 28) of the negative electrode plate 2017 is connected to the core rod 2036, and the negative electrode plate 2017 and the negative pole terminal 2024 are electrically connected to each other.

The lead portions 2161 are provided on the positive electrode plate 2016 of the electrode roll 2015 by disposing the expanded portions (reference numeral 2121 in FIGS. 23(a) and (b)) in the same way as in the fifth embodiment and are connected to the positive pole terminal 2023.

A gas exhaust port 2231 is provided at the positive pole terminal 2023 which also functions as the cover of the case 2003, and a safety valve 2041 for cutting off external air is disposed below the gas exhaust port 2231.

The positive pole terminal 2023 seals the case 2003 through an insulating seal member 2336.

Next, the function and effect of this embodiment will be explained.

Figure 29:
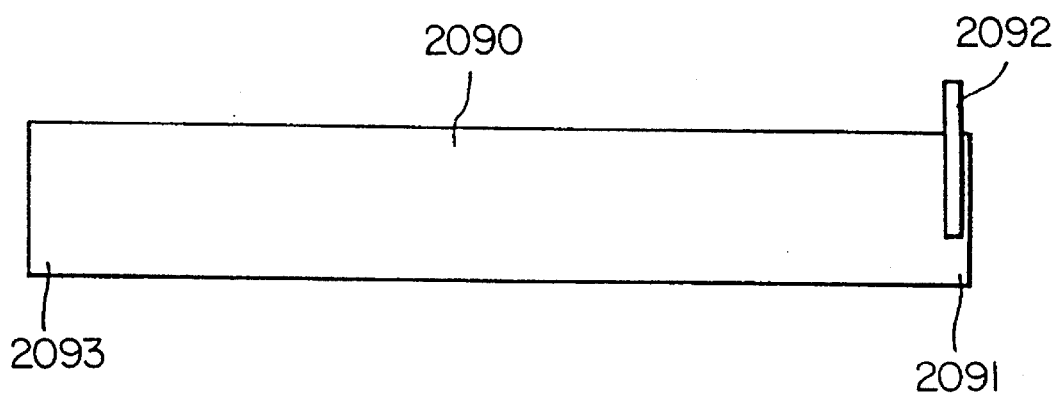
FIG. 29 is an expanded view of electrode plates in a conventional wound cell.
Figure 30:
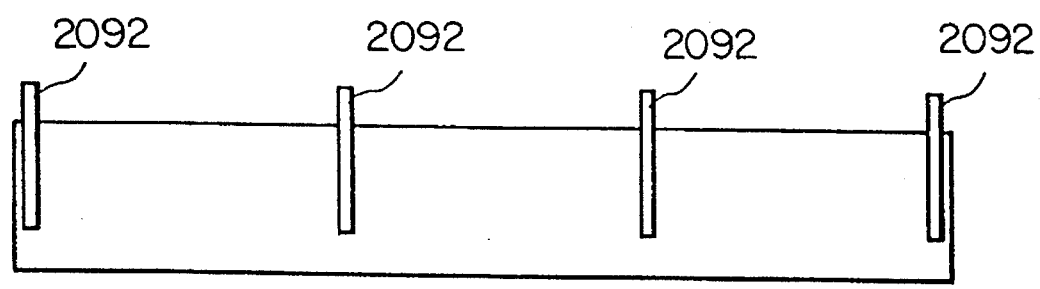
FIG. 30 is an exploded view of another electrode plate in the conventional wound cell.

In this embodiment, the winding start portion 2171 of the negative electrode plate 2017 is connected to the core rod 2036 and the core rod 2036 is fitted to the protuberance 2033 of the case 2003. In this way, the negative electrode plate 2017 is electrically connected to the negative pole terminal 2024. Accordingly, it is not necessary to dispose a connection member such as the lead plate (see FIG. 29) to the negative electrode plate 2017.

The winding start portion 2171 can be bonded extremely easily to the core rod 2036 by welding or brazing. Further, the core rod 2036 can be implanted extremely easily into the bottom of the case 2003. Accordingly, the connection work between the negative electrode plate 2017 and the negative pole terminal 2024 and the assembly work of the electrode roll 2015 to the case 2003 can be made extremely efficient, and the operability can be improved.

The connection between the negative electrode plate 2017 and the negative pole terminal 2024 is not established by the thin lead member as has been employed in the prior art devices. Accordingly, the internal resistance value of the electrode can be drastically reduced.

As a result, exothermicity (Joule heat) due to the discharge of the cell and the drop of the internal voltage of the cell can be drastically reduced.

As described above, this embodiment can provide a wind-up type cell which has electrodes with low internal resistance and has a lead extension portion which can be easily assembled.

Embodiment 7

A lithium metal cell according to the seventh embodiment of the present invention will be described with reference to FIG. 31.

This embodiment provides a lithium metal cell 3010 which includes therein a neutralizer case 3021 for storing a neutralizing agent for restricting a cell reaction, and wherein the neutralizer case 3021 has opening means 3131 for emitting the neutralizing agent in response to a gas or reaction heat generated when the cell reaction becomes abnormal.

The opening means 3031 includes a piston 35 as a pressure-sensitive member which responds to an internal gas pressure of the cell.

Hereinafter, each of the constituent members will be described in detail.

Figure 31:
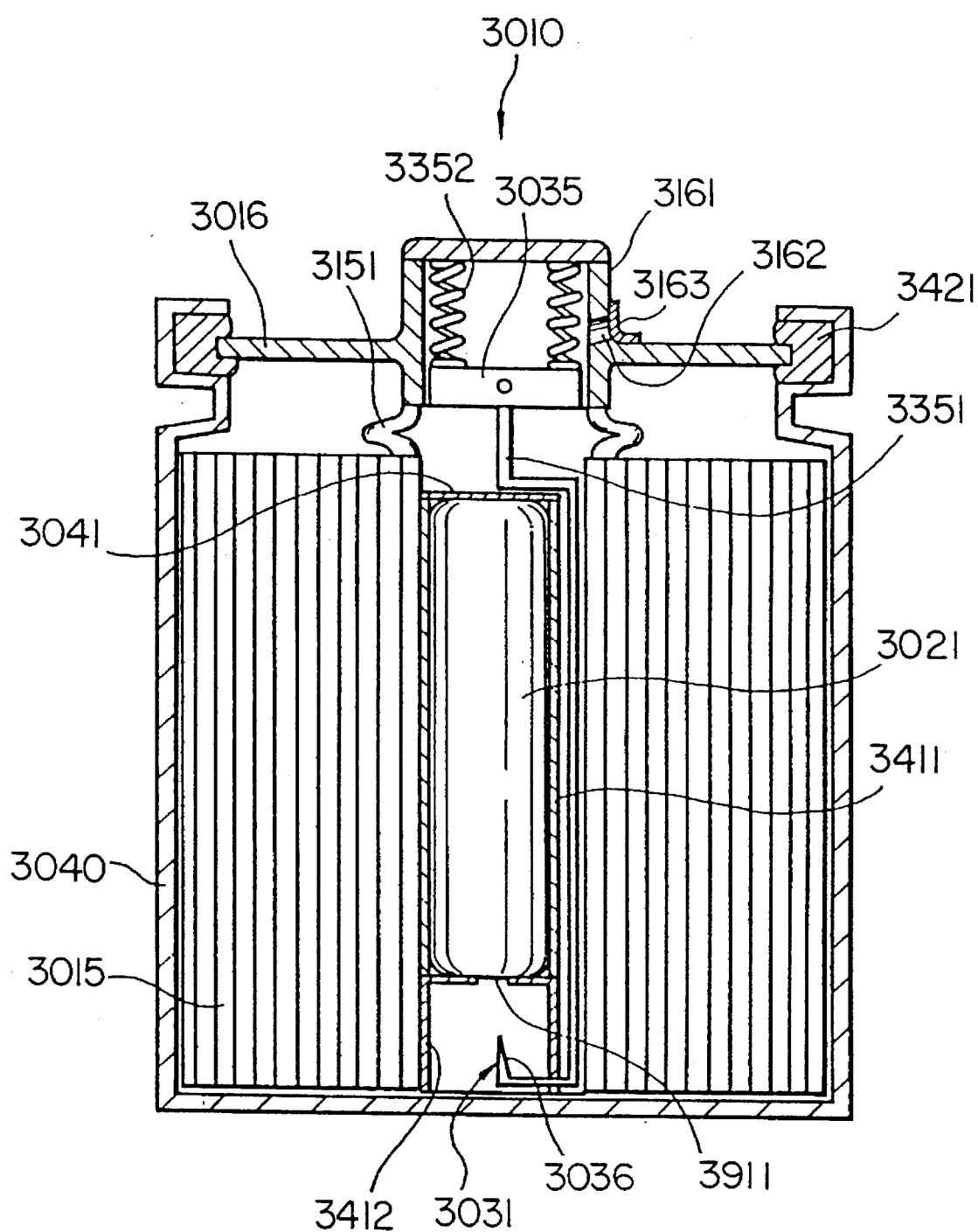
FIG. 31 is a sectional view of a cell according to embodiment 7.

In the lithium metal cell 3010 according to this embodiment, the cell reaction portion 3015 is accommodated in the cell case 3040 serving also as the negative electrode, and the positive pole terminal 3016 is disposed on the cell case 3040, as shown in FIG. 31. The positive pole terminal 3016 and the cell case 3040 are electrically insulated from each other by an insulating member 3421 which is sandwiched between them.

The neutralizer case 3021 stored in a box 3041 is disposed at the center of the cell reaction portion 3015. The neutralizing agent is stored in this neutralizer case 3021 in a state where an internal pressure is applied to a certain extent. The neutralizing agent is carbon dioxide.

The box 3041 includes an upper chamber 3411 for storing the neutralizer case and a lower chamber 3412 for storing a later-appearing through-hole pin 3036. A pin hole 3911 is bored at the center of the bottom of the upper chamber 3411. By the way, this neutralizer case 3021 may also be used as the core rod of the cell reaction portion 3015.

A cylindrical protuberance 3161 is formed at the center of the positive pole terminal 3016, and a piston 3025 is accommodated inside this protuberance 3161 through a coil spring 3352.

A gas discharge port 3162, which is normally positioned above the piston 3035, is disposed on the side portion of the protuberance 3161. This discharge port 3162 stays air-tight at normal times, and is sealed by seal paper 3163, for example, as means for representing that the cell is an abnormal cell from which gas may be emitted, when it is broken. A sheet material the color of which is changed by the internal gas, or a pressure-sensitive sheet, may be used as another abnormality display means.

A rod 3351 bent into a hook shape is fitted to the bottom of the piston 3035, and a through-hole pin 3036 is fitted to the lower end of the rod 3351.

The through-hole pin 3036 is stored in the lower chamber 3412 of the box 3041.

The rod 3351 bypasses the side portion of the box 3041 from the piston 3035, reaches the lower chamber 3412 and is connected to the through-hole pin 3036.

In FIG. 31, reference numeral 3151 denotes a lead wire which connects the cell reaction portion 3015 to the positive pole terminal 3016.

Next, the function and effect of this embodiment will be explained.

When the cell reaction proceeds abnormally due to a short circuit in the load on the cell, or the like, the gas pressure inside the cell rises.

Then, the piston 3035 rises against the force of the coil spring 3352.

The rod 3351 rises in the interlocking arrangement with the piston 3035, and the through-hole pin 3036 rises inside the pin chamber.

As the through-hole pin 3036 rises further, it penetrates through the pin hole 3411 of the upper chamber 3411 and breaks through the bottom portion of the neutralizer case 3021.

As a result, carbon dioxide as the neutralizing agent is jetted from the neutralizer case 3021, so that metallic lithium as the active material of the lithium metal cell 3010 is converted to lithium carbonate ($Li_2CO_3$), and is made inert, and the reaction stops.

When the piston 3035 rises above the lower end portion of the gas discharge port 3162, the pressure of the internal gas acts on seal paper 3163 which seals the discharge port 3162.

When this gas pressure exceeds a predetermined value, seal paper 3163 is broken and the gas is emitted outside. Accordingly, danger of explosion or the like can be avoided.

When the gas is emitted and the gas pressure drops, the piston 3035 falls again below the discharge port 3162 due to the biasing force of the spring 3352, and external air enters the cell and prevents the reaction of oxygen and moisture with the active material.

The user of such a cell can find a defective cell by checking the breakage of the seal paper 3163 by eye.

As described above, according to this embodiment, the abnormal reaction of the cell can be stopped by emitting the neutralizing agent, and explosion of the gas, etc., can be avoided by discharging the gas.

Whether the cause of the abnormal reaction of the cell exist outside the cell such as a short circuit in the load, or inside the cell such as a short circuit between the electrodes, the reaction can be restricted in both cases.

As described above, this embodiment can provide a chemical cell equipped with a safety mechanism which can reliably restrict an abnormal reaction of the cell inclusive of internal causes in the cell such as an internal short circuit.

By the way, a cell having the structure of this embodiment can be used not only as a small cell for use in small electronic appliances but also as a large capacity secondary cell for storing power in electric automobiles.

Embodiment 8

Figure 32:
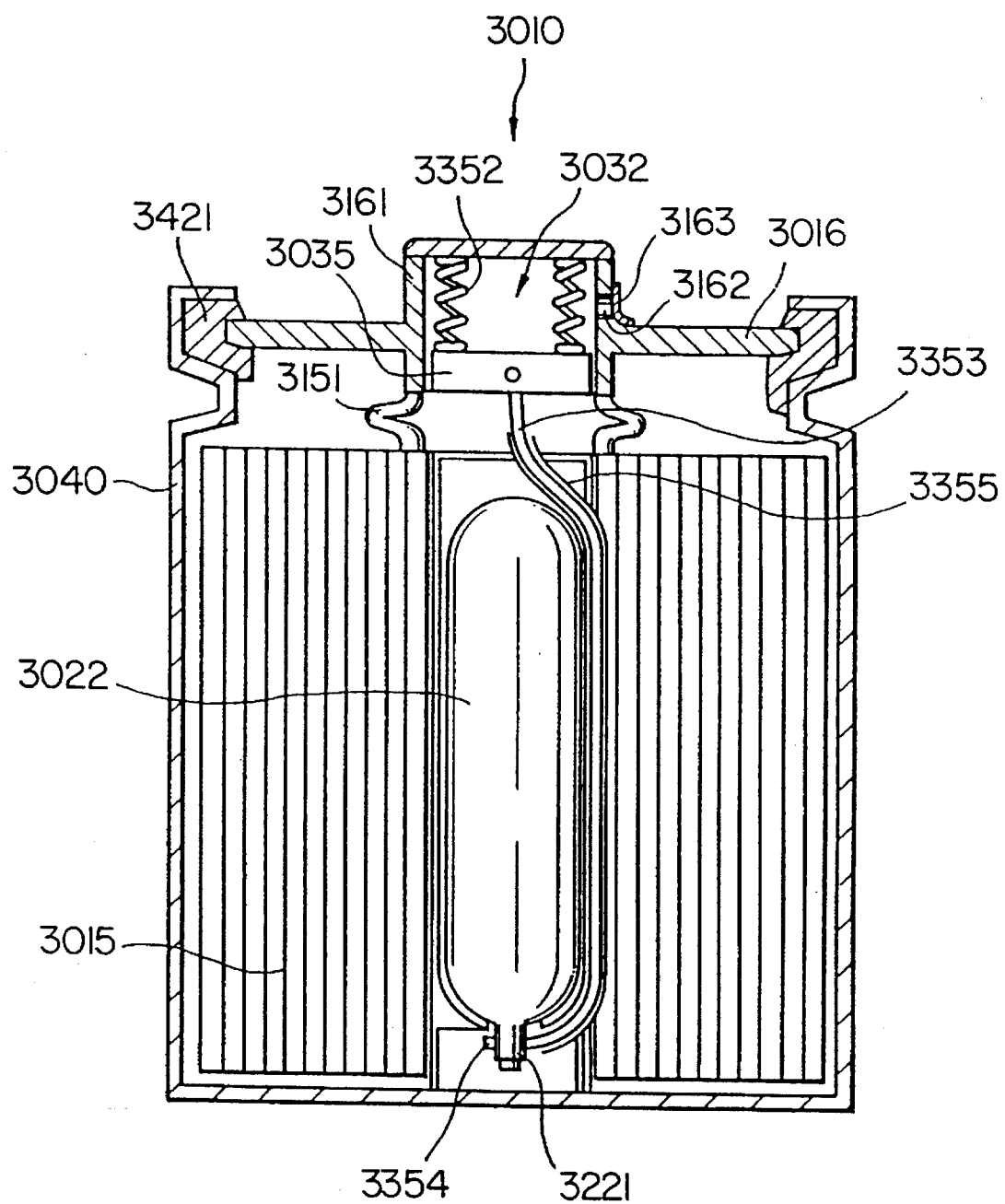
FIG. 32 is a sectional view of a cell according to embodiment 8.

This embodiment represents, as shown in FIG. 32, the case where a flexible operation string 3353 is fitted to the piston 3035 of the opening means 3032 in embodiment 7, and a plug 3354 fitted into a plug port 3221 formed at the bottom of the neutralizer case 3022 is fitted to the distal end of the operation string 3353.

The operation string 3353 is fitted to the bottom of the piston 3035.

The operation string 3353 penetrates through a guide pipe 3355 and reaches a portion below the neutralizer case 3022, and the plug 3354 is fitted to the distal end of the operation string 3353.

The plug 3354 is removably fitted to the plug port 3221 formed at the bottom of the neutralizer case 3022.

When the internal gas pressure of the cell rises, the piston 3035 also rises, pulls the operation string 3353 and pulls out the plug 3354 from the plug port 3221, so that the neutralizing agent is emitted.

The rest of the construction is the same as that of embodiment 7, and the dame effect can be obtained.

Embodiment 9

This embodiment represents still another embodiment of the present invention including the-opening means 3030 formed by a thermoplastic member.

Figure 33:
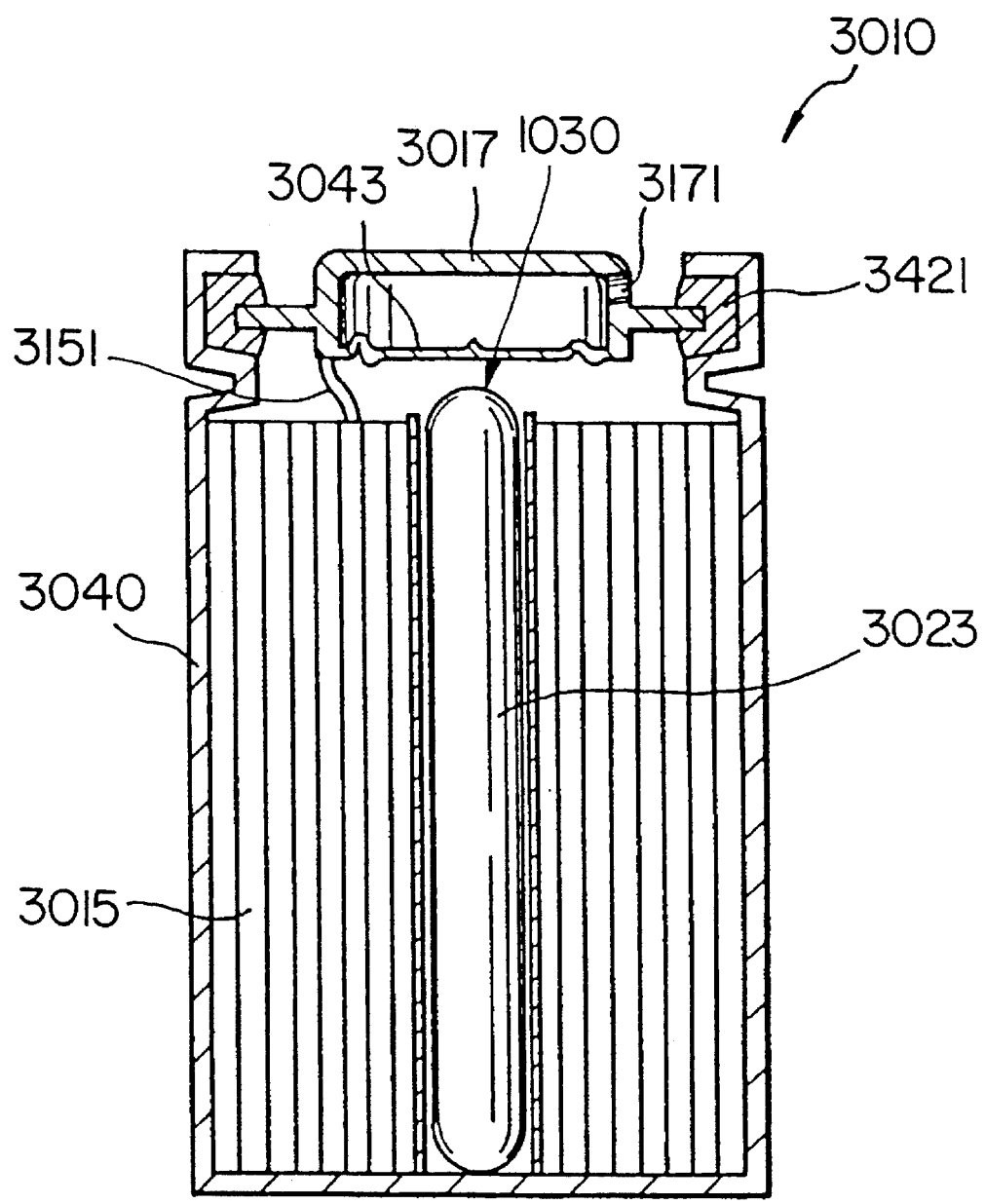
FIG. 33 is a sectional view of a cell according to embodiment 9.

This embodiment includes a safety valve 3043 which is formed integrally with the positive pole terminal 3017, and the neutralizer case 3023 is made of a thermoplastic material, as shown in FIG. 33.

A discharge port 3171, which is open to the external air, is disposed on the positive pole terminal 3017 as shown in FIG. 33, and a safety valve 3043 is also provided at the positive pole terminal 3017 to cut off the external air.

The neutralizer case 3023 storing therein the neutralizing agent is made of a thermoplastic material. This thermoplastic material is a member which is softened and becomes molten when the internal temperature of the cell exceeds a predetermined temperature.

The predetermined temperature described above is set to be somewhat higher than the internal temperature during the normal operation of the cell.

For example, in the case of the lithium metal cell, a resin such as polyethylene or polypropylene, having a melting point between 100° C. and 150° C. is used. Since the melting point of lithium is about 180° C., the cell reaction can be stopped by the use of the resin material having the melting point described above before lithium becomes molten, so that the lithium does not melt and the internal short-circuit can be prevented from expanding further.

When the internal temperature rises due to the abnormal reaction of the cell in this embodiment, the neutralizer case 3023 becomes molten, the neutralizing agent is emitted, and the cell reaction is stopped.

When the internal gas pressure of the cell rises above the predetermined value, the safety valve 3043 is broken and the gas is discharged from the discharged port 3171. In this way, the danger of explosion or the like can be avoided.

By the way, since the safety valve 3043 does not have a self-restoring force, it cannot again cut off the external air once it is broken. However, a construction for again cutting off the external air can be constituted by the use of a valve member such as one shown in FIG. 31. Furthermore, when the discharge port 3171 is sealed by seal paper as shown in FIG. 31, air-tightness can be retained and the abnormality can be displayed.

The rest of the construction is the same as that of embodiment 7 or 8. By the way, only a part of the neutralizer case 3023 may be made of the thermoplastic material.

Embodiment 10

Figure 34:
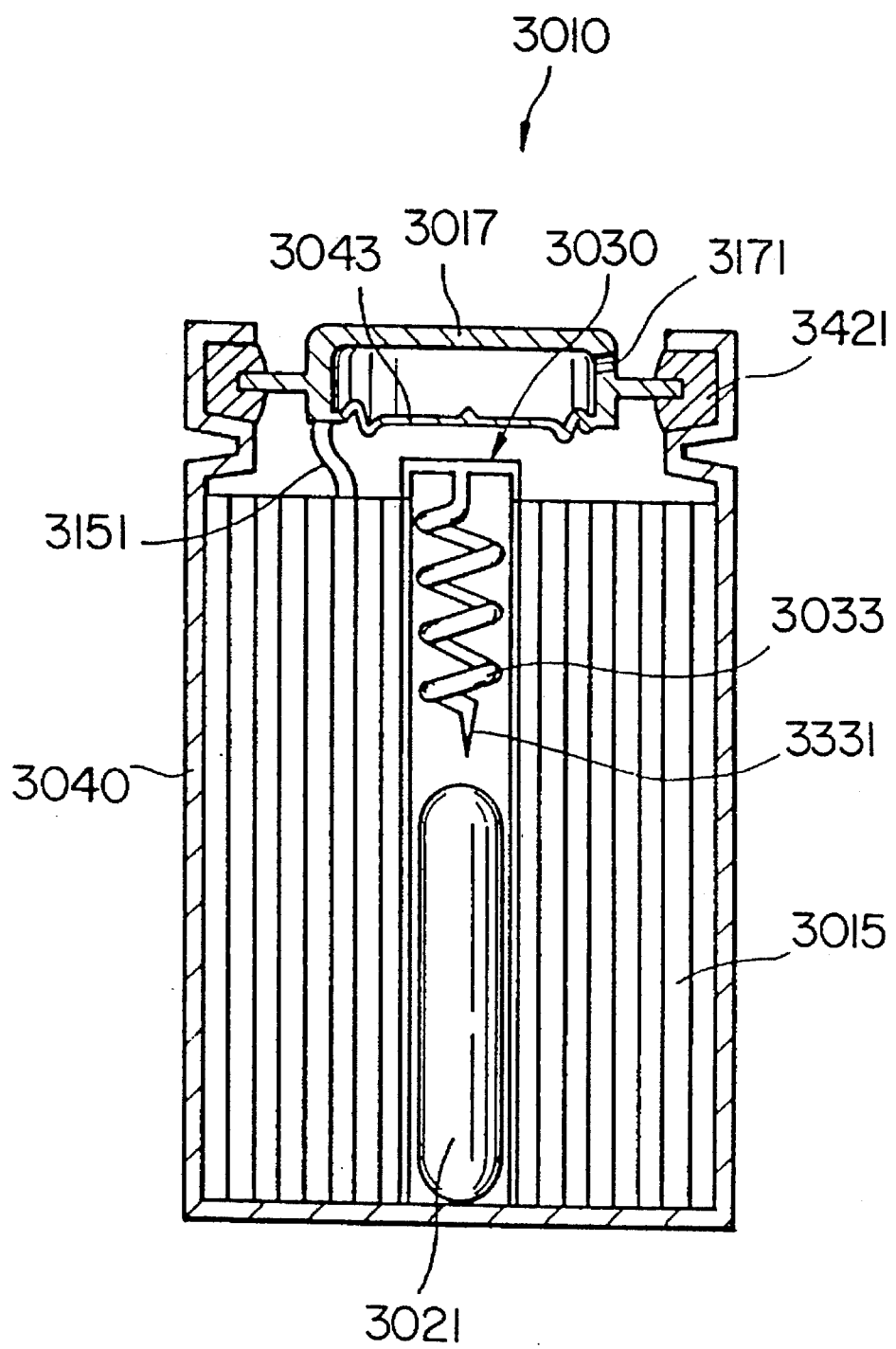
FIG. 34 is a sectional view of a cell according to embodiment 10.

This embodiment represents still another embodiment of the present invention wherein the opening means 3030 in embodiment 9 comprises a needle-like member 3033 made of a shape memory alloy which extends and contracts in accordance with temperature, as shown in FIG. 34.

The neutralizer case 3021 storing therein the neutralizing agent is disposed at the bottom of the lithium metal cell 3010 of this embodiment.

The spiral needle-like member 3033 made of the shape memory alloy and extending downward when the temperature exceeds a predetermined temperature is fitted to the upper part of the neutralizer case 3021.

When the internal temperature of the cell exceeds a predetermined value due to the abnormal reaction of the cell, the needle-like member 3033 extends and the needle 3331 at the distal end of the member 3033 breaks through the neutralizer case 3021.

As a result, the neutralizer is emitted and the reaction of the cell is stopped.

The rest of the construction is the same as that of embodiment 9.

Incidentally, the needle-like member 3033 may be made of a bimetal in place of the shape memory alloy.

The bimetal curves when the temperature rises. Therefore, the needle-like member 3033 is shaped in such a manner that the diameter of the spiral decreases due to this curve. Since the full length of the needle-like member 3033 is substantially constant, the needle-like member 3033 extends in the axial direction when the diameter of the spiral decreases. As a result, the needle 3331 at the distal end of the needle-like member 3033 lowers and can thus break through the neutralizer case 3021.

Embodiment 11

Figure 35:
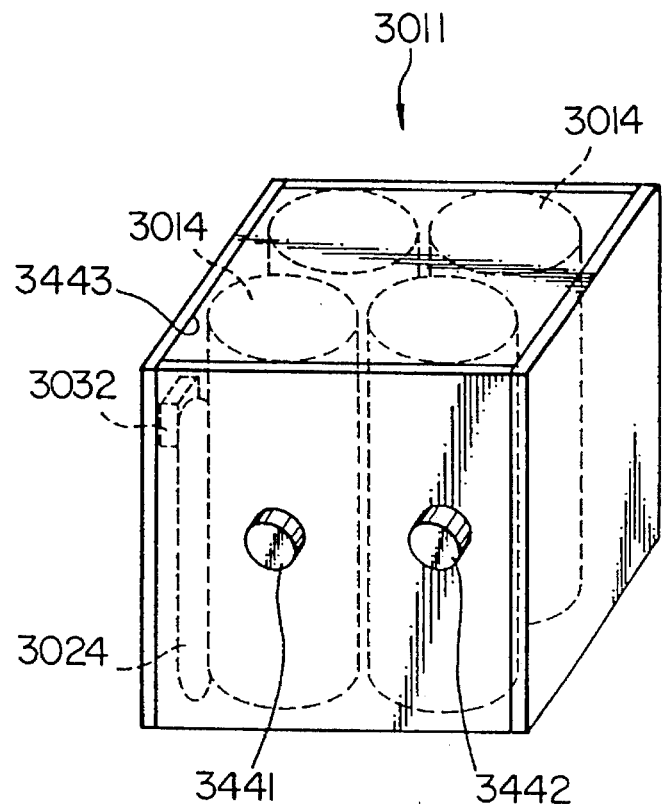
FIG. 35 is a perspective view of a cell according to embodiment 11.

This embodiment represents still another embodiment of the present invention, wherein the neutralizer case 3024 and the opening means 3032 are disposed inside the case 3044 of the integrated cell 11 as shown in FIG. 35.

In the integrated cell 11 of this embodiment, four unit cells 3014 are stored in the case 3044 and the positive and negative terminals 3441, 3442 are disposed as shown in FIG. 35.

The four unit cells 3014 are connected in series inside the case 3044, and both ends of this series circuit are connected to the terminals 3441, 3442 described above.

The neutralizer case 3024 and the opening means 3032 are interposed between each unit cell 3014 and the inner wall 3443 of the case 3044.

Figure 36:
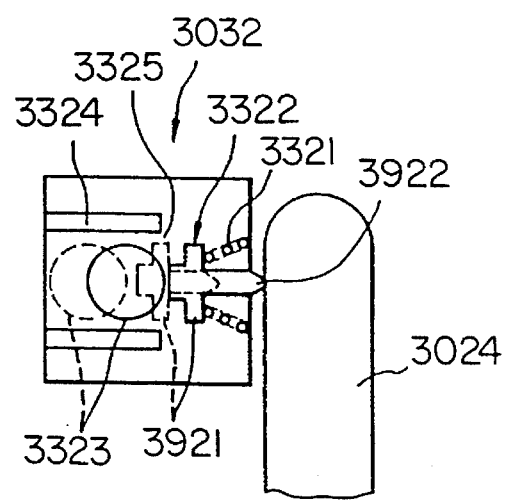
FIG. 36 is an enlarged view of portions near the opening means of the cell according to embodiment 11.

A pin 3322 with a flange, which is urged outward by a spring 3321 relative to the case 3044, is fitted inside the opening means 3032 as shown in FIG. 36.

A cylindrical member 3324 storing a ball 3323 is disposed outside the pin 3322 with the flange. Normally, the flange 3921 of the pin 3022 with the flange closes the open portion 3325 of the cylindrical member 3324, and the ball 3323 exists inside the cylindrical member 3324 as indicated in the figure by broken lines.

When any abnormality such as gas injection occurs in the unit cell 3014 and the impact is applied to the case 3044, the ball pushes out the pin 3322 with the flange against the force of the spring 3321 as represented by the solid line in the drawing, and causes the pin tip 3922 to pierce through the neutralizer case 3024.

As a result, the neutralizing agent is jetted from the neutralizer case 3024, stops the reaction of the cell, and can restrict the progress of the abnormal reaction in the cell.

By the way, since the opening means 3032 of this embodiment also operates by the external impact, the safety mechanism can be operated against the external impact.

In other words, it is possible to prevent in advance the uncontrolled progress of a cell chemical reaction when the unit cell 3014 is broken by an external impact and the materials packed into the cell are jetted out.

When the ball 3323 is a temperature-sensitive member which expands in accordance with the temperature, it expands when the temperature rises abnormally, pushes the flange 3221 and can thus operate the opening means 3032.

Embodiment 12

Figure 37:
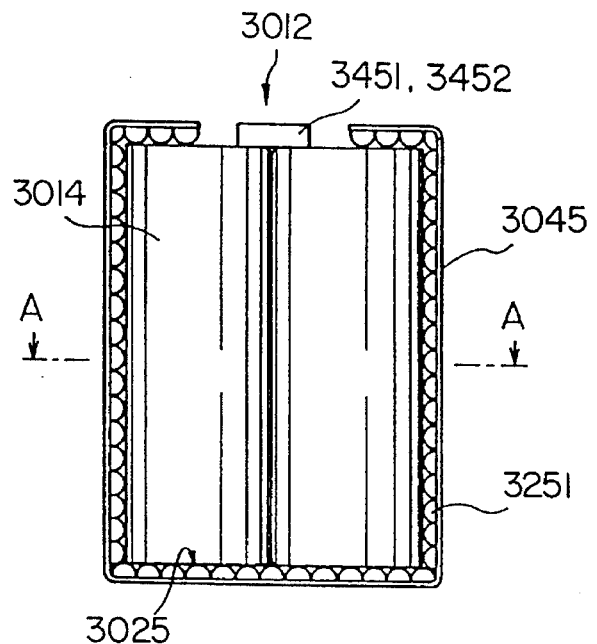
FIG. 37 is a sectional view of a cell according to embodiment 12.
Figure 39:
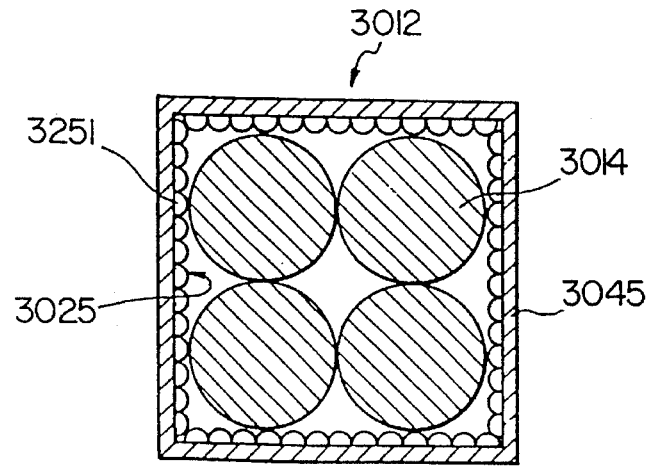
FIG. 39 is a sectional view taken along a line A—A of FIG. 37.

This embodiment represents still another embodiment of the present invention, wherein the neutralizer case 3025 having a large number of foam-like protuberances 3251 is disposed inside the case 3045 of the integrated cell 3012 and the neutralizing agent is stored in each foam-like protuberance 3251 as shown in FIGS. 37 and 39.

The integrated cell 3012 of this embodiment is assembled by storing four unit cells 3014 in the case 3045 and providing the positive and negative terminals 3451, 3452.

The neutralizer case 3025 having the foam-like protuberances 3251 is disposed inside the case 3045.

The neutralizing agent is packed into the foam-like protuberance 3251.

Figure 38:
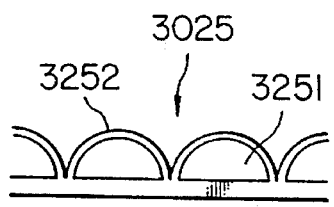
FIG. 38 is an enlarged view of a neutralizer case according to embodiment 12.

Each of the foam-like protuberances 3251 is constituted by a thin film 3252 which can be easily broken by a strong impact as shown in FIG. 38, and this thin film 3252 is molten at a high temperature of 100° to 150° C.

The foam-like protuberances 3251 are molten when the internal temperature rises due to the abnormal reaction of the cell, emit the neutralizing agent and stop the cell reaction. The neutralizer case 3015 normally plays the role of a buffer action as a cushion material, and the thin film 3252 of each foam-like protuberance 3251 is broken at the time of the application of the impact such as the strong impact and explosion to thereby emit the neutralizing agent. Accordingly, the cell reaction is restricted and safety can be assured.

As described above, the integrated cell according to this embodiment stops the cell reaction against the external impact to assure safety, and normally plays the role of the cushion material.

The rest of the construction is the same as that of the fifth embodiment.

Figure 54:
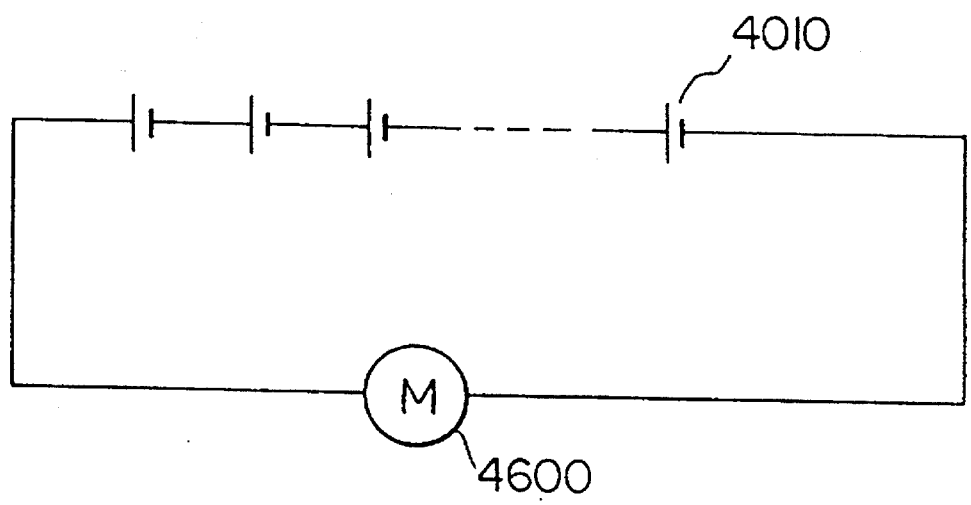
FIG. 54 is a diagram showing a cell arrangement for driving a motor for an electric automobile.

In this embodiment, the cells 4010 are connected in series to obtain a desired voltage as shown in FIG. 54 so as to drive a motor 4600 of an electric automobile, for example, and a circuit is thus formed. The cells 4010 used in this way will be explained next.

Embodiment 13

Figure 40:
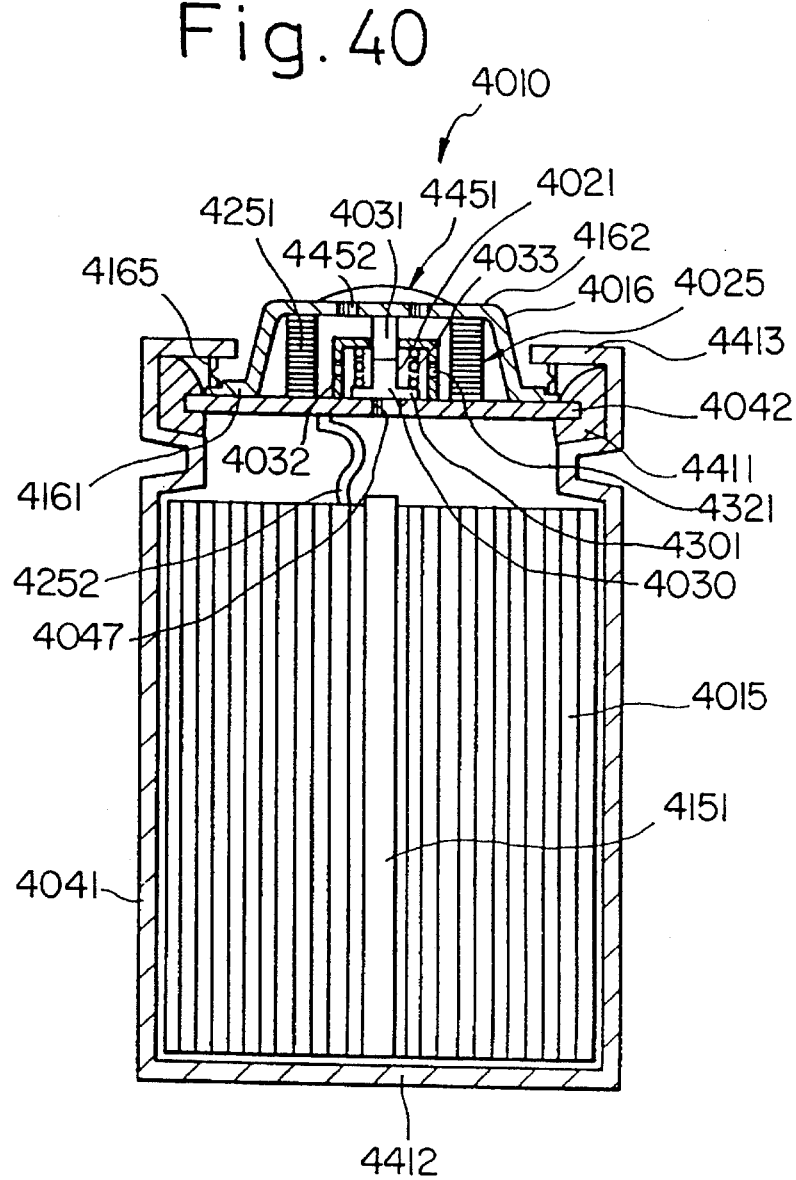
FIG. 40 is a sectional view of a chemical cell according to embodiment 13.

The chemical cell according to this embodiment will be explained with reference to FIGS. 40 and, 41(a) and (b).

This embodiment provides the chemical cell 4010 having the cell reaction portion 4015, the positive pole terminal 4016 and the cell case 4041 serving also as the negative pole terminal as shown in FIGS. 40(a) and (b). This chemical cell 4010 further includes a driving member 4021 which responds to a gas pressure or reaction heat generated at the time of the abnormal reaction of the cell.

The driving member 4021 cuts off conduction between the cell reaction portion 4015 and the positive pole terminal 4016, and has a retention mechanism 4025 having a flexible member 4251 for retaining the cut-off state as described above.

The cell further includes a gas emission member which emits the internal gas to the outside when the gas pressure inside the cell exceeds a predetermined value.

After cutting off the conduction between the cell reaction portion 4015 and the positive pole terminal 4016, the driving member 4021 short-circuits the positive pole terminal 4016 and the cell case 4041.

Furthermore, the driving member 4021 includes a valve member 4301 which opens the gas passage 4047 when the internal gas pressure exceeds a predetermined value, and again closes the gas passage 4047 when the gas pressure drops.

Hereinafter, each of these constituent members will be explained in further detail.

This embodiment represents the lithium metal cell. The cell reaction portion 4015 is accommodated in the cell case 4041 serving also as the negative pole terminal as shown in FIG. 40, and the positive pole terminal 4016 is provided at the upper portion.

The cell reaction portion 4015 is formed by laminating and winding the positive and negative electrode plates through the separator, and disposing the core rod 151 to the center.

The core rod 4151 is connected to the negative electrode plate of the cell reaction portion 4015 and to the bottom 4412 of the cell case 4041.

On the other hand, the positive electrode plate of the cell reaction portion 4015 is connected to the partition plate 4042 through the lead 4152.

The partition plate 4042 is fixed to the upper portion of the cell case 4041 through the insulating member 4411.

The gas passage 4047 is bored and formed at the center of the partition plate 4042, and the upper surface of the partition plate 4042 is brought into planar contact with the lower leg portion 4161 of the positive pole terminal 4016. The flexible member 4251 is interposed between the upper surface of the partition plate 4042 and the upper convex surface 4162 of the position pole terminal 4016.

A push rod 4031 made of an insulating material and pushing up the positive pole terminal 4016 when the piston 4030 rises is fitted to the lower part of the convex surface 4162 of the positive pole terminal 4016.

The piston 4030 and the flexible member 4251 together constitute the driving member 4021.

The valve member 4301 at the lower part of the piston 4030 is accommodated in the piston chamber 4032 fitted to the upper surface of the partition plate 4042 and moves up and down inside the piston chamber 4032. The coil spring 4033 is interposed between the upper surface of the piston chamber 4032 and the upper surface of the valve member 4301 of the piston 4030, and pushes downward the valve member 4301. A vent hole 4321 is bored on the side part of the piston chamber 4032.

Figure 41A:
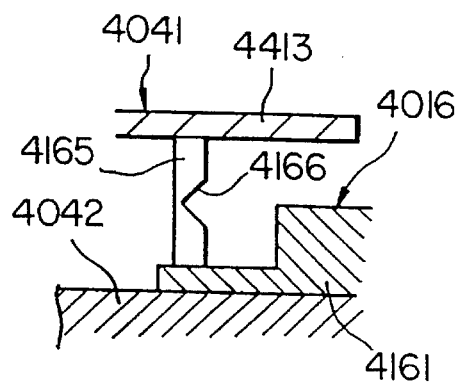
FIGS. 41(a) and (b) are explanatory views of a current cut-off mechanism in embodiment 12, wherein (a) represents the state before cut-off and (b) represents the state after cut-off.
Figure 41B:
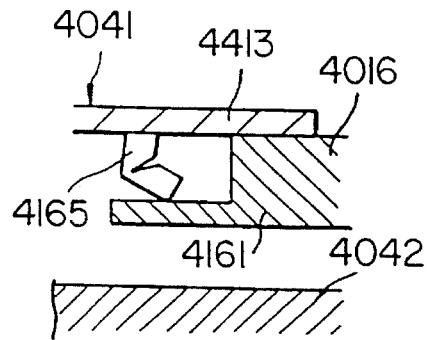

A spacer 4165 having a notch 4166 is interposed between the lower leg portion 4161 of the positive pole terminal 4016 and the upper end surface of the cell case 4041 as shown in FIGS. 41(a) and (b). When a pressure P0 exceeding a predetermined pressure acts on this spacer 4165, the spacer 4165 undergoes plastic deformation and is bent, as shown in FIG. 41(b).

The bending pressure P0 described above is greater than the force F0 of the flexible member 4251 (P0>F0).

On the other hand, the gas discharge port 4452 is defined on the convex surface 4162 of the positive pole terminal 4016. Seal paper 4451, for example, is bonded to the upper surface of the discharge port 4452 as a display member for displaying the occurrence of abnormality such that the safety valve operates. This seal paper 4451 is a member which is broken or peeled off at the time of the operation of the safety valve, and displays abnormality of the cell.

Next, the function and effect of the chemical cell according to this embodiment will be explained.

When the cell causes the abnormal reaction and the internal gas pressure P1 rises, the piston 4030 moves up against the force F1 of the coil spring 4033 (P1>F1).

Then, the gas enters from the gas passage 4047 and the gas pressure P1 acts on the positive pole terminal 4016.

The sum of the force F0 of the flexible member 4251 and the gas pressure P1 becomes greater than the bending pressure P0 of the spacer (P0<F0+P1), and the spacer 4165 undergoes plastic deformation as shown in FIG. 41(b).

The positive pole terminal 4016 is driven and moved up by the flexible member 4251, and is spaced apart from the partition plate 4042, so that the cell current is cut off.

This current cut-off state is retained by the force F0 of the flexible member 4251 that constitutes the retention mechanism 4025.

Then, the positive pole terminal 4016 comes into contact with the upper end surface 4413 of the cell case 4041, and the positive and negative pole terminals are short-circuited with each other.

As seal paper 4451 is broken or peeled off, the discharge gas is discharged from the discharge port 4452.

As a result, the gas pressure drops, and the valve member 4301 of the piston 4030 again closes the gas passage 4047 by the force of the coil spring 4033, prevents intrusion of the external air into the cell, and restricts the outflow of the electrolyte.

As described above, the chemical cell 4010 according to this embodiment cuts off the cell current in response to the gas pressure resulting from the abnormal reaction of the cell, and restricts the reaction. The cut-off state of the current is retained by the flexible member 4251.

When the gas pressure exceeds a predetermined pressure F2, the internal gas is discharged to the outside and safety can be assured.

On the other hand, the positive and negative pole terminals of the cell which cuts off the current and stops operating are short-circuited because they are driven by the flexible member 4251. Accordingly, when the cell of this embodiment is used as a unit cell of the series type integrated cell, the integrated cell can keep supplying current while bypassing (short-circuiting) this cell.

As described above, this embodiment can provide a chemical cell equipped with a safety mechanism capable of preventing in advance an explosion, etc., resulting from the gas of the cell.

Embodiment 14

This embodiment represents still another embodiment of the present invention wherein the mechanism for short-circuiting the positive and negative pole terminals is not disposed in embodiment 13.

Figure 42:
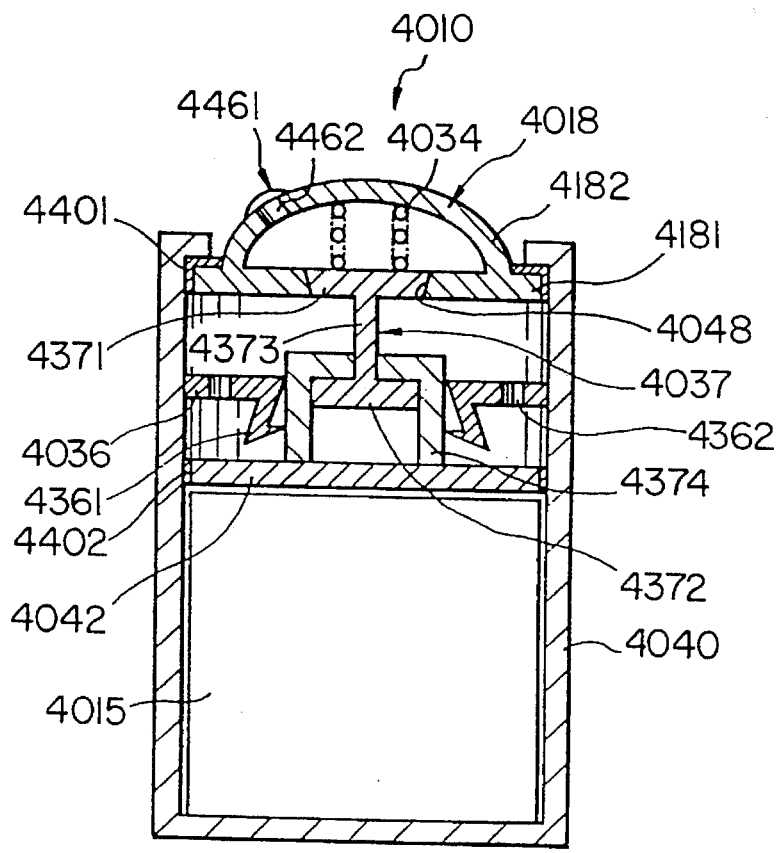
FIG. 42 is a sectional view of a chemical cell according to embodiment 14.

This embodiment provides the chemical cell 4010 which accommodates the cell reaction portion 4015 inside the cell case 4040 and fits the positive pole terminal 4018 to the upper part of the cell case 4040 through the insulating member 4401, as shown in FIG. 42.

The negative pole of the cell reaction portion 4015 is connected to the cell case 4040, while its positive pole is connected to the partition plate 4042.

The positive pole terminal 4018 forms a semi-spherical convex surface 4182 on the bottom plate 4181, and the gas discharge port 4462 is disposed on this convex surface 4182.

Seal paper 4461 for displaying abnormality of the cell is bonded to the gas discharge port 4462.

The gas passage 4048 for fitting to, and leaving, the valve member 4371 of the piston 4037 is formed on the bottom plate 4181 of the positive pole terminal 4018.

The piston 4037, which is pushed down by the coil spring 4034 fitted to the convex surface 4182, is disposed below the bottom plate 4181 of the positive pole terminal 4018.

The piston 4037 as a member constituting the driving member includes the valve member 4371 for fitting to and leaving the gas passage 4048, the piston head 4372, the connecting rod 4373 for connecting them 4371, 4372 to each other and the piston cover 4374 for slidably covering the piston head 4372.

The piston cover 4374 described above is normally pushed and held by a lock pawl 4361 of a lock member 4036 disposed at the upper part of the partition plate 4042 and is in contact with the upper surface of the partition plate 4042. As a result, the partition plate 4042 is electrically connected to the positive pole terminal 4018 through the piston cover 4374 and the piston 4037.

A vent hole 4362 is bored in the lock member 4036 and sends the internal gas upward.

The lock pawl 4361 of the lock member 4036 constituting the retention mechanism consists of a flexible member, and pushes and retains the piston cover 4374 towards the central portion of the cell.

By the way, reference numeral 4042 in FIG. 42 denotes an insulating sheet for insulating the partition plate 4042 from the cell case 4041.

Next, the function and effect of the chemical cell 4010 according to this embodiment will be explained.

When the gas pressure rises due to the abnormal reaction of the cell 4010, the piston 4037 is pushed up against the force of the coil spring 4034 and the retention force of the lock pawl 4361.

As a result, the piston cover 4374 is separated from the partition plate 4042, the cell current is cut off, and the cell reaction stops.

Figure 43:
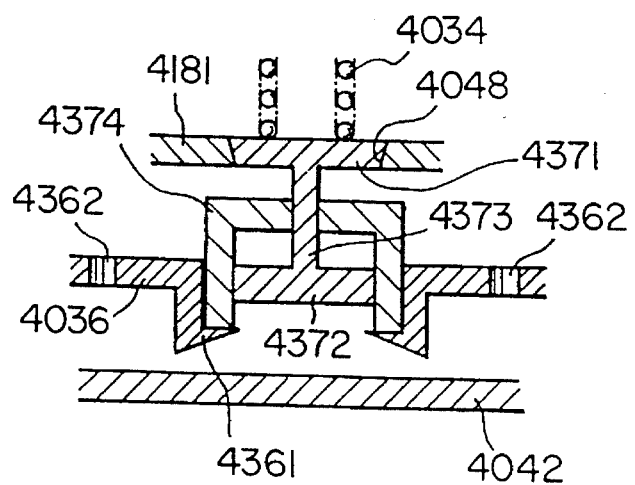
FIG. 43 is an explanatory view of a retention mechanism in embodiment 14.

When the lower end portion of the piston cover 4374 is pushed up above the lock pawl 4361, the lock pawl 4361 is bent, and locks to prevent descent of the piston cover 4374 as shown in FIG. 43.

As a result, the current cut-off state is retained between the piston cover 4374 and the partition plate 4472, and the cell current does not flow again.

On the other hand, when the piston 4037 moves up, the gas penetrates the portion below the convex surface 4182 of the positive pole terminal 4018 through the gas passage 4048.

Then, seal paper 4461 is broken, and the gas is emitted outward.

As a result, explosion, etc., due to the gas can be prevented in advance.

When the gas pressure drops, the valve member 4371 of the piston 4037 is lowered by the force of the coil spring 4034 and again closes the gas passage 4048.

In consequence, intrusion of the external air into the cell can be checked.

For this reason, oxygen and the moisture do not enter the inside, and the outflow of the electrolyte can also be prevented.

In this way, it is possible to prevent the active material having high reactivity such as sodium, lithium, and so forth, from reacting with oxygen and moisture and generating an inflammable gas.

As described above, this embodiment can provide a chemical cell equipped with a safety mechanism capable of restricting the abnormal reaction of the cell and preventing in advance the explosion of the cell, etc., due to the gas of the cell.

Embodiment 15

Figure 44:
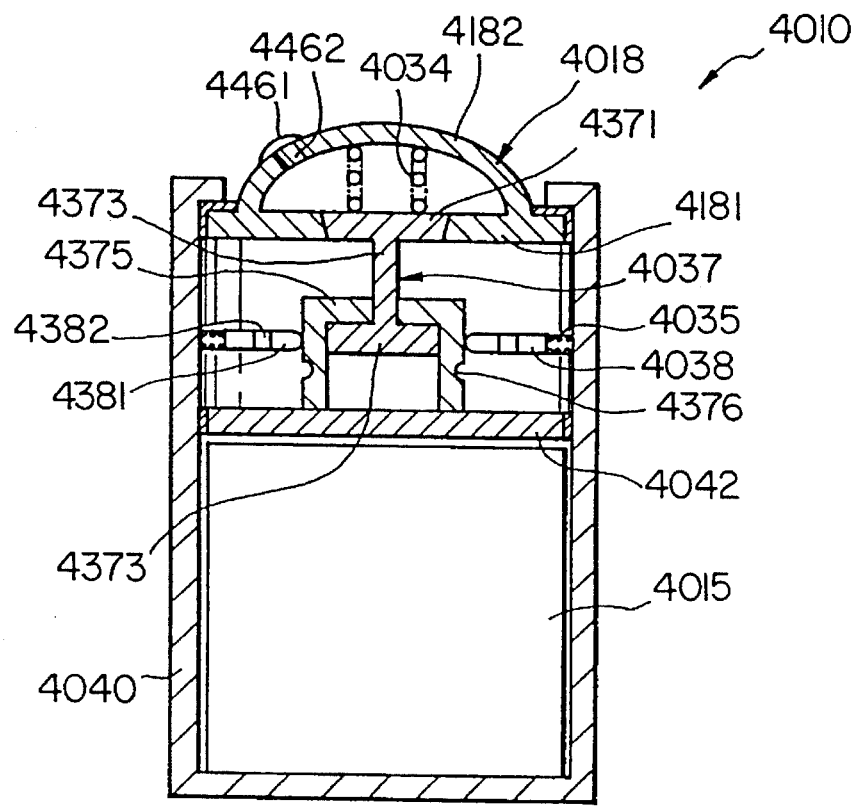
FIG. 44 is a sectional view of a chemical cell according to embodiment 15.
Figure 45:
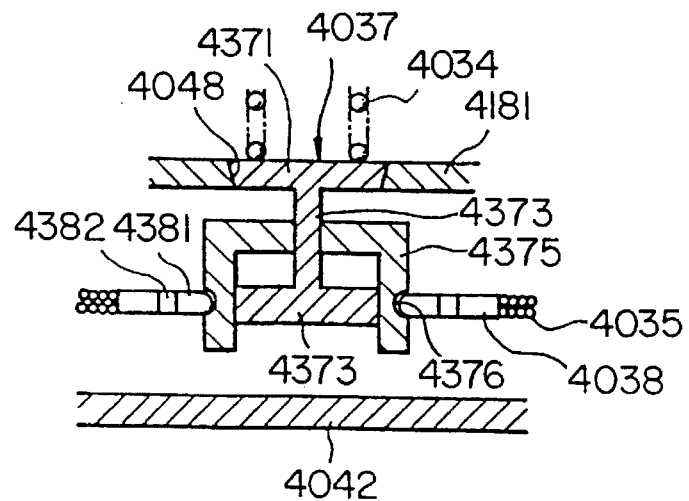
FIG. 45 is an explanatory view of a retention mechanism in embodiment 15.
Figure 46:
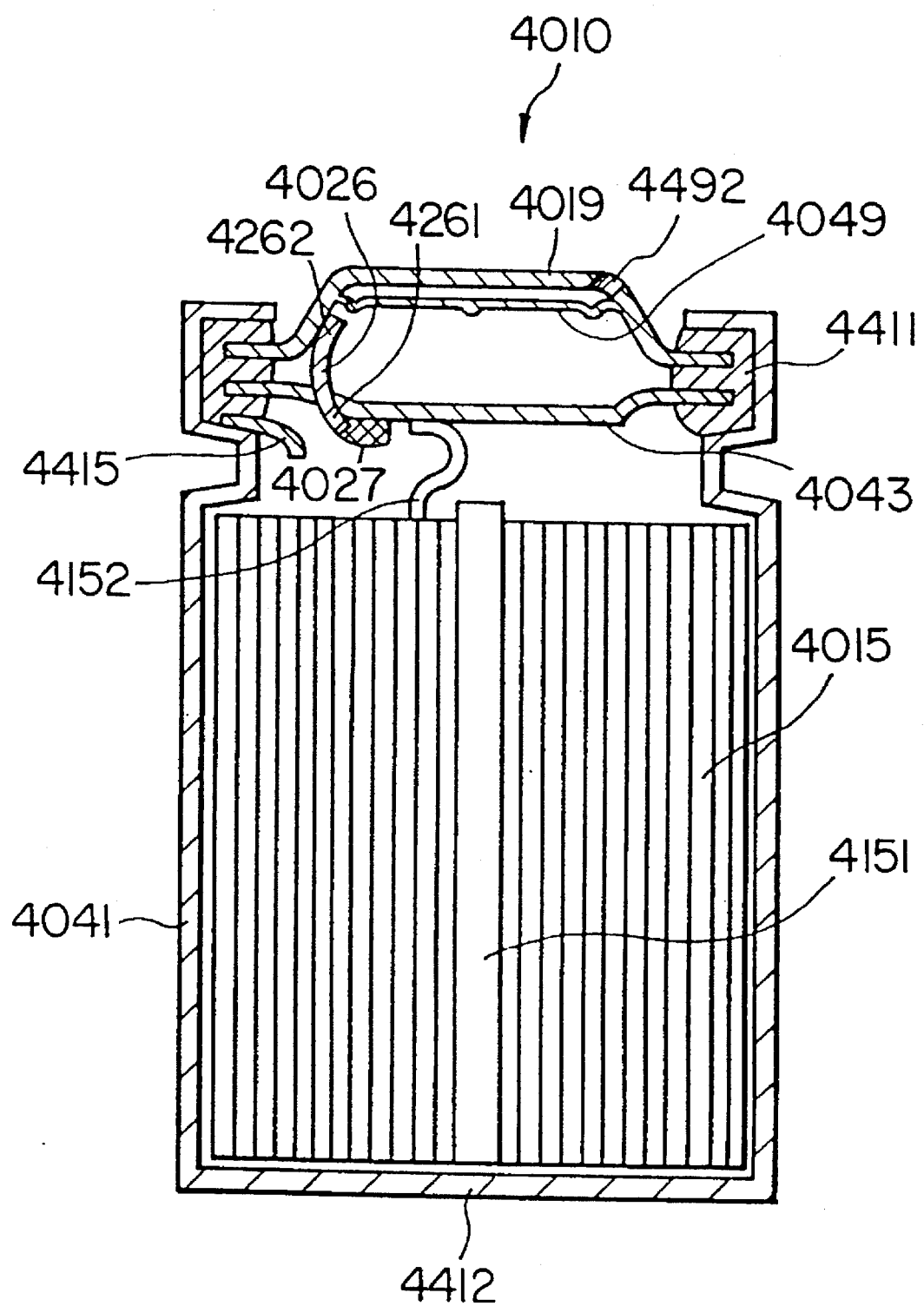
FIG. 46 is a sectional view of a chemical cell according to embodiment 16.

This embodiment represents still another embodiment of the present invention wherein the structure of the lock member 4038 of the retention mechanism in embodiment 14 is changed, as shown in FIGS. 44 and 45.

In the piston cover 4375 of this embodiment, a lock groove 4376 is formed at the lower part of the piston cover 4375 so that the head 4381 of the lock member 4038 can be fitted, as shown in FIGS. 44 and 45.

A retention spring 4035 for pushing inward the head 4381 of the lock member is disposed on the outer side of the lock member 4038.

When the piston 4037 rises, the head 4381 of the lock member 4038 fits into the lock groove 4376 and is retained at that position.

Reference numeral 4382 in FIGS. 44 and 45 denotes a vent hole.

The rest of the construction is the same as that of embodiment 14.

Embodiment 16

This embodiment represents still another embodiment of the present invention wherein the driving member in embodiment 13 is operated by the temperature. The gas is emitted by the operation of the safety valve 4049.

Figure 49:
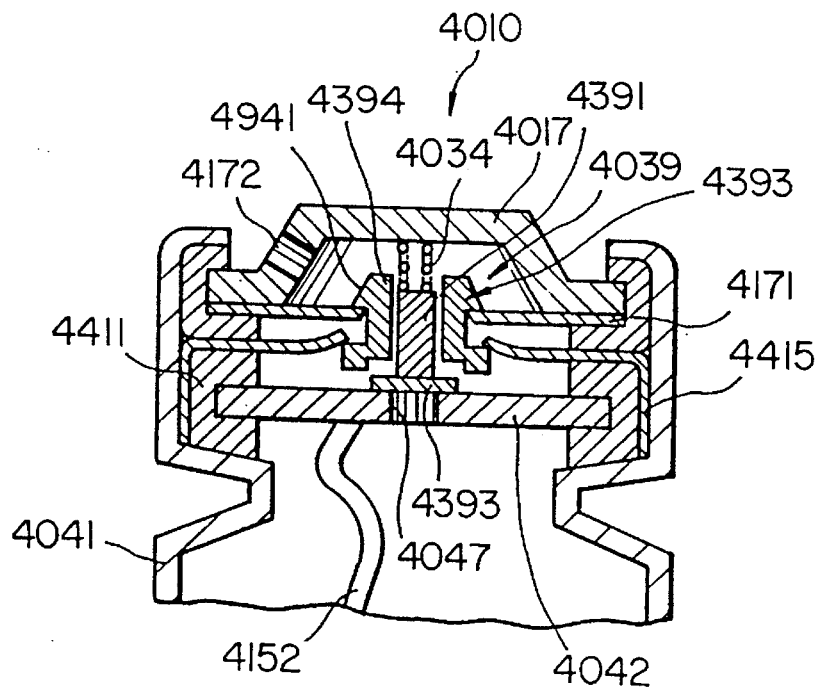
FIG. 49 is a sectional view of the chemical cell according to embodiment 18 when internal conduction is cut off.

In this embodiment, the safety valve 4049 as a gas emission member, which is broken by a gas pressure above a predetermined value, is disposed on the lower surface of the positive pole terminal 4019 as shown in FIG. 49. The safety valve 4049 normally cuts off the inside of the cell 4010 from the external air.

One 4262 of the ends of the leaf spring 4026, which functions as the driving member and also as the retention mechanism, is fixed to the lower side portion of the positive pole terminal 4019.

The other end 4261 of this leaf spring 4026 is bonded to the bottom surface of the partition plate 4043 by a thermoplastic adhesive 4027.

On the other hand, a conductive contact plate 4415 is disposed at an upper position of the cell case 4041 opposing the other end 4261 of the leaf spring 4026 in such a manner as to protrude towards the inside of the case.

The leaf spring 4026 is curved in a convex shape towards the outside of the case, and the other end 4261 is biased towards the contact plate 4415.

Next, the function and effect of this embodiment will be described. When the temperature rises due to the abnormal reaction of the cell, the thermoplastic adhesive 4027 is softened or molten. As a result, the other end 4261 of the leaf spring 4026 is separated from the partition plate 4043 by the force of the leaf spring 4026 and comes into contact with the contact plate 4415.

In this way, the conduction between the partition plate 4043 and the positive pole terminal 4019 is cut off, while the positive pole terminal 4019 and the cell case 4041 are short-circuited.

As a result, the cell current does not flow any more, and the cell reaction can be restricted.

The positive and negative pole terminals of the cell are short-circuited by the leaf spring 4026, and the cell maintains the conduction state as a circuit.

When the internal gas pressure exceeds a predetermined value due to the abnormal reaction, the safety valve 4049 is broken, the gas is emitted from the discharge port 4492, and explosion, etc., can be avoided in advance.

Unlike embodiment 13, however, the safety valve 4049 is closed after the gas emission and prevents intrusion of the external air.

However, the return type safety valve consisting of the piston 4037, the coil spring 4034, seal paper 4461, etc., of embodiment 14 can also be used in place of the safety valve 4049 of this embodiment, and such a valve can also have the external air intrusion prevention function.

The rest of the construction is the same as that of embodiment 13.

Embodiment 17

Figure 47:
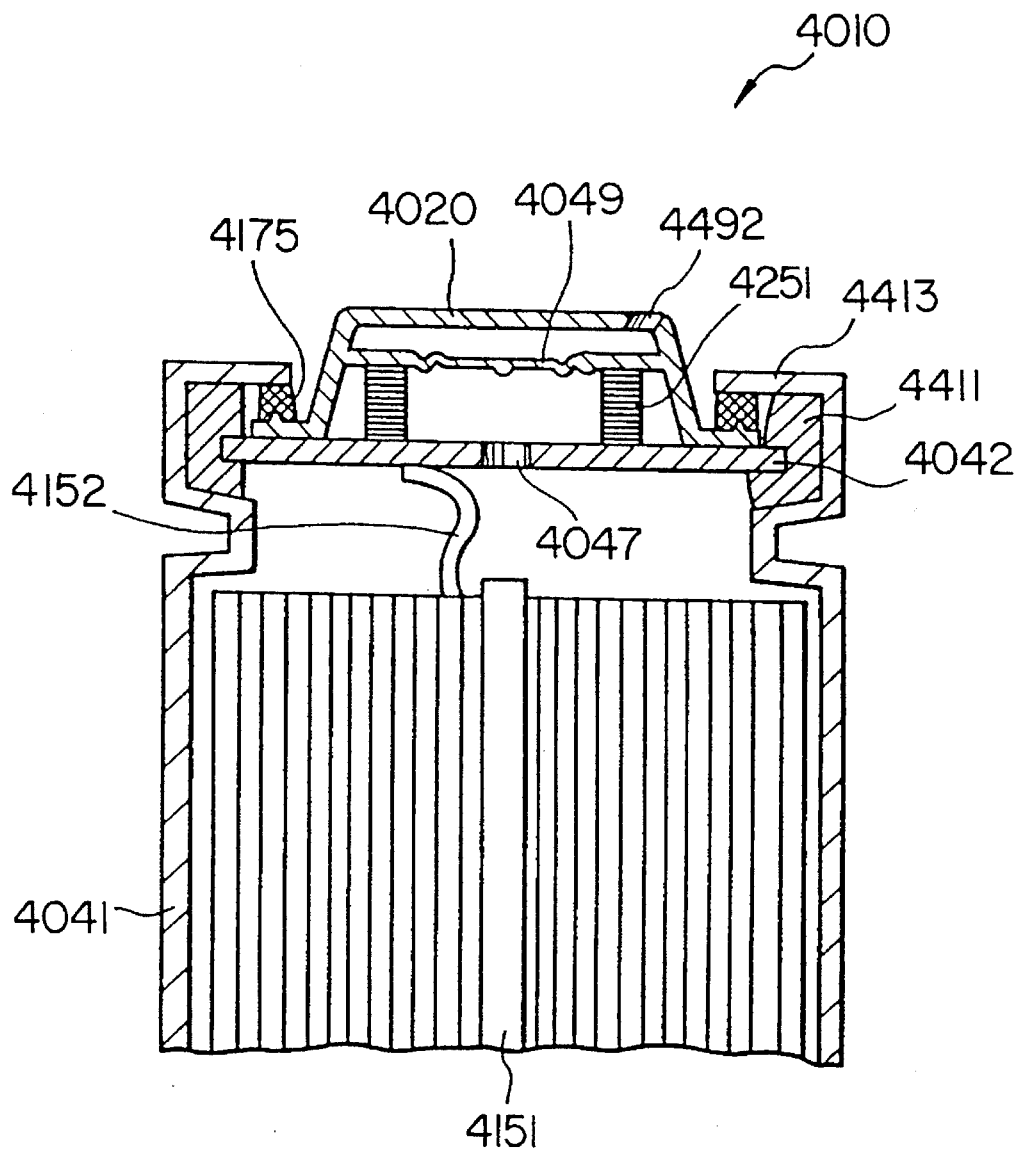
FIG. 47 is a sectional view of a chemical cell according to embodiment 17.

This embodiment represents still another embodiment of the present invention wherein a flexible member 4251 and a thermoplastic spacer 4175 are used in place of the leaf spring and the thermoplastic adhesive of embodiment 16, as shown in FIG. 47.

The positive pole terminal 4020 in this embodiment is normally in surface contact with the partition plate 4042 as shown in FIG. 47, and the insulating spacer 4175 is interposed between them so as to insulate the cell from case 41.

The spacer 4175 is made of a thermoplastic material.

The flexible member 4251 constituting the driving member and the retention mechanism is sandwiched between the positive pole terminal 4020 and the partition plate 4043.

The flexible member 4251 is urged in a direction in which the positive pole terminal 4020 and the partition plate 4043 are separated from each other.

The safety valve is fitted to the lower part of the positive pole terminal 4020, and the gas discharge port 4492 is disposed on the upper surface of the positive pole terminal 4020.

When an abnormal reaction occurs in the cell, the cell temperature rises and the spacer 4175 is softened or molten.

As a result, the driving member 4251 is driven, the positive pole terminal 4020 rises and separates from the partition plate 4042, and the cell current is cut off.

On the other hand, the positive pole terminal 4020 comes into contact with the upper surface 4413 of the cell case 4041, and both of them (4020, 4041) are short-circuited.

The flexible member 4251 functioning also as the retention mechanism maintains the cut-off state between the positive pole terminal 4020 and the partition plate 4042, and the short-circuit state between the positive pole terminal 4020 and the cell case 4041 is maintained. The rest of the construction is the same as that of embodiment 16.

Embodiment 18

Figure 48:
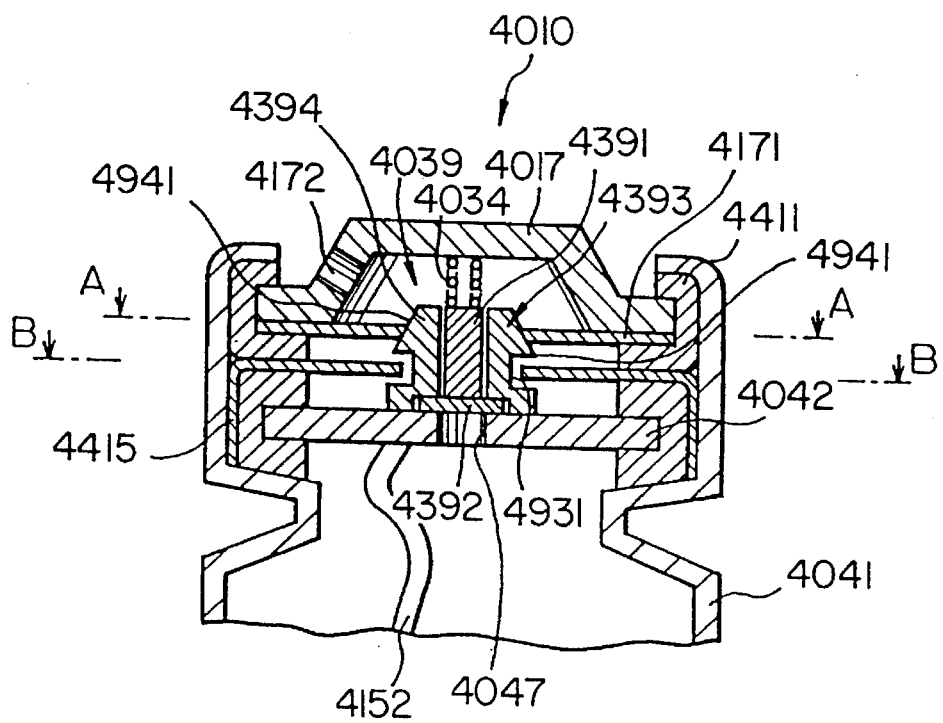
FIG. 48 is a sectional view of a chemical cell according to embodiment 18.

This embodiment represents still another embodiment of the present invention wherein the structure of the driving member of embodiment 13 is changed, as shown in FIGS. 48 and 49.

The positive pole terminal 4017 is fitted to the upper part of the cell case 4041 through an insulating member 4411 as shown in FIGS. 48 and 49. The gas discharge port 4172 is formed on the upper side part of the positive pole terminal 4017 and is normally open.

A first conductor plate 4171 made of a flexible material is bonded to the bottom of the positive pole terminal 4017.

On the other hand, a second conductor plate 4415 made of a flexible material and bonded to the cell case 4041 is disposed below the first conductor plate 4171 but above the partition plate 4042.

The piston 4039 constituting the driving member is disposed between the ceiling surface of the positive pole terminal 4017 and the upper surface of the partition plate 4042 through the coil spring 4034.

The piston 4039 includes a shaft portion 4391 interconnected to the coil spring 4034, a wide insulating gap 4392 fitted to the lower end of the shaft portion 4391 and a piston cover 4393 slidably covering the outer peripheral surface of the shaft portion 4391.

The gas passage 4047 is disposed at the center of the partition plate 4042 and is normally pushed by the coil spring 4034 in such a manner as to close the cap 4393.

The piston cover 4393 has a contracted portion 4931 at its intermediate shaft portion, and lock portion 4394 for constituting the retention mechanism is formed at the upper part of the contracted portion 4931.

The lock portion 4394 has a taper surface 4941 the diameter of which progressively decreases upwardly, and a pointed head portion 4941 is formed at the boundary with the contracted portion 4931.

Figure 50:
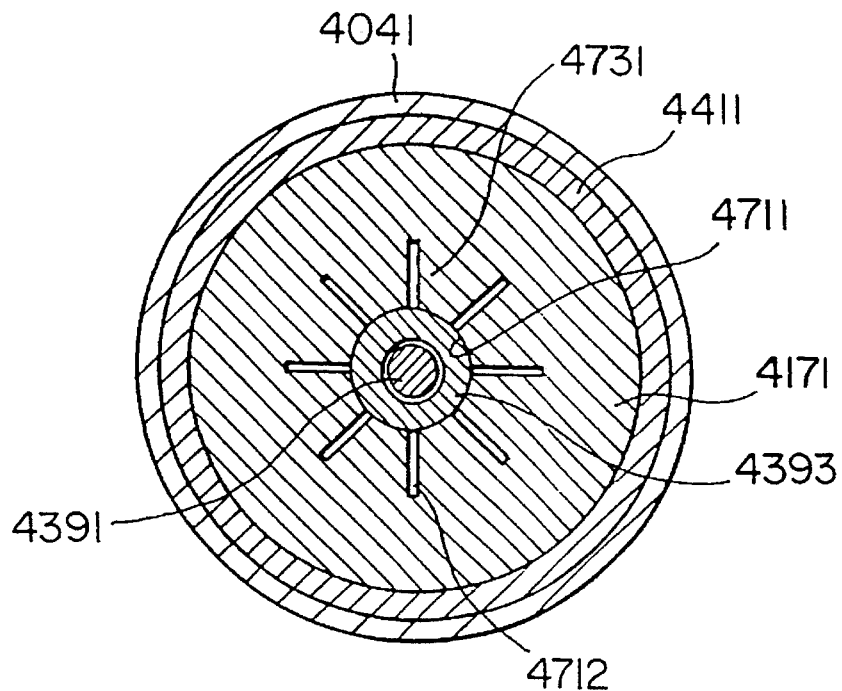
FIG. 50 is a sectional view taken along a line A—A of FIG. 48.
Figure 51:
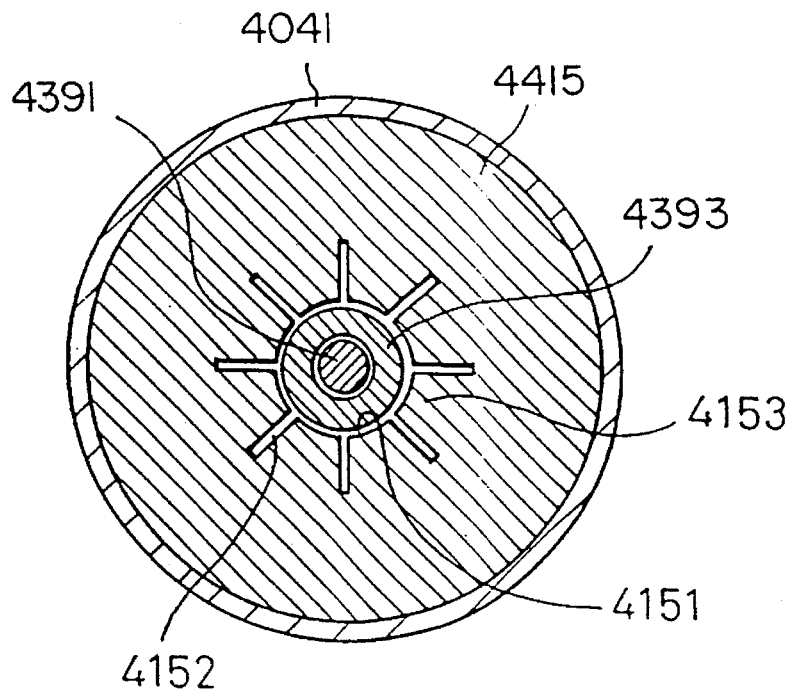
FIG. 51 is a sectional view taken along a line B—B of FIG. 48.

On the other hand, the first and second conduction plates 4171, 4415 have piston holes 4711, 4151 for the insertion of the piston 4039 at the center thereof, respectively, as shown in FIGS. 50 and 51, and slits 4712, 4152 are formed around the outer periphery of the piston holes 4711, 4151, respectively.

Cut plates 4713, 4153 interposed between the two slits 4712, 4152, respectively, play the role of the leaf spring.

When the internal gas pressure rises in the cell 4010 in this embodiment, the piston 4039 rises against the force of the coil spring 4034 and resiliency of the first and second conductor plates 4171, 4415.

In other words, the piston 4039 rises against the leaf spring force of the cut plates 4713, 4153 and the spring force of the coil spring 4034 and defines the gas passage extending from the gas passage 4047 to the discharge port 4172.

At this time, the piston cover which has so far served normally as the current path between the partition plate 4042 and the first conductor plate 4171 also rises, and separates from the partition plate 4042. Accordingly, the current path is cut off, and the temperature rise and the progress of the cell reaction due to the abnormal current can be restricted.

As the piston 4039 rises further and the cut plate 4713 of the first conductor plate 4171 comes below the lock portion 4394 of the piston cover 4393, the cut plate 4713 warps inside the contracted portion 4931 as shown in FIG. 49 and prevents descent of the piston cover 4393.

On the other hand, when the outflow force of the gas decreases, the shaft portion 4391 of the piston is pushed down by the coil spring 4034, and the cap again closes the gas passage 4047.

On the other hand, as the piston cover 4393 rises, the piston cover 4393 establishes conduction between the first and second conductor plates 4172 and 4415 as shown in FIG. 49. Accordingly, the positive pole terminal 4017 and the cell case 4041 are short-circuited, and this short-circuit state is retained by the lock portion 4394 so that the function of the integrated cell can be retained.

The rest of the construction is the same as that of the foregoing embodiments, and a similar effect can likewise be obtained.

Embodiment 19

Figure 52:
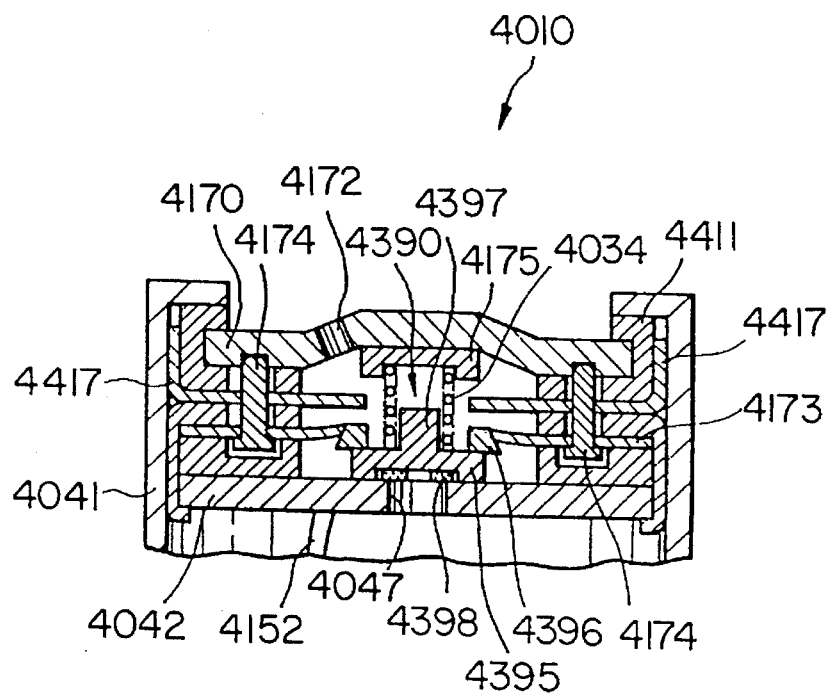
FIG. 52 is a sectional view of a chemical cell according to embodiment 19.
Figure 53:
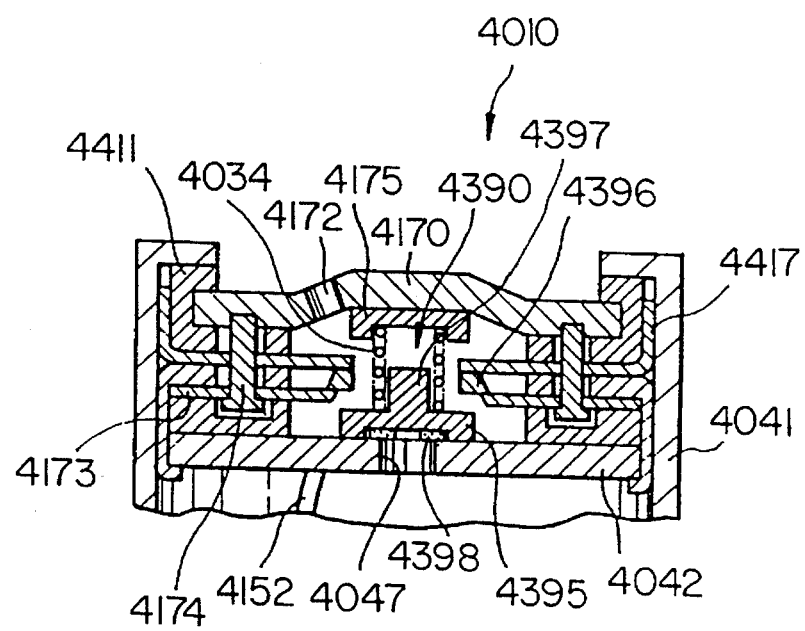
FIG. 53 is a sectional view of the chemical cell according to embodiment 19 when internal conduction is cut off.

This embodiment represents still another embodiment of the present invention wherein the vertical disposition of the first and second conductor plates 4173, 4417 is reversed from embodiment 18 and a conductor plate 396 for short-circuiting them is disposed between the conductor plates 4173, 4417 as shown in FIGS. 52 and 53.

In this embodiment, the conductor pin 4174 is implanted into the lower part of the positive pole terminal 4170, and the first conductor plate 4173 is fitted to the lower end of this conductor pin 4174.

The second conductor plate 4417 bonded to the cell case 4041 is disposed on the first conductor plate 4173. A pin hole is formed in the second conductor plate 4417 in such a manner as not to come into contact with the conductor pin 4174.

A spring fitting plate 4175 made of an insulating material is disposed at the lower part of the positive pole terminal 4170, and the coil spring 4034 is fitted to this coil fitting plate 4175.

The piston 4390 which is pushed downward by the coil spring 4034 is interposed between the coil spring 4034 and the partition plate 4042.

The piston 4390 includes a head 4397 which has a small diameter and is to be fitted to the shaft core of the coil spring 4034 and a drum portion 4395 having a large diameter.

A thick ring-like conductor plate 4396 is disposed at the upper part of the drum portion 4395.

The conductor plate 4396 is normally pushed to the drum portion 4395 of the piston 4390 by the spring force of the cut plate 4713 (see FIG. 50) of the first conductor plate 4173 as shown in FIG. 52.

As a result, the drum portion 4395 and the first conductor plate 4173 become conductive with each other, and the partition plate 4042 and the positive pole plate 4170 are electrically connected through the conductor pin 4174.

When the internal gas pressure of the cell 4010 rises, the piston 4390 also rises, and a gas outflow passage is defined between the gas passage 4047 and the gas discharge port 4172.

Then, the partition plate 4042 and the piston 4390 are cut off from each other.

When the piston 4390 rises further due to the outflow pressure of the gas, the conductor plate 4396 is retained between the first and second conductor plates 4173, 4417 as shown in FIG. 53.

As a result, the positive pole terminal 4170 and the cell case 4041 are short-circuited.

This short-circuit state is not altered even when the gas pressure drops and the piston 4390 moves down (FIG. 53). A seal member 4398 which normally maintains the sealing property and cuts off the external air is bonded to the bottom of the piston 4390.

The rest of the construction is the same as that of embodiment 18.

Incidentally, the cells of embodiments 13 to 19 can be applied to a small cell for use in portable electronic applied to a small cell for use in portable electronic appliances, and can also be applied to a large capacity cell for an electric automobile or for power storage.

In the foregoing embodiments, the driving member is driven by the pressure and the temperature inside the cell case for storing the cell reaction portion, but the present invention is not particularly limited to such an arrangement. For example, the driving member may also be driven by the change of the internal resistance value of the cell reaction portion, or the change of the output current or the output voltage.

We claim:

1. A chemical cell comprising:

a cell case having a substantially cylindrical shape with an opened portion at a first end of said cell case and a closed portion at a second end of said cell case;

a terminal portion that is fixed to said opened portion of said cell case so as to close said opened portion said terminal portion being constructed and arranged to allow said terminal portion to be electrically insulated from said cell case;

a cell reaction portion that is accommodated in said cell case and has positive and negative poles, one of said poles being electrically connected to said terminal portion and the other of said poles being electrically connected to said cell case;

a driving member that is disposed between said cell reaction portion and said terminal portion and is constructed and arranged to be movable between first and second positions, said driving member being in said first position for electrically connecting said cell reaction portion and said terminal portion when a pressure or temperature inside said cell case is below a predetermined value, said driving member being actuated to said second position for electrically disconnecting said cell reaction portion and said terminal portion when the pressure or temperature inside said cell case exceeds the predetermined value; and a retaining member for retaining said cell portion and said terminal portion in an electrically disconnected state when the pressure or temperature inside said cell case returns below the predetermined value after said driving member assumes said second position;

wherein the predetermined value indicates an abnormal reaction inside said cell portion.

2. A chemical cell according to claim 1, wherein said cell case and said terminal portion are electrically short-circuited after said driving member is actuated to said second position.

3. A chemical cell comprising:

a cell case having a substantially cylindrical shape with an opened portion at a first end of said cell case and a closed portion at a second end of said cell case;

a terminal portion that is fixed to said opened portion of said cell case so as to close said opened portion, said terminal portion being constructed and arranged to allow said terminal portion to be electrically insulated from said cell case;

a cell reaction portion that is accommodated in said cell case and has positive and negative poles, one of said poles being electrically connected to said terminal portion and the other of said poles being electrically connected to said cell case;

a driving member that is disposed between said cell reaction portion and said terminal portion and is constructed and arranged to be movable between first and second positions, said driving member being in said first position for electrically connecting said cell reaction portion and said terminal portion when a pressure inside said cell case is below a predetermined value, said driving member being actuated to said second position for electrically disconnecting said cell reaction portion and said terminal portion when the pressure inside said cell case exceeds the predetermined value; and a retaining member that cooperates with said driving member to retain said cell portion and said terminal portion in an electrically disconnected state when the pressure inside said cell case returns below the predetermined value;

wherein the predetermined value indicates an abnormal reaction inside said cell portion.

4. A chemical cell according to claim 3, wherein said cell case and said terminal portion are electrically short-circuited after said driving member is actuated to said second position.

5. A chemical cell according to claim 3, wherein said driving member comprises a spring mechanism which is constructed and arranged to allow relative displacement in the axial direction of said cell case between said driving member and said cell reaction portion for electrically disconnecting said cell reaction portion and said terminal when the pressure inside said cell case exceeds the predetermined value.

6. A chemical cell according to claim 3, further comprising a second electrical conductor plate and wherein said retaining member includes a first electrical conductor plate;

said first and second electrical conductor plates being disposed between said cell reaction portion and said terminal portion, said first and second plates being spaced apart in the axial direction of said cell case, said first conductor plate being electrically bonded to said terminal portion and said second conductor plate being electrically bonded to an internal wall of said cell case;

wherein said driving member is electrically connected to said first conductor plate and said driving member is not electrically connected to said second conductor plate when said driving member is in said first position; and wherein said driving member is electrically connected to said first and second conductor plates when said driving member is in said second position, thereby electrically connecting said terminal portion and said cell case through said driving member.

7. A chemical cell according to claim 6, further comprising means for discharging the pressure inside said cell case to outside said cell case when the pressure inside said cell case exceeds the predetermined value.

8. A chemical cell according to claim 6, wherein said driving member has a substantially cylindrical shape with a headed portion having a first outer diameter and a longitudinal portion having first and second ends and a second outer diameter that is smaller than said first outer diameter, said first end of said longitudinal portion being connected to said headed portion; and wherein said first conductor plate contacts said first end of said longitudinal portion of said driving member when said driving member is in said second position, thereby preventing said driving member from returning to said first position and locking said driving member in said second position.

9. A chemical cell according to claim 3, further comprising:

a partition plate accommodated in said cell case, said partition plate being disposed substantially parallel to said ends of said cell case;

a first chamber disposed between said partition plate and said terminal portion to receive said driving member; and a second chamber disposed between said partition plate and said closed portion to receive said cell reaction portion.

10. A chemical cell according to claim 9, wherein said cell reaction portion is electrically connected to said partition plate.

11. A chemical cell comprising:

a cell case having a substantially cylindrical shape with an opened portion at a first end of said cell case and a closed portion at a second end of said cell case;

a terminal portion that is fixed to said opened portion of said cell case so as to close said opened portion, said terminal portion being constructed and arranged to allow said terminal portion to be electrically insulated from said cell case;

a partition plate accommodated in said cell case and disposed substantially parallel to said ends of said cell case, said partition plate separating said terminal portion and said closed portion of said cell case to define a first chamber disposed between said partition plate and said terminal portion and a second chamber disposed between said partition plate and said closed portion, said partition plate having an aperture which communicates between said first and second chambers;

a cell reaction portion that is accommodated in said second chamber and has a positive pole and a negative pole, said positive pole being electrically connected to said partition plate;

a driving member that is disposed in said first chamber and is constructed and arranged to be movable along the axial direction of said cell case between first and second positions, said driving member being in said first position for electrically connecting said positive pole of said cell reaction portion and said terminal portion through said partition plate when a pressure inside said cell case is below a predetermined value, said driving member being actuated into said second position for electrically disconnecting said positive pole of said cell reaction portion and said terminal portion when the pressure inside said second chamber exceeds the predetermined value; and a lock mechanism for preventing said driving member from returning to said first position when the pressure inside said second chamber returns below the predetermined value;

wherein the predetermined value indicates an abnormal reaction inside said cell portion.

12. A chemical cell according to claim 11, wherein said driving member is disposed on said partition plate when said driving member is in said first position for electrically connecting said driving member to said partition plate, and wherein said driving member is actuated into said second position by moving said driving member toward said terminal side along the axial direction of said cell case for separating and electrically disconnecting said driving member from said partition plate.

13. A chemical cell according to claim 12, wherein said lock mechanism is a plate-like member that is accommodated within said cell case and has first and second ends, said first end being fixed to the inside of said cell case and said second end extending towards said driving member, wherein said second end engages said driving member when said driving member is in said second position.

14. A chemical cell comprising:

a cell case having a substantially cylindrical shape with an opened portion at a first end of said cell case and a closed portion at a second end of said cell case;

a terminal portion that is fixed to said opened portion of said cell case so as to close said opened portion, said terminal portion being constructed and arranged to allow said terminal portion to be electrically insulated from said cell case; and a cell reaction portion that is accommodated in said cell case and has positive and negative poles, one of said poles being electrically connected to said terminal portion and the other of said poles being electrically connected to said cell case; and a driving member that is disposed between said cell reaction portion and said terminal portion and is constructed and arranged to be movable between first and second positions, said driving member being in said first position for electrically connecting said cell reaction portion and said terminal portion when a pressure inside said cell case is below a predetermined value, said driving member being actuated to said second position for electrically disconnecting said cell reaction portion and said terminal portion when the pressure inside said cell case exceeds the predetermined value, wherein said cell case and said terminal portion are electrically short-circuited when said driving member is actuated to said second position; and wherein the predetermined value indicates an abnormal reaction inside said cell portion.

15. A chemical cell according to claim 14, further comprising a retaining member that cooperates with said driving member for retaining said cell case and said terminal portion in an electrically short-circuited state.

16. A chemical cell according to claim 14, further comprising means for discharging the pressure inside said cell case when the pressure inside said cell case exceeds the predetermined value.

17. A chemical cell according to claim 16, wherein said discharging means emits gas from said cell portion to reduce the pressure inside said cell case when the pressure inside said cell case exceeds the predetermined value due to gas generated by said cell reaction portion.

* * * * *